US008269989B2

(12) United States Patent
Uemura

(10) Patent No.: US 8,269,989 B2
(45) Date of Patent: Sep. 18, 2012

(54) PRINTING SYSTEM, PRINTING APPARATUS, DOCUMENT REPLACEMENT APPARATUS, AND PRINTER DRIVER

(75) Inventor: Atsushi Uemura, Gose (JP)

(73) Assignee: Sharp Kabushiki Kaisha, Osaka (JP)

( * ) Notice: Subject to any disclaimer, the term of this patent is extended or adjusted under 35 U.S.C. 154(b) by 1634 days.

(21) Appl. No.: 11/239,622

(22) Filed: Sep. 28, 2005

(65) Prior Publication Data
US 2006/0066888 A1 Mar. 30, 2006

(30) Foreign Application Priority Data

Sep. 28, 2004 (JP) ................................. 2004-280777
Sep. 29, 2004 (JP) ................................. 2004-284311

(51) Int. Cl.
*G06F 3/12* (2006.01)
*G06F 21/00* (2006.01)
*G06K 15/00* (2006.01)
*G06K 3/12* (2006.01)
*G06K 1/00* (2006.01)
*H04N 3/08* (2006.01)
*H04N 1/04* (2006.01)

(52) U.S. Cl. ...................... 358/1.13; 358/1.14; 358/1.15; 358/1.16; 358/1.12; 358/1.9; 358/505; 358/498; 705/50

(58) Field of Classification Search ................. 358/1.16, 358/1.12, 474, 1.9, 1.15, 1.13; 705/50
See application file for complete search history.

(56) References Cited

U.S. PATENT DOCUMENTS

| | | | | |
|---|---|---|---|---|
| 5,627,572 A | * | 5/1997 | Harrington et al. | 347/23 |
| 5,684,934 A | * | 11/1997 | Chen et al. | 358/1.14 |
| 5,787,240 A | * | 7/1998 | Hansen et al. | 358/1.16 |
| 5,872,900 A | * | 2/1999 | Tsuchitoi | 358/1.12 |
| 5,978,557 A | * | 11/1999 | Kato | 358/1.15 |
| 6,208,436 B1 | * | 3/2001 | Cunningham | 358/474 |
| 6,271,937 B1 | * | 8/2001 | Zuber | 358/1.9 |
| 6,606,165 B1 | * | 8/2003 | Barry et al. | 358/1.9 |
| 6,735,575 B1 | * | 5/2004 | Kara | 705/50 |
| 6,814,511 B2 | * | 11/2004 | Bhatti | 400/76 |
| 7,117,436 B1 | * | 10/2006 | O'Rourke et al. | 715/205 |
| 7,460,255 B2 | * | 12/2008 | Kizaki | 358/1.13 |
| 2002/0051176 A1 | * | 5/2002 | Kato | 358/1.15 |
| 2004/0158655 A1 | * | 8/2004 | Kremer | 710/8 |
| 2005/0168767 A1 | * | 8/2005 | Moroney et al. | 358/1.14 |

FOREIGN PATENT DOCUMENTS

| | | |
|---|---|---|
| JP | 09-006948 | 1/1997 |
| JP | 10-316302 | 12/1998 |
| JP | 2000-057129 | 2/2000 |
| JP | 2002-251272 | 9/2002 |

* cited by examiner

*Primary Examiner* — Akwasi M Sarpong
(74) *Attorney, Agent, or Firm* — David G. Conlin; Steven M. Jensen; Edwards Wildman Palmer LLP

(57) ABSTRACT

A printing data generating unit designates a first section (page numbers, etc.) corresponding to a change target part of a before-being-changed document and a second section corresponding to printing data of a changed part. A printing unit includes a replacement processing portion. The replacement processing portion determines whether or not the section of the counted number of sheets of paper matches the first section, and when they match, instructs the printing unit to print the printing data of the changed part corresponding to the second section, and when they do not match, causes the before-being-changed document to be discharged directly from the printing unit, and thereby replacing just the first section of the before-being-changed document with a document of the changed part corresponding to the second section.

6 Claims, 35 Drawing Sheets

FIG.2

SET PLACE TO BE CHANGED

CHANGED SECTION 0

| PAGE NUMBER OF THE DOCUMENT TO BE PRINTED | PAGE NUMBER OF THE DOCUMENT TO BE REPLACED |
|---|---|
| FROM [ ] PAGE | FROM [ ] PAGE |
| TO [ ] PAGE ⇒ | TO [ ] PAGE |

CHANGED SECTION 1

| PAGE NUMBER OF THE DOCUMENT TO BE PRINTED | PAGE NUMBER OF THE DOCUMENT TO BE REPLACED |
|---|---|
| FROM [ ] PAGE | FROM [ ] PAGE |
| TO [ ] PAGE ⇒ | TO [ ] PAGE |

| SET PLACE TO BE CHANGED | | | | |
|---|---|---|---|---|
| CHANGED SECTION 0 | FROM [    ] PAGE | TO [    ] PAGE | | |
| | CHANGED SECTION LEADING END DETECTION-USE DOCUMENT | [    ] PAGE | | |
| | CHANGED SECTION TRAILING END DETECTION-USE DOCUMENT | [    ] PAGE | | |
| CHANGED SECTION 1 | FROM [    ] PAGE | TO [    ] PAGE | | |
| | CHANGED SECTION LEADING END DETECTION-USE DOCUMENT | [    ] PAGE | | |
| | CHANGED SECTION TRAILING END DETECTION-USE DOCUMENT | [    ] PAGE | | |

(B)

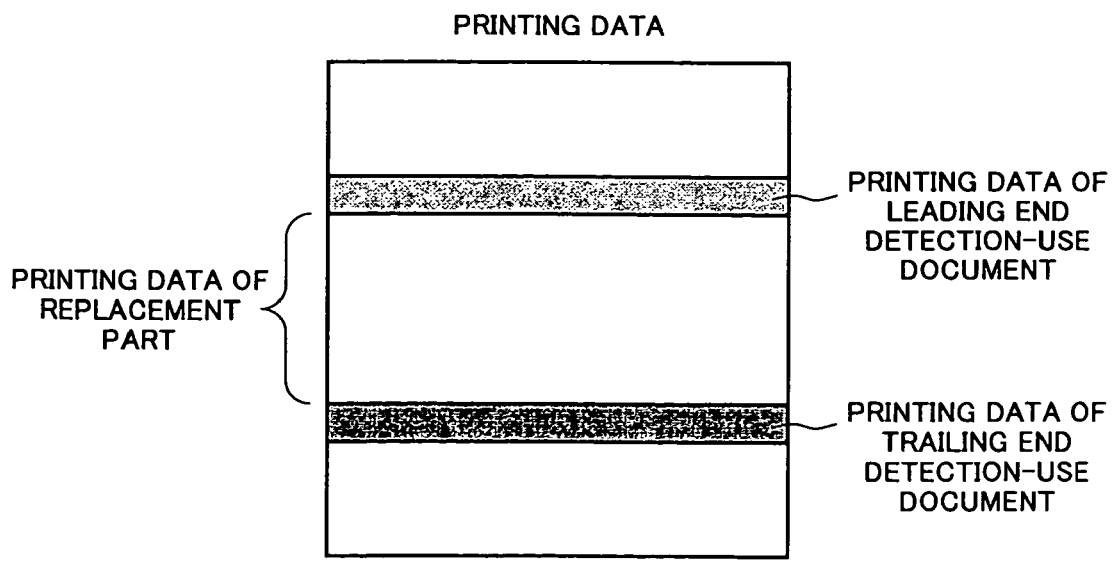

PRINTING DATA

- PRINTING DATA OF LEADING END DETECTION-USE DOCUMENT
- PRINTING DATA OF REPLACEMENT PART
- PRINTING DATA OF TRAILING END DETECTION-USE DOCUMENT

FIG.6
(A)
(DOCUMENT BEFORE BEING CHANGED; PRINTED)
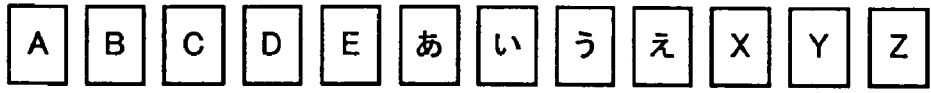
(B)
(DOCUMENT AFTER BEING CHANGED; PRINTING DATA)
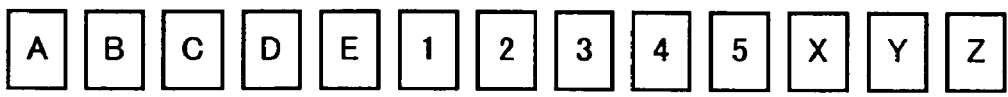
FIG.7
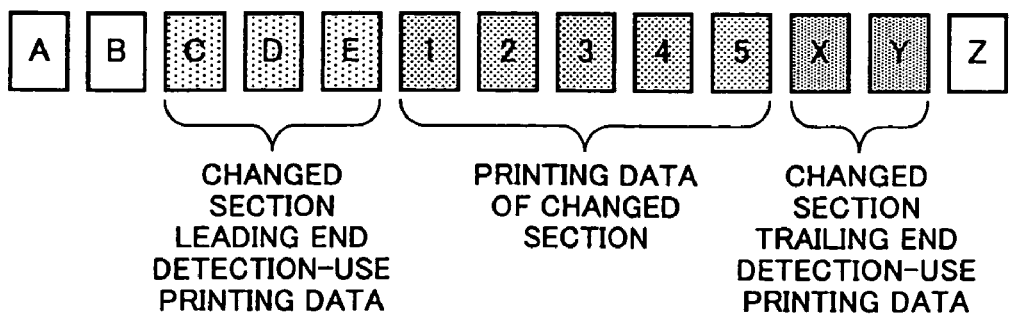

FIG.13
(A)
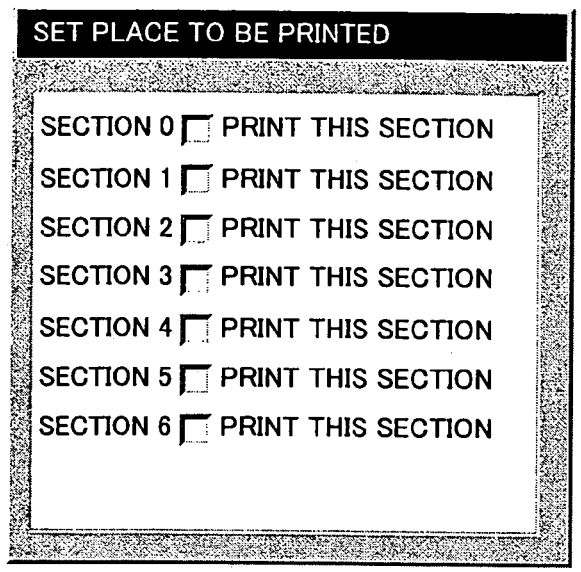
(B)
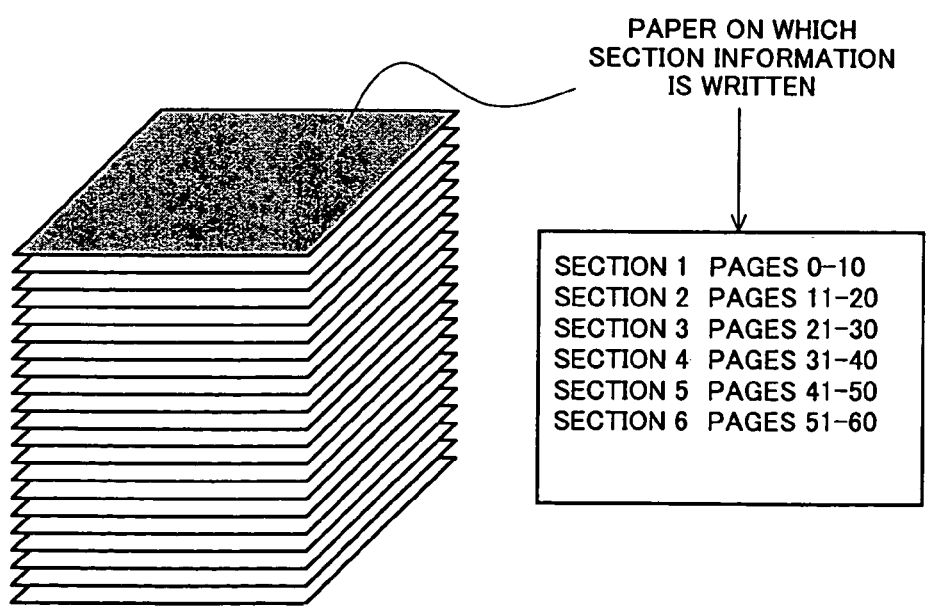

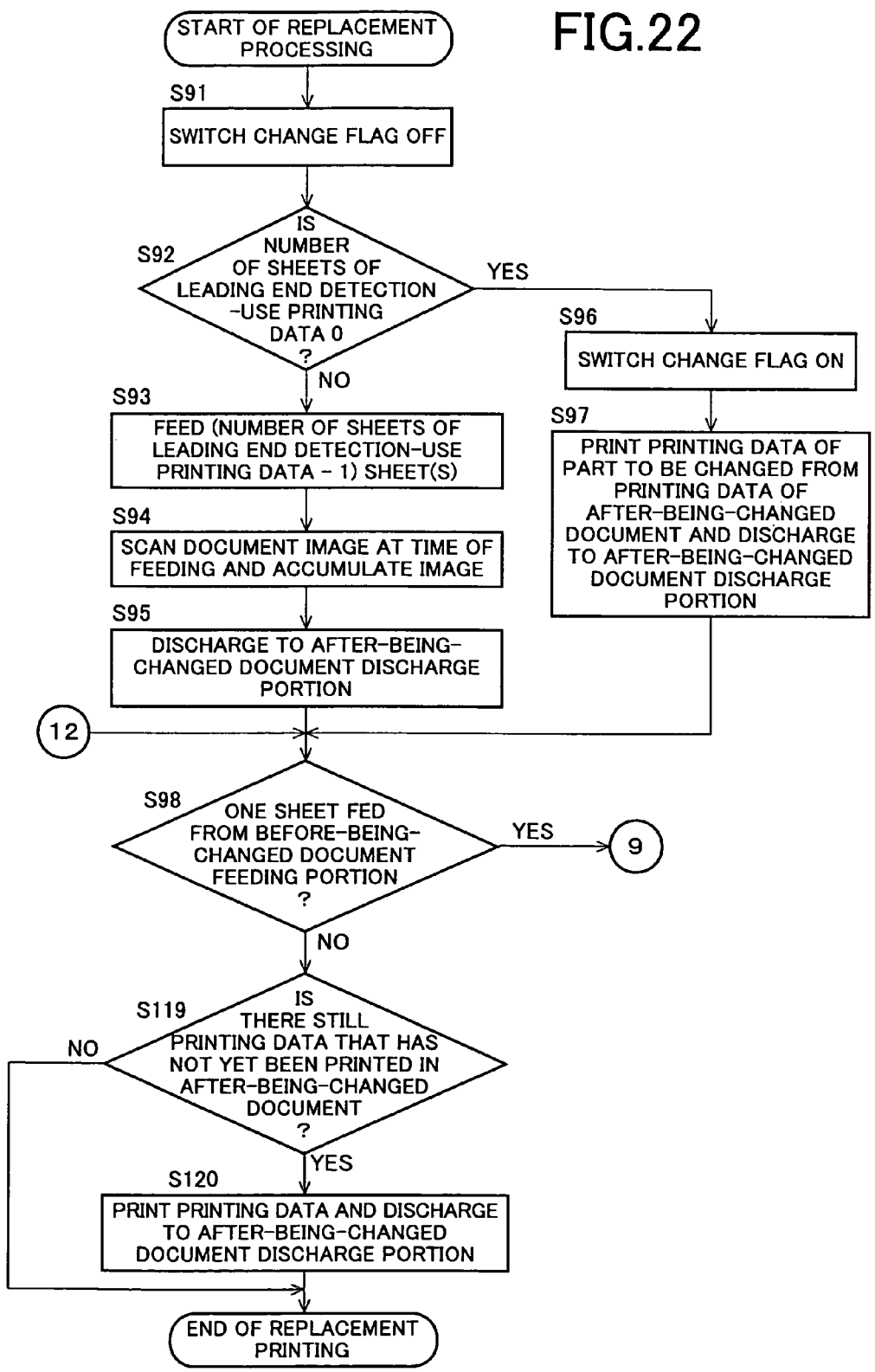

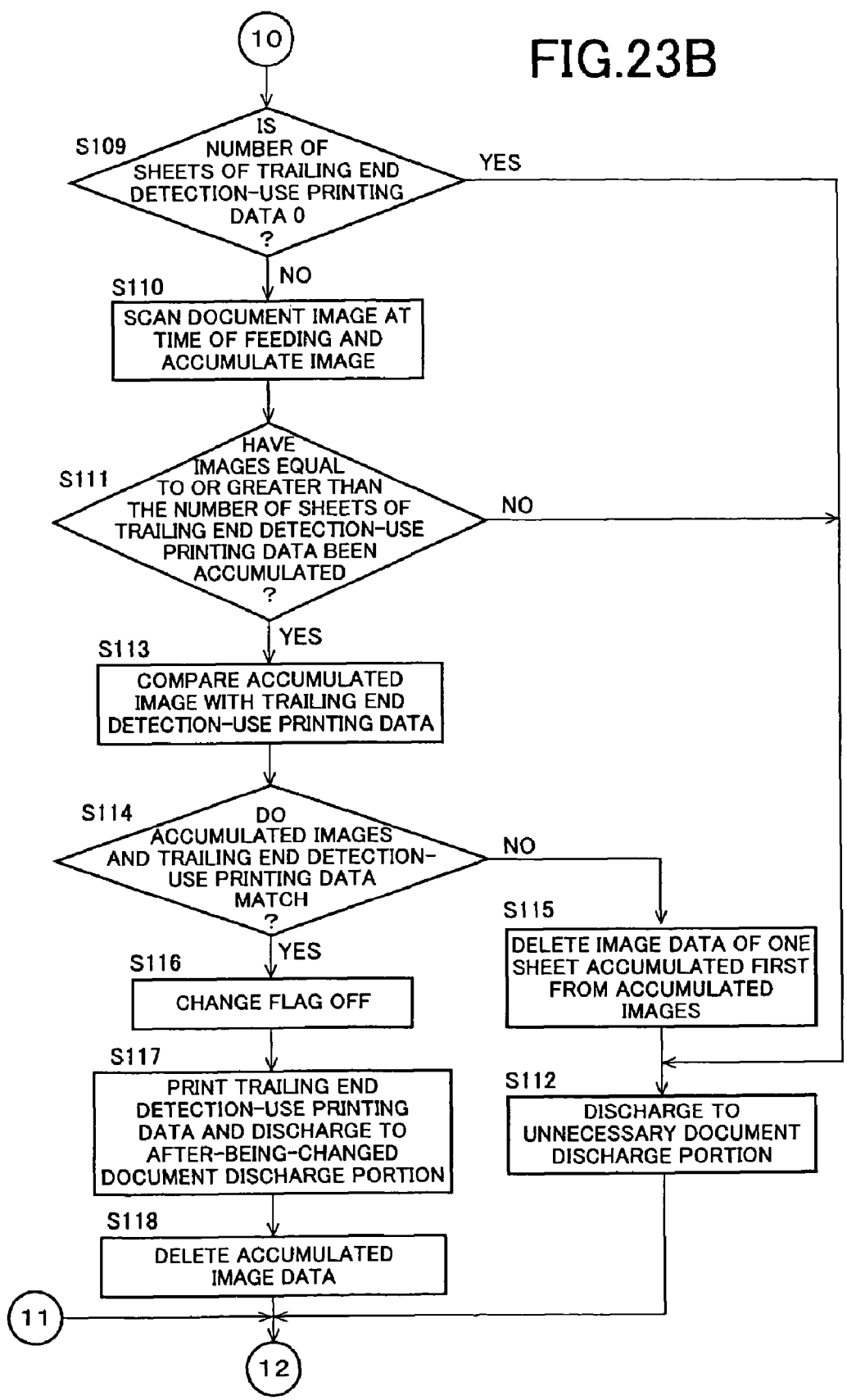

```
SET PLACE TO BE PRINTED
          SECTION 0    ☐ PRINT THIS SECTION
     DELIMITER PAGE 1 ☐ PRINT THIS DELIMITER PAGE
          SECTION 1    ☐ PRINT THIS SECTION
     DELIMITER PAGE 2 ☐ PRINT THIS DELIMITER PAGE
          SECTION 2    ☐ PRINT THIS SECTION
     DELIMITER PAGE 3 ☐ PRINT THIS DELIMITER PAGE
          SECTION 3    ☐ PRINT THIS SECTION
     DELIMITER PAGE 4 ☐ PRINT THIS DELIMITER PAGE
          SECTION 4    ☐ PRINT THIS SECTION
     DELIMITER PAGE 5 ☐ PRINT THIS DELIMITER PAGE
          SECTION 5    ☐ PRINT THIS SECTION
     DELIMITER PAGE 6 ☐ PRINT THIS DELIMITER PAGE
          SECTION 6    ☐ PRINT THIS SECTION
     DELIMITER PAGE 7 ☐ PRINT THIS DELIMITER PAGE

[ OK ]   [ CANCEL ]
```

(B)

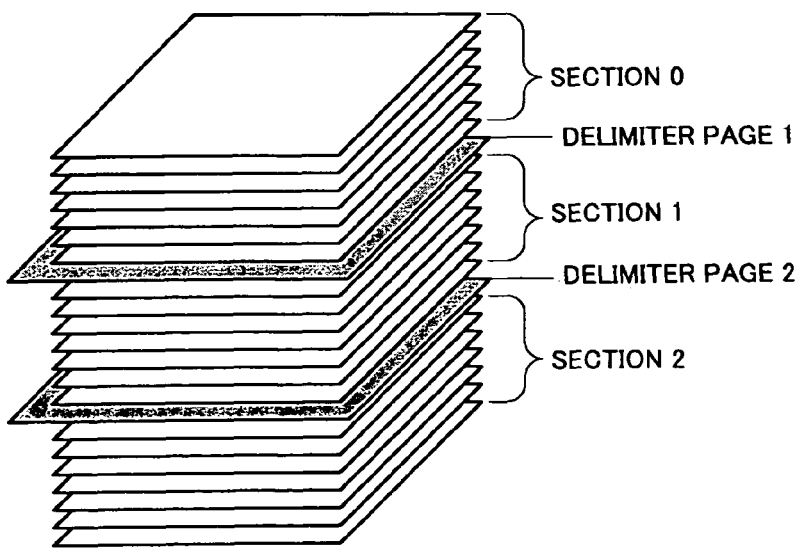

FIG.28
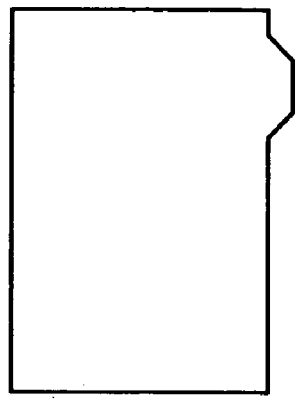
FIG.29
(A)    (B)
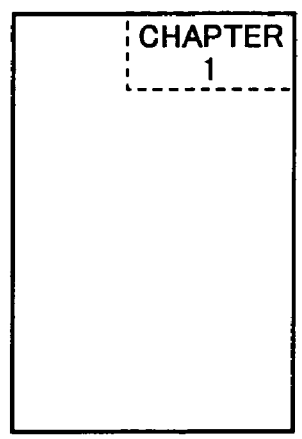 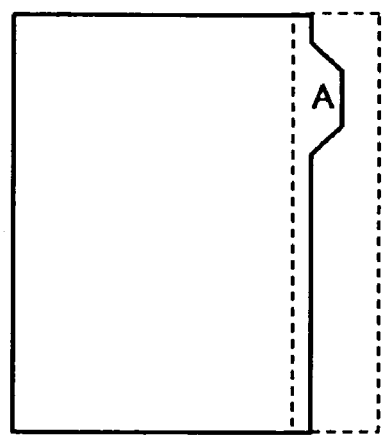

FIG.34

SECTION 0

——————————— DELIMITER PAGE 1

SECTION 1

——————————— DELIMITER PAGE 3

SECTION 3

——————————— DELIMITER PAGE 7

SECTION 7

PRINTING SYSTEM, PRINTING APPARATUS, DOCUMENT REPLACEMENT APPARATUS, AND PRINTER DRIVER

CROSS-NOTING PARAGRAPH

This non-provisional application claims priority under 35 U.S.C. §119(a) on Patent Applications No. 2004-280777 filed in JAPAN on Sep. 28, 2004, No. 2004-284311 filed in JAPAN on Sep. 29, 2004, the entire contents of which are hereby incorporated herein by reference.

FIELD OF THE INVENTION

The present invention relates to a printing system, a printing apparatus, a document replacement apparatus, and a printer driver, and more particularly to a printing system, a printing apparatus, a document replacement apparatus, and a printer driver for partially replacing a changed part of a printing document comprising plural pages.

BACKGROUND OF THE INVENTION

Usually, when a document is created using a personal computer (PC), it is printed out on paper, the content is checked, and corrections are made. Oftentimes this correction process is made several times. There are also times when corrections and changes are made to a document created once. In such times, if the entire document is printed each time a correction is made, paper and printing time are wasted in printing the parts that have not been corrected. Thus, oftentimes only the changed parts are printed and replacement is done with respect to the printing result of the before-changed document. However, oftentimes it takes a lot of time and effort to designate the changed parts for printing only those changed parts (e.g., designating the parts by page numbers of the document to be printed, etc.) and to find and replace the corresponding places from the before-changed document.

In order to solve this problem, Japanese Laid-Open Patent Publication No. 2000-57129 proposes a method where printing data of a document before being changed are saved in advance, and when the document after being changed is to be printed, the printing data of the document after being changed is compared with printing data of the document before being changed, the difference is extracted, and only the printing data of the pages where there is a difference are transmitted to a printer and printed.

Japanese Laid-Open Patent Publication No. 10-316302 proposes a method where, after sorting information has been added to each page of a document and the document has been printed, a document sorting device is used, the added sorting information is read by the document sorting device, and sorting is conducted in accordance with the sorting information, whereby sorting processing desired by the user is realized.

Japanese Laid-Open Patent Publication No. 2002-251272 proposes a printing system where printing data of a document before being changed are saved in advance, the page numbers of parts to be changed are designated with respect to the saved printing data of the document before being changed, and only the printing data of those parts are replaced with printing data after being changed and are printed, whereby a printing result of the document after being changed can be obtained.

However, in the invention disclosed in Japanese Laid-Open Patent Publication No. 2000-57129, in order to obtain a printing result of the document after being changed, it is necessary for the user to manually conduct replacement with respect to the printing result of the document before being changed after the pages where there are differences have been printed. Also, because the user must search the document before being changed for the changed parts by pages or sheets of paper, it takes a lot of effort to identify the changed parts from the document before being changed when the number of pages in the document is large.

In the invention disclosed in Japanese Laid-Open Patent Publication No. 10-316302, it is necessary to add the sorting information to all of the pages of the printing result, and it takes a lot of effort in the creation of the document, at the time of printing and at the time of preprocessing for sorting.

In the invention disclosed in Japanese Laid-Open Patent Publication No. 2002-251272, because the user must search the printing result of the document before being changed for changed parts by pages or sheets of paper, it takes a lot of effort in order to identify the changed parts from the document before being changed. Also, in order to obtain a printing result of the document after being changed, it is necessary to print the printing data of the document after being changed including places where there are no changes, and there is the potential to needlessly consume paper in printing the places where there are no changes.

SUMMARY OF THE INVENTION

It is an object of the present invention to provide a printing system, a document replacement apparatus and a printer driver that can print only a document of parts to which changes or the like have been added by counting the number of sheets of paper of a before-replacement printing document, or by comparing the before-replacement printing document with printing data including parts to which changes or the like have been added, or by acquiring section information of document units (sections) where replacement in the before-replacement printing document is to be conducted, and which can automatically replace, with the printing result of parts to which changes or the like have been added, the pertinent parts of the before-replacement printing document. It is also an object of the present invention to provide a printing system, a printing apparatus, a document replacement apparatus and a printer driver that dispose delimiter pages in a printing document comprising plural pages and can print only the document of the section to which changes or the like have been added in document units (hereinafter referred to as sections) delimited by the delimiter pages, and can automatically replace the printing result of sections to which changes or the like have been added with respect to the before-replacement printing document.

Another object of the present invention is to provide a printing system comprising a printing data generating unit that generates printing data and a printing apparatus that conducts printing on the basis of the printing data, with the printing data generating unit and the printing apparatus partially replacing a printing document comprising plural pages, wherein the printing data generating unit comprises a section designating portion that designates a first section corresponding to a replacement target part in the before-replacement printing document and a second section corresponding to printing data of a replacement part, and wherein the printing apparatus comprises a printing portion that selectively prints printing data of the second section designated by the section designating portion, a paper feeding portion that feeds the before-replacement printing document, a counting portion that counts the number of sheets of paper of the fed printing document, and a replacement processing portion that determines whether or not a section of the counted number of sheets of paper matches the first section, the replacement processing portion when both match, instructing the printing portion to print the printing data of the replacement part corresponding to the second section, the replacement processing portion when both do not match, causing the before-replacement printing document to be discharged directly from the printing portion, and thereby replacing just the designated first section of the before-replacement printing document with a document of the replacement part corresponding to the second section.

Another object of the present invention is to provide the printing system where the section designating portion may designate, as the second section, the page number of the printing data of the replacement part.

Another object of the present invention is to provide the printing system where the section designating portion may designate, as the second section, a combination of the starting page number and the ending page number of the printing data of the replacement part.

Another object of the present invention is to provide the printing system where the section designating portion may designate, as the second section, the paper number of the printing data of the replacement part.

Another object of the present invention is to provide the printing system where the section designating portion may designate, as the second section, a combination of the starting paper number and the ending paper number of the printing data of the replacement part.

Another object of the present invention is to provide the printing system where, when the second section is designated by the page number of the printing data of the replacement part, the section designating portion may convert the page number to the paper numbers corresponding to the page number.

Another object of the present invention is to provide a printing system comprising a printing data generating unit that generates printing data and a printing apparatus that conducts printing on the basis of the printing data, with the printing data generating unit and the printing apparatus partially replacing a printing document-comprising plural pages, wherein the printing data generating unit comprises a section designating portion that designates a section corresponding to a replacement part included in after-replacement printing data, and wherein the printing apparatus comprises a printing portion that selectively prints printing data of the section designated by the section designating portion, a data accumulating portion that accumulates printing data of predetermined pages that precedes the printing data of the section, a paper feeding portion that feeds the before-replacement printing document, a reading portion that reads the fed printing document, a data comparing portion that compares the read document data and the printing data of the data accumulating portion, and a replacement processing portion which, when both match in the predetermined pages, instructs the printing portion to print the printing data of the replacement part corresponding to the section, and which, when both do not match, causes the before-replacement printing document to be discharged directly from the printing portion, and thereby replacing a replacement target document of the before-replacement printing document with a document of the replacement part.

Another object of the present invention is to provide the printing system that may further comprise a first data accumulating portion that accumulates printing data of predetermined pages that is preceded by the printing data of the section, wherein the data comparing portion compares the document data that the reading portion has sequentially read with the printing data of the first data accumulating portion, and wherein when both match in the predetermined pages, the replacement processing portion determines that the replacement target document of the before-replacement printing document has been replaced with the document of the replacement part.

Another object of the present invention is to provide the printing system where, when the printing data preceding and preceded by the printing data of the section have been designated by page number, the section designating portion may convert the page number to paper number corresponding to the page number.

Another object of the present invention is to provide the printing system where, when the printing data preceding and preceded by the printing data of the section have been designated by the page number and printing settings are set to allocate plural pages to one sheet of paper, the data comparing portion compares only the comparison target part in the plural pages.

Another object of the present invention is to provide a printing system comprising a printing data generating unit that generates printing data and a printing apparatus that conducts printing on the basis of the printing data, with the printing data generating unit and the printing apparatus partially replacing a printing document comprising plural pages, wherein section information for dividing the before-replacement printing document into plural sections is disposed on a first page of the before-replacement printing document, wherein the printing data generating unit comprises a section designating portion that designates a section serving as a replacement target with respect to the plural sections, and wherein the printing apparatus comprises a printing portion that selectively prints printing data of the section designated by the section designating portion, a paper feeding portion that feeds the before-replacement printing document, a reading portion that reads the section information disposed on the first page of the fed printing document, a counting portion that counts the number of sheets of paper of the printing document, and a replacement processing portion that determines whether or not the section of the counted number of sheets of paper matches the read section, the replacement processing portion when both match, instructing the printing portion to print the printing data of a replacement part corresponding to the designated section, the replacement processing portion when both do not match, causing the before-replacement printing document to be discharged directly from the printing portion, and thereby replacing just the designated section of the before-replacement printing document with a document of the replacement part.

Another object of the present invention is to provide a document replacement apparatus that partially replaces a printing document comprising plural pages, the document replacement apparatus comprising a section designation information input portion that inputs information for designating a section corresponding to a replacement target part in the before-replacement printing document; a paper feeding portion that feeds the before-replacement printing document and a document of a pre-printed replacement part; a counting portion that counts the number of sheets of paper of the before-replacement printing document; and a replacement processing portion that determines whether or not the section of the counted number of sheets of paper matches the designated section, the replacement processing portion when both match, discharging the document of the replacement part corresponding to the designated section from the paper feeding portion, the replacement processing portion when both do not match, discharging the before-replacement printing document, and thereby replacing just the designated section of the before-replacement printing document with the document of the replacement part.

Another object of the present invention is to provide the document replacement apparatus that may further comprise a first counting portion that counts the number of sheets of paper of the document of the replacement part, wherein the section designation information input portion inputs information for designating a first section corresponding to the replacement part, and wherein the replacement processing portion determines whether or not the section of the number of sheets of paper counted by the first counting portion matches the designated first section, the replacement processing portion when both match, discharging the document of the replacement part corresponding to the first section, and thereby replacing the designated section of the before-replacement printing document with the document of the replacement part corresponding to the first section.

Another object of the present invention is to provide a document replacement apparatus that partially replaces a printing document comprising plural pages, the document replacement apparatus comprising a section designation information input portion that inputs information for designating a section corresponding to a replacement part included in after-replacement printing data; a paper feeding portion that feeds the before-replacement printing document, a document of a pre-printed replacement part corresponding to the section, and a document of predetermined pages that precedes the document of the replacement part; a first reading portion that reads the document of the predetermined pages; a data accumulating portion that accumulates document data read by the first reading portion; a second reading portion that read the before-replacement printing document; a data comparing portion that compares the document data read by the second reading portion with the document data of the data accumulating portion; and a replacement processing portion which, when both match in the predetermined pages, discharges the document of the replacement part corresponding to the section from the paper feeding portion, the replacement processing portion when both do not match, discharging the before-replacement printing document, and thereby replacing the replacement target document of the before-replacement printing document with the document of the replacement part.

Another object of the present invention is to provide the document replacement apparatus that may further comprise a first data accumulating portion that accumulates a document of predetermined pages that is preceded by the document of the replacement part corresponding to the section, wherein the data comparing portion compares the document data sequentially read by the second reading portion with the document data of the first data accumulating portion, and wherein when both match in the predetermined pages, the replacement processing portion determines that the replacement target document of the before-replacement printing document has been replaced with the document of the replacement part.

Another object of the present invention is to provide a document replacement apparatus that partially replaces a printing document comprising plural pages, with section information for dividing the printing document into plural sections being disposed on a first page of the before-replacement printing document, the document replacement apparatus comprising a section designation information input portion that inputs information for designating a section serving as a replacement target with respect to the plural sections; a paper feeding portion that feeds the before-replacement printing document and a document of a pre-printed replacement part; a reading portion that reads the section information disposed on the first page of the fed document; a counting portion that counts the number of sheets of paper of the printing document; and a replacement processing portion that determines whether or not the section of the counted number of sheets of paper matches the read section, the replacement processing portion when both match, discharging the document of the replacement part corresponding to the designated section from the paper feeding portion, the replacement processing portion when both do not match, discharging the before-replacement printing document, and thereby replacing just the designated section of the before-replacement printing document with the document of the replacement part.

Another object of the present invention is to provide the document replacement apparatus, wherein the section designation information input portion may input information for designating a first section corresponding to the document of the replacement part, the document replacement apparatus may dispose section information for dividing the document of the replacement parts into plural sections on a first page of the document of the replacement part, and may include a first reading portion that reads the section information and a first counting portion that counts the number of sheets of paper of the document of the replacement part, and the replacement processing portion may determine whether or not the section of the number of sheets of paper counted by the first counting portion matches the read section, the replacement processing portion when both match, discharging the document of the replacement part corresponding to the first section, and thereby replacing the first section of the before-replacement printing document with the document of the replacement part.

Another object of the present invention is to provide the document replacement apparatus that may further comprise an input/output interface for connecting via a network to an information processing apparatus provided with a section designating portion that designates a section corresponding to a replacement target document in the before-replacement printing document or designates a section corresponding to a replacement part included in after-replacement printing data, wherein the section designation information input portion acquires the section designation information from the information processing apparatus.

Another object of the present invention is to provide a printing system comprising a printing data generating unit that generates printing data and a printing apparatus that conducts printing on the basis of the printing data, with the printing data generating unit and the printing apparatus partially replacing a printing document comprising plural pages, wherein the before-replacement printing document is provided with a delimiter page for dividing the printing document into plural document units (hereinafter, referred to as sections), wherein the printing data generating unit comprises a section designating portion that designates a section serving as a replacement target with respect to the plural sections, and wherein the printing apparatus comprises a printing portion that selectively prints printing data of a replacement part corresponding to the section designated by the section designating portion, a paper feeding portion that feeds the before-replacement printing document, a delimiter page detecting portion that detects the delimiter page from the fed printing document, and a replacement processing portion that determines whether or not a section including the detected delimiter page matches the designated section, the replacement processing portion when both match, instructing the printing portion to print the printing data of the replacement part corresponding to the section, the replacement processing portion when both do not match, causing the before-replacement printing document to be discharged directly from the printing portion and, thereby replacing just the designated section of the before-replacement printing document with a document of the replacement part.

Another object of the present invention is to provide the printing system where the replacement processing portion may be provided with a separate discharge path such that when it causes the before-replacement printing document to be discharged, the before-replacement printing document does not pass through the printing portion.

Another object of the present invention is to provide the printing system that may further comprise a first discharge portion for discharging an unnecessary document of the before-replacement printing document that has become unnecessary due to replacement processing and a second discharge portion for discharging the before-replacement printing document other than the unnecessary document and the document of the replacement part.

Another object of the present invention is to provide the printing system where, the paper of the delimiter page may be of a color that is different from that of the paper of the before-replacement printing document, and the delimiter page detecting portion may detect the delimiter page by the difference in color of the paper.

Another object of the present invention is to provide the printing system where the paper of the delimiter page may be of a thickness that is different from that of the paper of the before-replacement printing document, and the delimiter page detecting portion may detect the delimiter page by the difference in thickness of the paper.

Another object of the present invention is to provide the printing system where the paper of the delimiter page may be of a size that is different from that of the paper of the before-replacement printing document, and the delimiter page detecting portion may detect the delimiter page by the difference in size of the paper.

Another object of the present invention is to provide the printing system where the paper of the delimiter page may be of a form that is different from that of the paper of the before-replacement printing document, and wherein the delimiter page detecting portion may detect the delimiter page by the difference in the form of the paper.

Another object of the present invention is to provide the printing system where the paper of the delimiter page may be the paper of the before-replacement printing document, with identification information for identifying that the paper is the delimiter page being added to a specific region of the paper, and the delimiter page detecting portion may detect the delimiter page by the presence or absence of the identification information.

Another object of the present invention is to provide the printing system where the identification information of the delimiter page may include information of the number of the delimiter pages, and the replacement processing portion may determine, on the basis of the information of the number of the delimiter pages, whether or not the section including the delimiter page matches the section designated by the section designating portion.

Another object of the present invention is to provide the printing system where the section designating portion may designate a character string or image data as the identification information of the section to be changed, and the replacement processing portion may determine whether or not the identification information of the delimiter page matches the character string or image data designated by the section designating portion.

Another object of the present invention is to provide the printing system where the replacement processing portion may information of the counted number of the delimiter pages detected by the delimiter page detecting portion, and on the basis of the counted number-of-pages information of the delimiter page, determine whether or not the section including the delimiter page matches the section designated by the section designating portion.

Another object of the present invention is to provide the printing system where the section designating portion may enable to designate a delimiter page serving as a replacement target with respect to plural delimiter pages included in the before-replacement printing document, and the replacement processing portion may replace only the designated delimiter page included in the before-replacement printing document.

Another object of the present invention is to provide the printing system where the section designating portion may enable to designate a section and a delimiter page serving as a replacement target with respect to the plural sections and its delimiter page, and the replacement processing portion may replace the designated section and its delimiter page included in the before-replacement printing document.

Another object of the present invention is to provide a printing apparatus that conducts printing on the basis of printing data and partially replaces a printing document comprising plural pages, with the before-replacement printing document being provided with a delimiter page for dividing the printing document into plural document units (hereinafter referred to as sections), the printing apparatus comprising a section designating portion that designates a section serving as a replacement target with respect to the plural sections; a storage portion that stores printing data of a replacement part corresponding to the designated section; a printing portion that selectively prints the stored printing data; a paper feeding portion that feeds the before-replacement printing document; a delimiter page detecting portion that detects the delimiter page from the fed printing document; and a replacement processing portion that determines whether or not a section including the detected delimiter page matches the designated section, the replacement processing portion when both match, instructing the printing portion to print the printing data of the replacement part corresponding to the section, the replacement processing portion when both do not match, causing the before-replacement printing document to be discharged directly from the printing portion and replacing just the designated section of the before-replacement printing document with a document of the replacement part.

Another object of the present invention is to provide a document replacement apparatus that partially replaces a printing document comprising plural pages, with the before-replacement printing document being provided with a delimiter page for dividing the printing document into plural document units (hereinafter referred to as sections), the document replacement apparatus comprising a section designation information input portion that inputs information for designating a section serving as a replacement target with respect to the plural sections; a paper feeding portion that feeds the before-replacement printing document and feeds a document of a pre-printed replacement part in accordance with the replacement target section; a delimiter page detecting portion that detects the delimiter page from the fed before-replacement printing document; and a replacement processing portion that determines whether or not a section including the detected delimiter page matches the section designated by the section designation information, the replacement processing portion when both match, discharging the document of the replacement part corresponding to the section from the paper feeding portion, the replacement processing portion when both do not match, discharging the before-replacement printing document, and thereby replacing just the designated section of the before-replacement printing document with the document of the replacement part.

Another object of the present invention is to provide the document replacement apparatus, wherein the paper feeding portion may be set in a state where the document of the replacement part includes a delimiter page, and the delimiter page detecting portion may detect the delimiter page from the document of the replacement part fed from the paper feeding portion.

Another object of the present invention is to provide the document replacement apparatus, wherein the paper feeding portion may comprise a first feeding portion that feeds the document of the replacement part and a second feeding portion that feeds the before-replacement printing document.

Another object of the present invention is to provide the document replacement apparatus that may further comprise an input/output interface for connecting via a network to an information processing apparatus provided with a section designating portion that designates a section serving as a replacement target with respect to the plural sections, wherein the section designation information input portion acquires the section designation information from the information processing apparatus.

Another object of the present invention is to provide the document replacement apparatus that may further comprise a reading portion that reads paper on which information for designating a section serving as a replacement target with respect to the plural sections is printed, wherein the section designation information input portion acquires the section designation information from the reading portion.

Another object of the present invention is to provide the document replacement apparatus that may further comprise a first discharge portion for discharging an unnecessary document of the before-replacement printing document that has become unnecessary due to replacement processing and a second discharge portion for discharging the before-replacement printing document other than the unnecessary document and the document of the replacement part.

Another object of the present invention is to provide a printer driver operable to execute a function as the section designating portion in the printing system of the present invention.

The printing system, printing apparatus, document replacement apparatus, and printer driver of the present invention can, when partially replacing a printing document that has been printed once, designate document units (sections) including delimiter pages by automatically detecting delimiter pages disposed in the printing document, and automatically replace only the document of those sections.

BRIEF DESCRIPTION OF THE DRAWINGS

FIG. 2 is a diagram showing the corresponding relationship between a user interface displayed by a printing section designating portion shown in FIG. 1 and document before being changed;

FIG. 5 is a diagram showing the corresponding relationship between a user interface displayed by a printing section designating portion shown in FIG. 4 and printing data after being changed;

FIG. 6 is a diagram showing examples of a printed document before being changed and printing data after being changed corresponding to a printed document after being changed;

FIG. 7 is a diagram showing the state of the printing data after being changed corresponding to the user interface shown in FIG. 5(A);

FIG. 13 is a diagram showing the corresponding relationship between a user interface displayed by a printing section designating portion shown in FIG. 12 and paper on which section information is described;

FIG. 22 is a flow chart for describing another example of the flow of the document replacement processing to which the present invention is applied;

FIGS. 23A and 23B are flow charts for describing another example of the flow of the document replacement processing to which the present invention is applied, and are a continuation of the flow shown in FIG. 22;

FIG. 25 is a diagram showing the corresponding relationship between a user interface displayed by a printing section designating portion shown in FIG. 24 and a document before being changed;

FIG. 28 is a diagram showing an example of a delimiter page;

FIG. 29 is a diagram showing other examples of a delimiter page;

FIG. 34 is a diagram showing the state of delimited pages inserted into a document of changed parts shown in FIG. 27.

PREFERRED EMBODIMENTS OF THE INVENTION

First Embodiment

Figure 1:
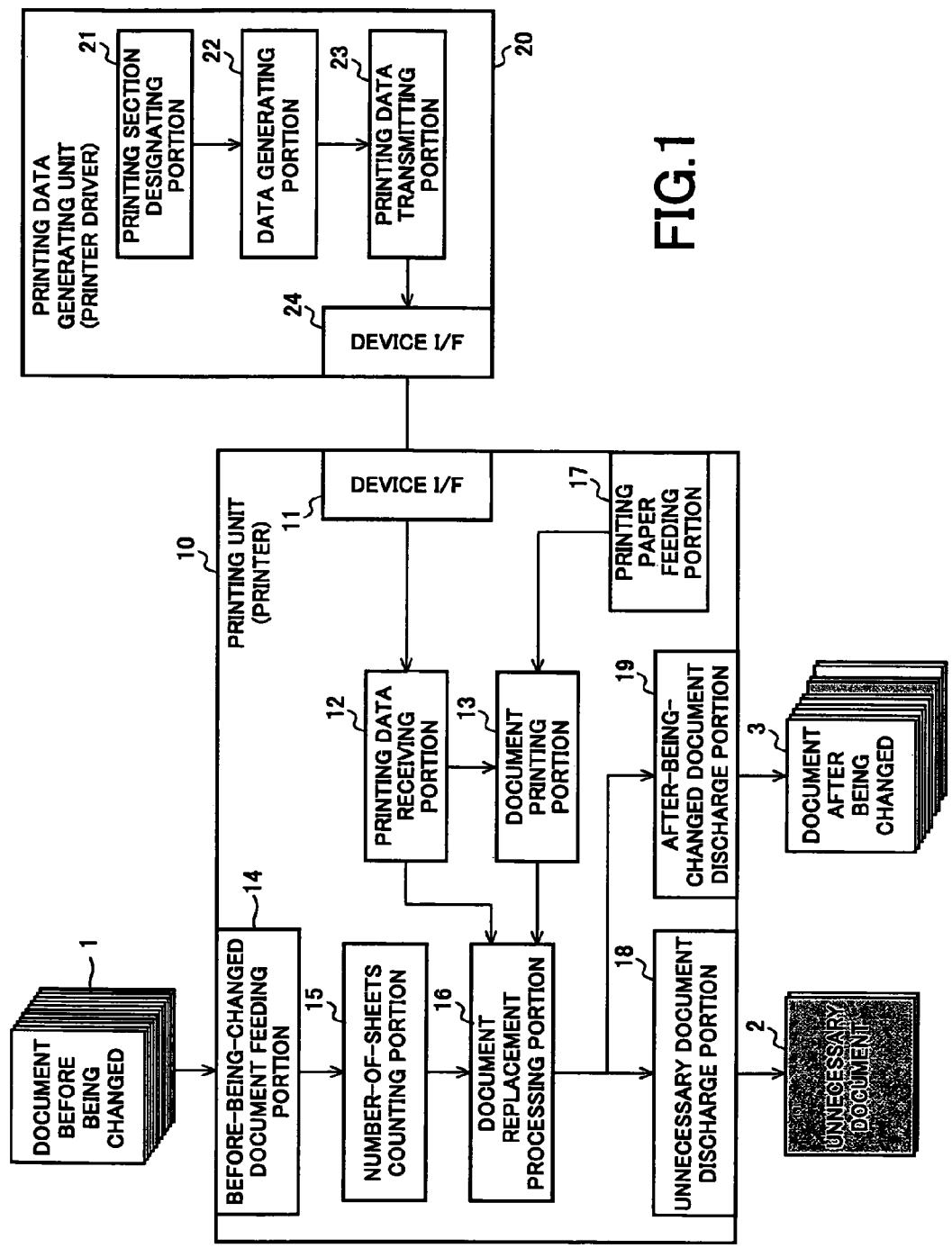
FIG. 1 is a block diagram showing a configuration example of a printing system pertaining to an embodiment of the present invention.

FIG. 1 is a block diagram showing a configuration example of a printing system pertaining to an embodiment of the present invention. The printing system includes a printing unit 10 that conducts printing on the basis of printing data and a printing data generating unit 20 that generates printing data and transmits the printing data to the printing unit 10. The printing unit 10 is, for example, a printer and is configured with a device interface (I/F) 11, a printing data receiving portion 12, a document printing portion 13, a before-being-changed document feeding portion 14, a number-of-sheets counting portion 15, a document replacement processing portion 16, a printing paper feeding portion 17, an unnecessary document discharge portion 18, and an after-being-changed document discharge portion 19.

The printing data generating unit 20 is, for example, a printer driver on a personal computer (PC) and is configured with a printing section designating portion 21, a data generating portion 22, a printing data transmitting portion 23, and a device I/F 24. In FIG. 1, reference numeral 1 represents a printing document before being replaced (hereinafter referred to as a document before being changed), reference numeral 2 represents an unnecessary document that has become unnecessary due to replacement with a printing document of a replacement part not shown (hereinafter referred to as a document of a changed part), and reference numeral 3 represents a document after being changed in which the pertinent parts of document before being changed 1 is replaced with a document of changed parts. In the present embodiment, the document serving as the replacement target will be described with taking a document to which changes or the like have been added as a representative.

The PC provided with the printing data generating unit 20 is a general computer including a CPU that controls the entire apparatus, a storage device such as a RAM that is a semiconductor memory, a ROM or a HDD (hard disk drive), an input device, a display device, a communication device, an output device, and a system bus (not shown), and the printing data generating unit 20 (printer driver) is a program provided with setting functions relating to the printing of the printer (printing unit 10). The printer driver is installed in the storage device such as the HDD and functions on the operating system (OS) of the PC. The CPU reads the printer driver to the RAM that is an execution region and as a result the printing is executed.

The progress of the processing and the processing result are presented to an operator or the like through the display device, such as a CRT or LCD, and in each processing step, the operator inputs/designates necessary parameters from the input device, such as a keyboard or a mouse (pointing device). The communication device is a network interface for connecting to various communication networks, so that PCs can be accessibly connected. The output device is connected to an external device such as a printer and outputs data. The CPU, the RAM, the ROM, the storage device, the input device, the display device, the communication device, and the output device are interconnected via the system bus.

The first embodiment is one that can print just a document of a part to which changes or the like have been added by counting the number of sheets of paper of the document before being changed 1 by the paper counting portion 15, and that automatically replaces, with the printing result of parts to which changes or the like have been added, pertinent parts of a printing document before being replaced.

FIG. 2 is a diagram showing the corresponding relationship between a user interface displayed by the printing section designating portion 21 shown in FIG. 1 and the document before being changed 1. In the drawing, the page input column shown at the left side is a column for designating the "page number of the document to be printed," the page input column shown at the right side is a column designating the "page number of the document to be replaced," and the page input columns are disposed on each changed section and mutually associated. The page input columns of "page number of the document to be printed" designate sections of printing data of changed parts by the inputted page numbers. The page input columns of "page number of the document to be replaced" designate the change target sections in the document before being changed 1 by the inputted page number. The page numbers inputted in the "page number of the document to be printed" and "page number of the document to be replaced" do not necessarily match. When there is only one page of the printing data of the changed part, or when the entire printing data of the changed parts is the replacement target, nothing has to be inputted in the page input columns of "page numbers of the document to be printed".

Here, as another designation method of the "page numbers of the document to be printed" by the printing section designating portion 21, combinations of the starting page numbers and ending page numbers of the printing data of the changed part may be designated, or the page number of the printing data of the changed parts (for the paper numbers, one number is set for one sheet) may be designated, or combinations of the starting paper numbers and the ending paper numbers of the printing data of the changed parts may be designated.

Here, when designating the page numbers, sometimes plural pages are set for one sheet of paper. When designated by the page number of printing data of the changed parts, the printing section designating portion 21 may also be configured to convert to the paper number corresponding to the page numbers. For example, when duplex printing is designated, two pages are printed on one sheet of paper. When conducting later-described comparison of leading end/trailing end detection-use documents and document replacement sheet-by-sheet, if the leading end/trailing end detection-use document has an odd page number, there is only data of the front side or back side of the sheet, so the printing section designating portion 21 corrects the number of sheets to be an even number that is one larger. As functions that print plural pages on one sheet, there are also N-Up printing and Pamphlet printing.

Each unit of the printing data generating unit 20 shown in FIG. 1 will be described in detail below.

First, the printing section designating portion 21 displays a user interface (hereinafter referred to as UI) for designating sections to be changed with respect to the document before being changed 1, so that the user can designate desired sections from this UI. Namely, the printing section designating portion 21 displays the UI shown in FIG. 2 and inputs the page numbers corresponding to a changed section 0, a changed section 1, etc., displayed in the UI, whereby it can designate, as a change target, the pertinent section in the document before being changed 1 shown in FIG. 1, and can designate the pertinent sections of the printing data corresponding to the changed parts.

The data generating portion 22 generates printing data that is transmitted to the printing unit 10 on the basis of document data created by an application not shown. At this time, the "page numbers of the document to be printed" and the "page numbers of the document to be replaced" designated by the printing section designating portion 21 are added to the printing data. The printing data transmitting portion 23 transmits the printing data created by the data generating portion 22 to the printing unit 10. The device I/F 24 is a communication interface for connecting to the printing unit 10 wiredly, wirelessly or via a network, and communicating with the printing unit 10.

Each portion of the printing unit 10 shown in FIG. 1 will be described in detail below.

The device I/F 11 is a communication interface for connecting to the printing data generating unit 20 wiredly, wirelessly or via a network, and communicating with the printing data generating unit 20. The printing data receiving portion 12 receives the printing data from the printing data generating unit 20 and transmits, to the document replacement processing portion 16, the "page numbers of the document to be printed" and the "page numbers of the document to be replaced" designated by the printing section designating portion 21. The printing data receiving portion 12 also transmits, to the document printing portion 13, the printing data corresponding to the received "page numbers of the document to be printed." The document printing portion 13 conducts printing on sheets of paper on the basis of the printing data transmitted from the printing data receiving portion 12.

The before-being-changed document feeding portion 14 is provided with a feeding tray for storing and feeding the document before being changed 1. The number-of-sheets counting portion 15 counts the number of sheets of the document before being changed 1 fed from the before-being-changed document feeding portion 14.

The document replacement processing portion 16 conducts replacement of corresponding places in the document before being changed 1 with the printing result printed by the document printing portion 13 (i.e., the document of changed parts) in accordance with the "page numbers of the document to be printed" and the "page numbers of the document to be replaced" from the printing data receiving portion 12.

Namely, the document replacement processing portion 16 determines whether or not the section of the number of sheets counted by the number-of-sheets counting portion 15 matches the "page numbers of the document to be replaced." For example, if page 1 to page 5 is designated in the "page numbers of the document to be printed" and page 5 to page 10 is designated in the "page numbers of the document to be replaced," the document replacement processing portion 16 determines that the section of the number of sheets counted by the number-of-sheets counting portion 15 matches the "page numbers of the document to be replaced" when the section is page 5 to page 10. When both match, the document replacement processing portion 16 instructs the document printing portion 13 to print the printing data (page 1 to page 5) of the changed part corresponding to the "page numbers of the document to be printed," and when both do not match, the document replacement processing portion 16 causes the document before being changed 1 to be discharged as is from the document printing portion 13, and, thus, the document replacement processing portion replaces, with a document (page 1 to page 5) of the changed part corresponding to the "page numbers of the document to be printed," only page 5 to page 10 of the document before being changed 1 that corresponds to the "page numbers of the document to be replaced". The result is discharged to the after-being-changed document discharge portion 19 as the document after being changed 3.

The printing paper feeding portion 17 is provided with a feeding tray for storing and feeding paper (ordinarily blank paper) for the document printing portion 13 to print a document of changed parts. The unnecessary document discharge portion 18 is provided with a discharge tray for discharging a document (unnecessary document 2) that has been replaced by changes with respect to the document before being changed 1 and become unnecessary. The after-being-changed document discharge portion 19 is provided with a discharge tray for discharging a document after being changed 3 where changed parts have been replaced with respect to the document before being changed 1.

According to the present embodiment, by designating sections that have been changed (i.e., sections to be printed) with respect to a before-being-changed document and by setting the before-being-changed document in the printer using a printer driver, the changed parts corresponding to the designated sections can be printed, and a document after being changed, the pertinent parts of which is replaced with the printing result, can be obtained.

In the document replacement processing portion 16, a discharge path where the document before being changed 1 does not pass through the document printing portion 13 during discharge process may also be separately disposed in addition to a discharge path where the document before being changed 1 passes through the document printing portion 13 without printing being conducted. By disposing a separate discharge path in this manner, the document printing portion 13 is not occupied during the discharge process of the document before being changed 1, and the discharge processing of the document before being changed 1 and the printing processing of the changed parts can be conducted in parallel. Thus, the replacement processing can be conducted efficiently.

In FIG. 1, first, the user places the document before being changed 1 in the before-being-changed document feeding portion 14. Next, the changed section is designated from the printing section designating portion 21. Namely, the user uses the user interface shown in FIG. 2 to designate the "page numbers of the document to be printed" and the "page numbers of the document to be replaced," and executes printing of the document data corresponding to the section of the "page numbers of the document to be printed." Printing data are created in the data generating portion 22 on the basis of the document data, and the printing data are transmitted from the printing data transmitting portion 23 to the printing unit 10.

In the printing unit 10, the printing data receiving portion 12 receives the printing data created by the data generating portion 22. The printing data receiving portion 12 transmits, to the document replacement processing portion 16, the "page numbers of the document to be printed" and the "page numbers of the document to be replaced" added to the printing data, and transmits the printing data to the document printing portion 13. After the document replacement processing portion 16 has received the "page numbers of the document to be printed" and the "page numbers of the document to be replaced," the document before being changed 1 is fed sheet-by-sheet from the before-being-changed document feeding portion 14.

The number-of-sheets counting portion 15 counts the number of sheets fed from the before-being-changed document feeding portion 14. When the section of the document before being changed 1 counted by the number-of-sheets counting portion 15 is different from the "page numbers of the document to be replaced," the document replacement processing portion 16 discharges the fed document before being changed 1 to the after-being-changed document discharge portion 19. For example, when page 5 to page 10 is designated as the "page numbers of the document to be replaced" and when the number-of-sheets counting portion 15 counts page 1 to page 4 of the document before being changed 1, the document replacement processing portion 16 discharges the fed document before being changed document 1 to the after-being-changed document discharge portion 19.

When the section of the document before being changed 1 being fed matches the "page numbers of the document to be replaced," the document replacement processing portion 16 determines that the fed document before being changed 1 is an unnecessary document and discharges it to the unnecessary document discharge portion 18. In this case, the document replacement processing portion 16 issues a printing request to the document printing portion 13 to print the printing data corresponding to the "page numbers of the document to be printed."

When there is a printing request from the document replacement processing portion 16, the document printing portion 13 prints the printing data of the pertinent parts on the sheets and delivers them to the document replacement processing portion 16. When the replacement processing portion 16 receives the printed sheets, it discharges the printed sheets to the after-being-changed document discharge portion 19. When printing of the changed parts have ended, the document printing portion 13 notifies the document replacement processing portion 16 that the printing has ended. When the document replacement processing portion 16 receives the notification that the printing has ended, it feeds the part of after having been stopped by the number-of-sheets counting portion 15 from the before-being-changed document feeding portion 14 and discharges the part to the after-being-changed document discharge portion 19.

In the present embodiment, the plural discharge trays of the unnecessary document discharge portion 18 and the after-being-changed document discharge portion 19 are disposed, but one discharge tray may also be disposed instead. However, when discharge is conducted to one discharge tray, it is necessary for the user to sort the document after being changed 3 and the unnecessary document 2, which takes a lot of effort. By disposing plural trays, as in the present embodiment, the document after being changed 3 can be easily retrieved.

As another embodiment of the first embodiment of the present invention, a configuration may also be used where a document replacement apparatus is separated from the printer (printing unit 10) shown in FIG. 1. By configuring the printing system of the present invention in this manner, document replacement processing can also be done easily with a conventional printer. This will be described with reference to FIG. 3.

Figure 3:
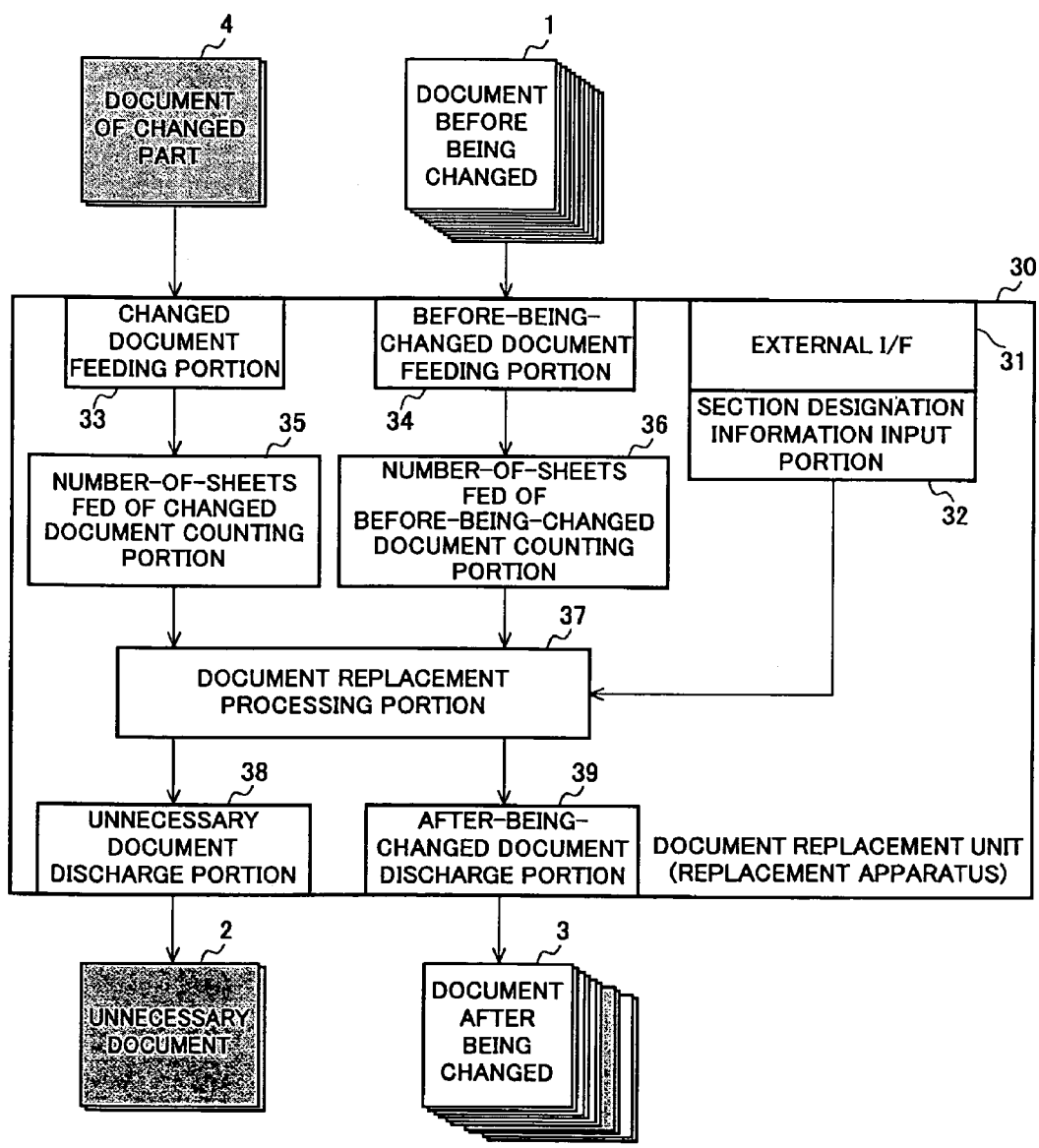
FIG. 3 is a block diagram showing a configuration example of a document replacement unit pertaining to a first embodiment of the present invention.

FIG. 3 is a block diagram showing a configuration example of a document replacement unit pertaining to the first embodiment of the present invention. In FIG. 3, reference numeral 30 represents the document replacement unit. The document replacement unit 30 (hereinafter referred to as document replacement apparatus 30) is configured with an external I/F 31, a section designation information input portion 32, a changed document feeding portion 33, a before-being-changed document feeding portion 34, a number-of-sheets fed of changed document counting portion 35, a number-of-sheets fed of before-being-changed document counting portion 36, a document replacement processing portion 37, an unnecessary document discharge portion 38, and an after-being-changed document discharge portion 39. The user prints, in advance, a document of the changed parts 4 with a printing apparatus not shown. The document before being changed 1 has been first printed/outputted and then stored.

In FIG. 3, the user places the printed document of the changed part 4 into the changed document feeding portion 33, and places and sets the document before being changed 1 into the before-being-changed document feeding portion 34. Of course, the user may place and set the document before being changed 1 and the document of the changed part 4 into one feeding tray, but it is necessary for the user to set these without error in consideration of the placement order. By dividing and setting the documents into plural feeding trays as in the present embodiment, the user does not make a mistake in the placement order.

The section designation information input portion 32 may be means with which the user inputs information for designating the "page numbers of the document to be printed" and the "page numbers of the document to be replaced" such that the user directly inputs/designates the information from a user interface or the like, or, for example, may be connected via a network to a PC provided with the printing data generating unit 20 such that the user inputs information for designating the "page numbers of the document to be printed" and the "page numbers of the document to be replaced" from an external PC or the like via the external I/F 31. The inputted information is transmitted from the section designation information input portion 32 to the document replacement processing portion 37.

When conducting designation of sections to be replaced, i.e., the "page numbers of the document to be printed" and the "page numbers of the document to be replaced," from the printer driver on the above PC, the above "page numbers of the document to be printed" and "page numbers of the document to be replaced" can be transmitted to the document replacement apparatus 30 at the same time as the output to the printing unit (printer) 10. Thus, it becomes unnecessary for the user to directly designate the "page numbers of the document to be printed" and the "page numbers of the document to be replaced" from the document replacement apparatus 30.

When the document replacement processing portion 37 has received the "page numbers of the document to be printed" and the "page numbers of the document to be replaced," it feeds the document before being changed 1 sheet-by-sheet from the before-being-changed document feeding portion 34. The number-of-sheets fed of before-being-changed document counting portion 36 counts the number of sheets of paper fed from the before-being-changed document feeding portion 34. The result is transmitted to the document replacement processing portion 37.

When the section of the document before being changed 1 counted by the number-of-sheets fed of before-being-changed document counting portion 36 is different from the "page numbers of the document to be replaced," the document replacement processing portion 37 discharges the fed document before being changed 1 to the after-being-changed document discharge portion 39. For example, if page 5 to page 10 is designated as "page numbers of the document to be replaced" and page 1 to page 4 of the document before being changed 1 is counted, the document replacement processing portion 37 discharges the fed document before being changed to the after-being-changed document discharge portion 39.

When the section of the document before being changed 1 being fed matches the "page numbers of the document to be replaced," the document replacement processing portion 37 determines that the fed document before being changed 1 is an unnecessary document and discharges it to the unnecessary document discharge portion 38. Next, the document replacement processing portion 37 feeds the document of the changed part 4 sheet-by-sheet from the changed document feeding portion 33. The number-of-sheets fed of changed document counting portion 35 counts the number of sheets of paper fed from the changed document feeding portion 33. The result is transmitted to the document replacement processing portion 37.

When the section (page numbers) of the document of the changed part 4 counted by the number-of-sheets fed of changed document counting portion 35 matches the "page numbers of the document to be printed," the document replacement processing portion 37 discharges the fed document of the changed part 4 to the after-being-changed document discharge portion 39. Next, the document replacement processing portion 37 feeds the part of after having been stopped by the number-of-sheets fed of before-being-changed document counting portion 36 from the before-being-changed document feeding portion 34 and discharges the part to the after-being-changed document discharge portion 39.

The document replacement apparatus 30 of the present embodiment has a configuration provided with the number-of-sheets fed of changed document counting portion 35 with respect also to the document of changed part 4, but when only one part of the document before being changed 1 is to be changed and the document of the changed part 4 comprises only one changed part, the document replacement apparatus 30 does not have to be provided with the number-of-sheets fed of changed document counting portion 35. In this case, when the section of the document before being changed 1 being fed matches the "page numbers of the document to be replaced," the document replacement processing portion 37 determines that the fed document before being changed 1 is an unnecessary document and discharges the fed before being changed 1 to the unnecessary document discharge portion 38, and the document replacement processing portion 37 feeds the document of the changed part 4 sheet-by-sheet from the changed document feeding portion 33 and discharges it to the after-being-changed document discharge portion 39.

Second Embodiment

Figure 4:
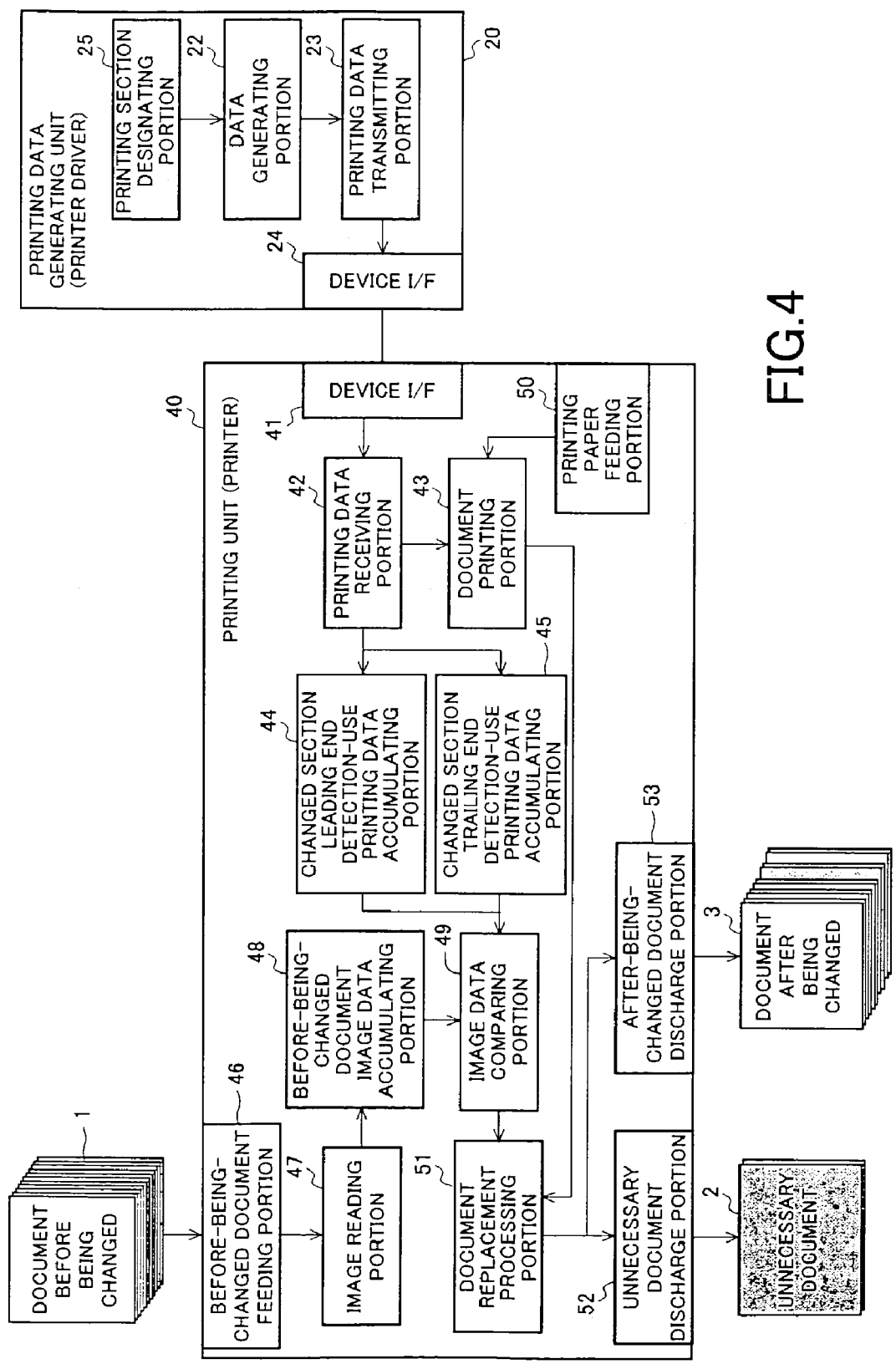
FIG. 4 is a block diagram showing a configuration example of a printing system pertaining to another embodiment of the present invention.

FIG. 4 is a block diagram showing a configuration example of a printing system pertaining to another embodiment of the present invention. The printing system includes a printing unit 40 that conducts printing on the basis of printing data and a printing data generating unit 20 that generates printing data and transmits the printing data to the printing unit 40. The printing unit 40 is, for example, a printer and is configured with a device I/F 41, a printing data receiving portion 42, a document printing portion 43, a changed section leading end detection-use printing data accumulating portion 44, a changed section trailing end detection-use printing data accumulating portion 45, a before-being-changed document feeding portion 46, an image reading portion 47, a before-being-changed document image data accumulating portion 48, an image data comparing portion 49, a printing paper feeding portion 50, a document replacement processing portion 51, an unnecessary document discharge portion 52, and an after-being-changed document discharge portion 53.

The printing data generating unit 20 is, for example, a printer driver on a personal computer (PC) and is configured with a printing section designating portion 25, a data generating portion 22, a printing data transmitting portion 23, and a device I/F 24. The second embodiment is one where a before-replacement printing document is compared with printing data including a part to which a change or the like has been added, whereby only a document of the part to which a change or the like has been added can be printed, and pertinent part of the before-replacement printing document is automatically replaced with the printing result of the part to which a change or the like has been added.

FIG. 5 is a diagram showing the corresponding relationship between a user interface displayed by the printing section designating portion 25 shown in FIG. 4 and after-being-changed printing data. FIG. 5(A) shows an example of the user interface displayed by the printing section designating portion 25, and FIG. 5(B) shows an example of after-being-changed printing data including printing data of a replacement (changed) part. The user interface shown in FIG. 5(A) is for designating sections of printing data of a changed part, printing data of a leading end detection-use document that precede the printing data of the changed part, and printing data of a trailing end detection-use document that is preceded by the printing data of the changed part in the printing data after being changed shown in FIG. 5(B). The user interface designates section of printing data of a changed section leading end detection-use document and section of printing data of a changed section trailing end detection-use document for each changed section, i.e., section (page numbers) of the printing data of the changed part.

Here, the section of the printing data of the changed section leading end detection-use document and the section of the printing data of the changed section trailing end detection-use document may be fixed values, such as "two sheets." Sometimes the detection rate rises if the number of sheets is increased, so in the present example, the number is optionally settable.

FIGS. 6 to 9 are diagrams for describing an example of a method for detecting changed sections from the document before being changed 1 pertaining to the second embodiment of the present invention. The present example will be described on the basis of the system configuration shown in FIG. 4 and the user interface shown in FIG. 5(A).

FIG. 6 is a diagram showing examples of the printed document before being changed 1 and printing data after being changed corresponding to the document after being changed 3. FIG. 6(A) shows the printed document before being changed 1, and FIG. 6(B) shows the printing data after being changed corresponding to the document after being changed 3. The printing document (document data) is changed with respect to the printed document before being changed 1 shown in FIG. 6(A), and printing data after being changed corresponding to the document after being changed 3 shown in FIG. 6(B) is created. In the present example, the "あいうえ" shown in FIG. 6(A) is changed to the "12345" shown in FIG. 6(B). It is assumed that in this state, the user designates changed section 0 as from page 06 to page 10, changed section leading end detection-use document as 3 pages and changed section trailing end detection-use document as 2 pages from the user interface shown in FIG. 5(A).

FIG. 7 is a diagram showing the state of printing data after being changed corresponding to the user interface shown in FIG. 5(A). By designating the changed section 0 as from page 06 to page 10, "12345" is designated as the printing data of the changed section, by designating 3 pages for the changed section leading end detection-use document, the changed section leading end detection-use printing data "CDE" is designated, and by designating 2 pages for the changed section trailing end detection-use document, the changed section trailing end detection-use printing data "XY" is designated.

Figure 8:
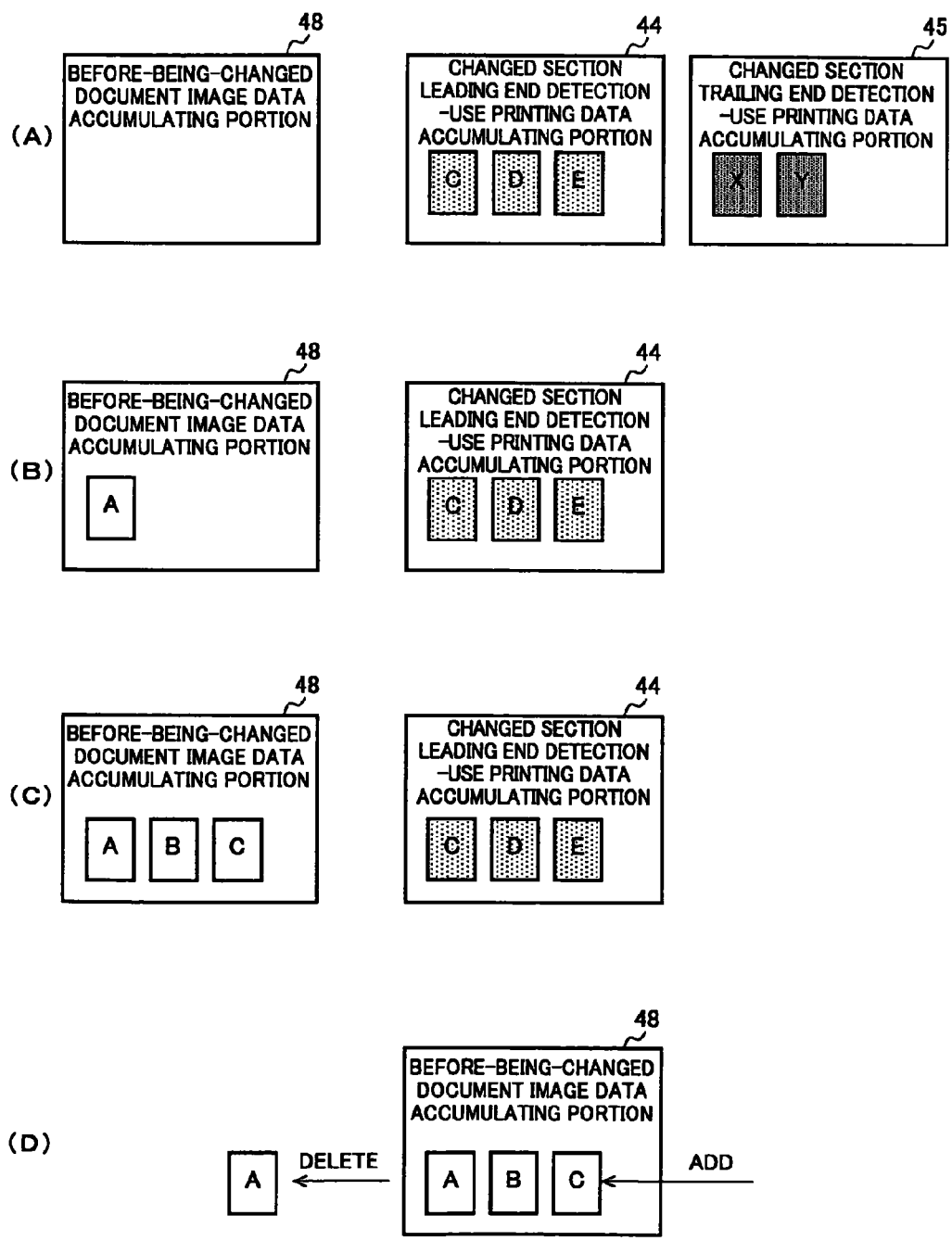
FIG. 8 is a diagram for describing an example of a method for detecting changed sections from a document before being changed.
Figure 9:
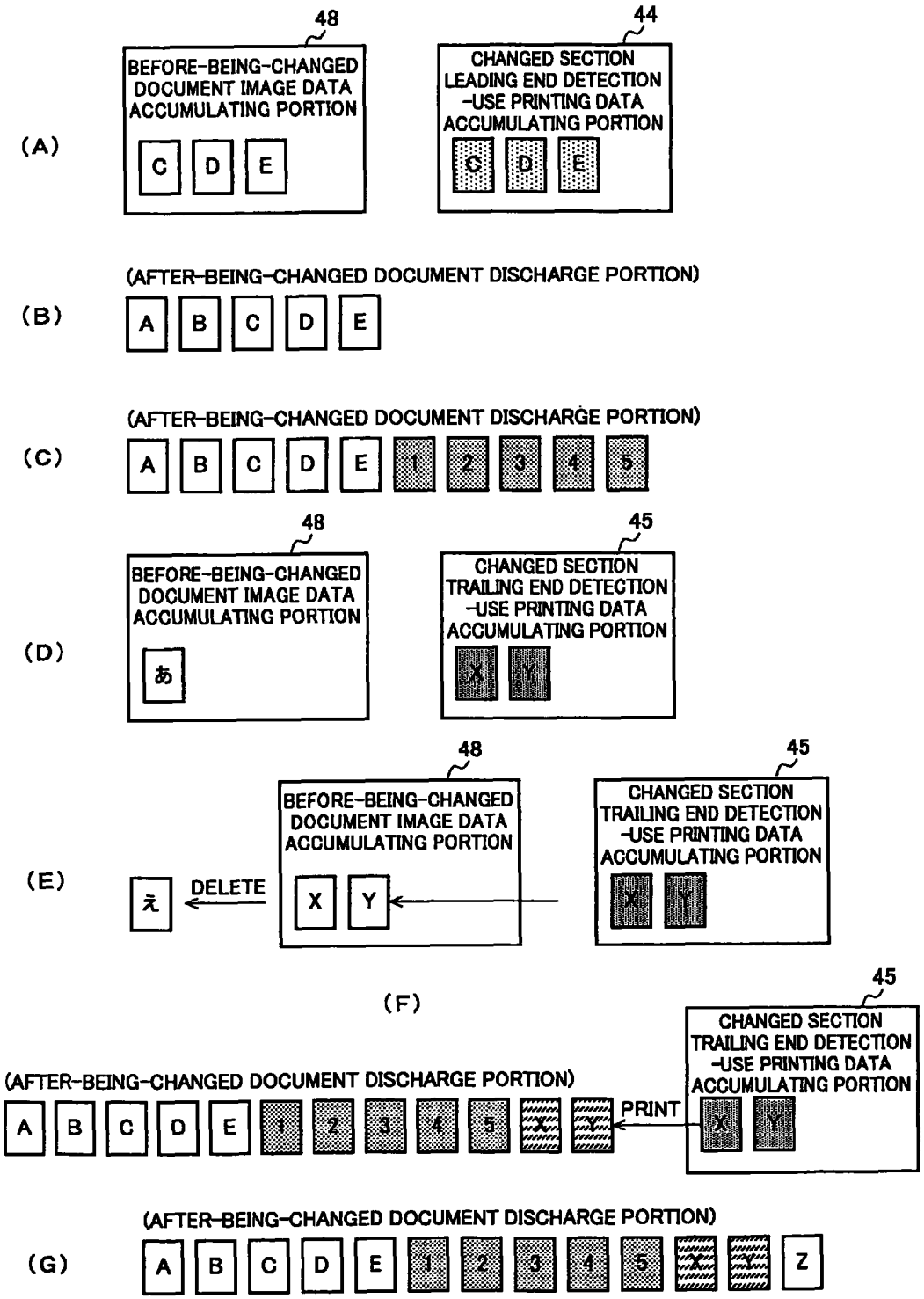
FIG. 9 is a diagram for describing the example of the method for detecting changed sections from a document before being changed and is a continuation of FIG. 8.

FIGS. 8 and 9 are diagrams for describing an example of a method for detecting the changed section from the document before being changed 1. In FIG. 8(A), the changed section leading end detection-use printing data "CDE" is accumulated in the changed section leading end detection-use printing data accumulating portion 44 of the printing unit 40 shown in FIG. 4, and the changed section trailing end detection-use printing data "XY" is accumulated in the changed section trailing end detection-use printing data accumulating portion 45. At this time, there is not yet any data in the before-being-changed document image data accumulating portion 48.

Next, in FIG. 8(B), one sheet (in the present example, "A" of document before being changed 1) is fed from the before-being-changed document feeding portion 46, and the fed paper is scanned by the image reading portion 47 and accumulated in the before-being-changed document image data accumulating portion 48. Next, in FIG. 8(C), data is accumulated in the before-being-changed document image data accumulating portion 48 until the number of pages of data accumulated in the before-being-changed document image data accumulating portion 48 matches the number of pages accumulated in the changed section leading end detection-use printing data accumulating portion 44. Here, "A," "B" and "C" are accumulated.

Next, in FIG. 8(D), when the numbers of pages of accumulated data match, as shown in FIG. 8(C), the data are compared. This comparison processing is conducted by the image data comparing portion 49. In the present example, because the data are different between "ABC" and "CDE," the image data comparing portion 49 determines that it is not the changed section. Moreover, one sheet "D" is fed from the before-being-changed document feeding portion 46. At this time, the number of pages in the before-being-changed document image data accumulating portion 48 matches the number of pages in the changed section leading end detection-use printing data accumulating portion 44. Therefore, the initially accumulated image data "A" is deleted from the image data accumulated in the before-being-changed document image data accumulating portion 48, the remaining image data "B" and "C" are pushed forward, and the image data "D" of the paper fed in this step is accumulated at the end of the image data.

Next, in FIG. 9(A), the image data comparing portion 49 similarly compares the image data "BCD," but because the data are different between "BCD" and "CDE," the image data comparing portion 49 determines that it is not the changed section. Moreover, when one sheet "E" is fed from the before-being-changed document feeding portion 46, "CDE" and "CDE" match. Next, in FIG. 9(B), when the data match, the document replacement processing portion 51 recognizes following fed paper as the change target. Thus, the document replacement processing portion 51 switches ON a replacement (changed) flag and deletes all of the image data accumulated in the before-being-changed document image data accumulating portion 48, and the paper fed up to this point is discharged to the after-being-changed document discharge portion 53.

Next, in FIG. 9(C), the printing data of the changed section shown in FIG. 7 is printed, and "12345" is discharged to the after-being-changed document discharge portion 53. "ABCDE12345" is discharged to the after-being-changed document discharge portion 53 at this time. Next, in FIG. 9(D), one sheet "あ" is fed from the before-being-changed document feeding portion 46, similarly scanned by the image reading portion 47, and accumulated in the before-being-changed document image data accumulating portion 48. Here, the image data comparing portion 49 compares the data accumulated in the before-being-changed document image data accumulating portion 48 with the image data of the changed section trailing end detection-use printing data accumulating portion 45. In FIG. 9(D), the numbers of pages are different and the comparison result also does not match.

Next, in FIG. 9(E), when the replacement flag is ON, the paper fed from the before-being-changed document feeding portion 46 is discharged to the unnecessary document discharge portion 52. When five sheets (い, う, え, X, Y) are sequentially fed after the state shown in FIG. 9(D) from the before-being-changed document feeding portion 46, the before-being-changed document image data accumulating portion 48 becomes the state shown in FIG. 9(E), and the data "XY" of the before-being-changed document image data accumulating portion 48 matches the image data "XY" of the changed section trailing end detection-use printing data accumulating portion 45.

Next, in FIG. 9(F), when it matches the image data of the changed section trailing end detection-use printing data accumulating portion 45, the replacement flag is switched OFF, and the changed section trailing end detection-use printing data "XY" is printed and discharged to the after-being-changed document discharge portion 53. Or, the fed documents "X" and "Y" may be discharged as is to the after-being-changed document discharge portion 53. Next, in FIG. 9(G), when paper feeding from the before-being-changed document feeding portion 46 is continued, the fed paper is discharged to the after-being-changed document discharge portion 53 because the replacement flag is switched OFF. Replacement ends when paper feeding becomes unable to be done from the before-being-changed document feeding portion 46 with no printing data to be printed.

Here, when the number of pages and page numbers are designated by the printing section designating portion 25, sometimes plural pages are set for one sheet of paper. When the number of pages and page numbers are designated by the number of pages of printing data of the changed parts, the section designating portion 21 may be configured to convert to paper numbers corresponding to the number of pages and page numbers. For example, when duplex printing is designated, two pages are printed on one sheet of paper. When comparison of the leading end/trailing end detection-use documents and document replacement are conducted sheet-by-sheet, if the leading end/trailing end detection-use documents have an odd page number, there is only data of the front side or back side of the sheet, so the printing section designating portion 21 corrects the number of sheets to be an even number that is one larger. As functions that print plural pages on one sheet, there are also N-Up printing and Pamphlet printing.

Figure 10:
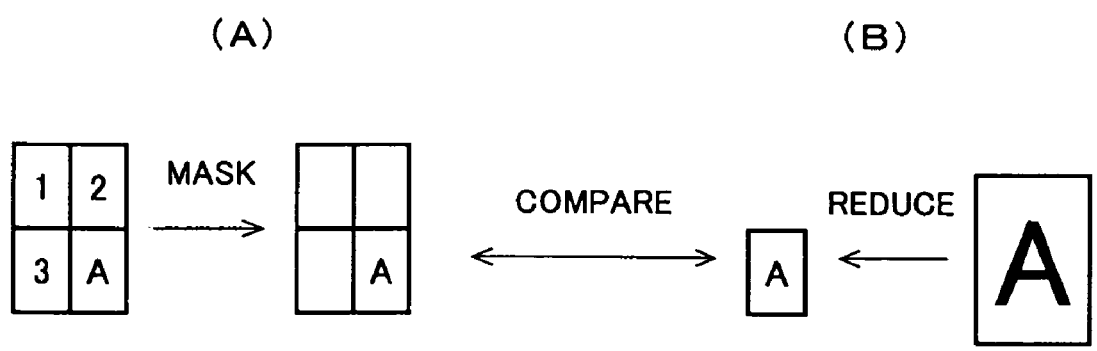
FIG. 10 is a diagram for describing an example of comparison processing between a document before being changed and printing data of changed parts in a case where plural pages are allocated to one sheet of paper and printed.

FIG. 10 is a diagram for describing an example of the comparison processing of the document before being changed 1 and printing data of the changed part when plural pages are allocated to one sheet of paper and printed. FIG. 10(A) shows the document before being changed 1 when plural pages are allocated to one sheet of paper and printed, and FIG. 10(B) shows the printing data of the changed part. When one page is designated as the leading end detection-use document, only the back side of the paper is used if duplex setting is done, and the lower right ¼ of the paper is used if 4-Up designation is made. As shown in FIG. 10(A), when the document before being changed 1 is 4-Up, when the number of pages of the leading end detection-use document is designated as 1, the image data is reduced to ¼ in the document before being changed 1, so when the image data are compared, the printing data are also reduced to ¼ and compared. Moreover, masking is done to the parts other than the page serving as the comparison target, and processing that separates the parts from the comparison target is conducted.

Figure 11:
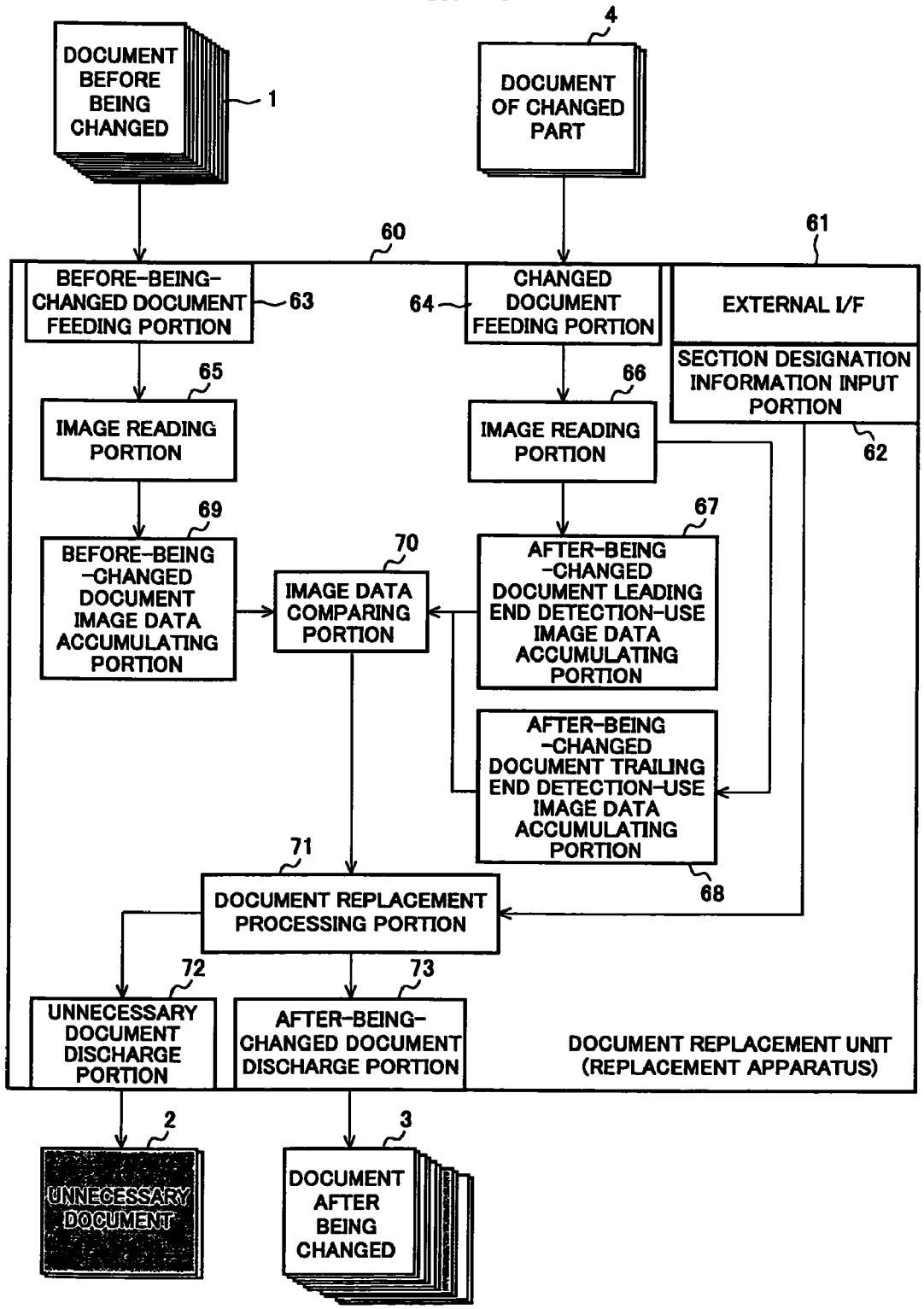
FIG. 11 is a block diagram showing a configuration example of a document replacement unit pertaining to a second embodiment of the present invention.

FIG. 11 is a block diagram showing a configuration example of a document replacement unit pertaining to the second embodiment of the present invention. In FIG. 11, reference numeral 60 represents the document replacement unit. The document replacement unit 60 (hereinafter referred to as document replacement apparatus 60) is configured with an external I/F 61, a section designation information input portion 62, a before-being-changed document feeding portion 63, a changed document feeding portion 64, image reading portions 65 and 66, an after-being-changed document leading end detection-use image data accumulating portion 67, an after-being-changed document trailing end detection-use image data accumulating portion 68, a before-being-changed document image data accumulating portion 69, an image data comparing portion 70, a document replacement processing portion 71, an unnecessary document discharge portion 72, and an after-being-changed document discharge portion 73. The user prints, in advance, a document of changed parts, a leading end detection-use document and a trailing end detection-use document as the document of the changed part 4 with a printing apparatus not shown. The document before being changed 1 has been first printed/outputted and then stored.

In FIG. 11, the user places the printed document of the changed part 4 into the changed document feeding portion 64, and places and sets the document before being changed 1 into the before-being-changed document feeding portion 63. Of course, the user may place and set the document before being changed 1 and the document of the changed part 4 into one feeding tray, but it is necessary for the user to set these without error in consideration of the placement order. By dividing and setting the documents into plural feeding trays as in the present embodiment, the user does not make a mistake in the placement order.

The section designation information input portion 62 may be means for the user to input information for designating the page numbers of the changed sections, the number of pages of the changed section leading end detection-use document and the number of pages of the changed section trailing end detection-use document such that the user directly inputs/designates the information from a user interface or the like, or, for example, may be connected via a network to a PC provided with the printing data generating unit 20 such that the user inputs the information from an external PC or the like via the external I/F 61. The inputted information is transmitted from the section designation information input portion 62 to the document replacement processing portion 71.

When the document replacement processing portion 71 receives the page numbers of the changed sections, the number of pages of the changed section leading end detection-use document and the number of pages of the changed section trailing end detection-use document, it feeds the document before being changed 1 sheet-by-sheet from the before-being-changed document feeding portion 63. The fed paper is read by the image reading portion 65 and accumulated in the before-being-changed document image data accumulating portion 69. The document of the changed part 4 is fed sheet-by-sheet from the changed document feeding portion 64. The image reading portion 66 reads the fed paper, accumulates the changed section leading end detection-use documents in the after-being-changed document leading end detection-use image data accumulating portion 67, and accumulates the changed section trailing end detection-use documents in the after-being-changed document trailing end detection-use image data accumulating portion 68. The image data comparing portion 70 conducts comparison processing with the method shown in FIGS. 6 to 9. On the basis of the comparison result, the unnecessary document 2 is discharged to the unnecessary document discharge portion 72, and the document after being changed 3 is discharged to the after-being-changed document discharge portion 73.

Third Embodiment

Figure 12:
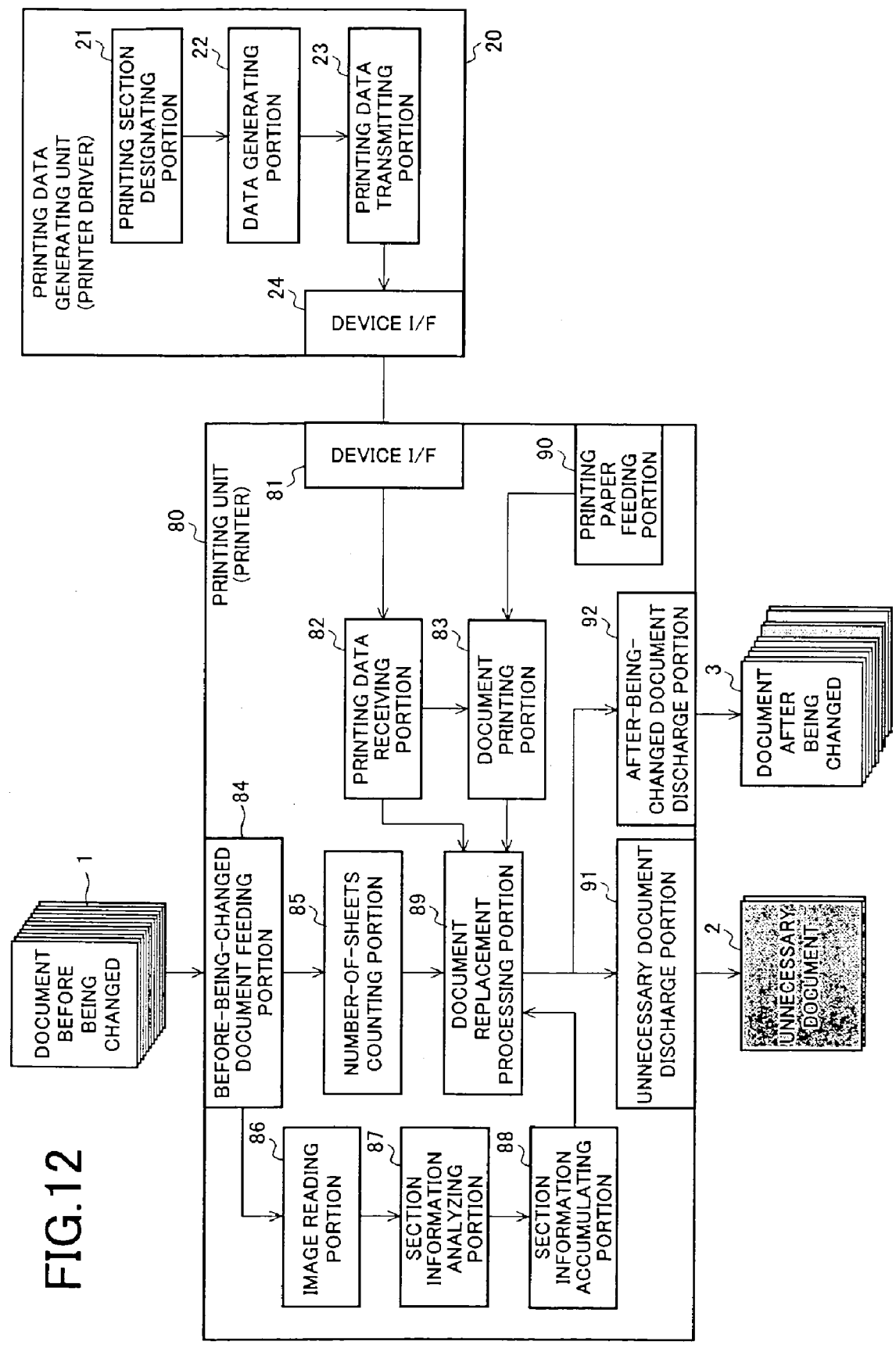
FIG. 12 is a block diagram showing a configuration example of a printing system pertaining to another embodiment of the present invention.

FIG. 12 is a block diagram showing a configuration example of a printing system pertaining to another embodiment of the present invention. The printing system includes a printing unit 80 that conducts printing on the basis of printing data and a printing data generating unit 20 that generates printing data and transmits the printing data to the printing unit 80. The printing unit 80 is, for example, a printer and is configured by a device I/F 81, a printing data receiving portion 82, a document printing portion 83, a before-being-changed document feeding portion 84, a number-of-sheets counting portion 85, an image reading portion 86, a section information analyzing portion 87, a section information accumulating portion 88, a document replacement processing portion 89, a printing paper feeding portion 90, an unnecessary document discharge portion 91, and an after-being-changed document discharge portion 92.

The printing data generating unit 20 is, for example, a printer driver on a personal computer (PC) and is configured with a printing section designating portion 26, a data generating portion 22, a printing data transmitting portion 23, and a device I/F 24. The third embodiment is one where section information of sections where replacement in a before-replacement printing document are conducted is acquired so that only a document of a part to which a change or the like has been added is printed, and pertinent part of the before-replacement printing document is automatically replaced with the printing result of the part to which a change or the like has been added.

FIG. 13 is a diagram showing the corresponding relationship between a user interface displayed by the printing section designating portion 26 shown in FIG. 12 and paper on which section information is described. FIG. 13(A) shows an example of the user interface displayed by the printing section designating portion 26, and FIG. 13(B) shows an example of the paper on which the section information is described. The user interface shown in FIG. 13(A) is for designating sections of the paper describing the section information shown in FIG. 13(B). The sections can be designated as a result of checking, by the user, checkboxes provided for each section of changed sections 1, 2, 3, 4, 5 and 6. The paper describing the section information shown in FIG. 13(B) may be paper of the document before being changed 1 included in the document before being changed 1, or may be paper disposed separately from the first page of the document before being changed 1. The document before being changed 1 is set in the before-being-changed document feeding portion 84 in a state where the paper describing the section information is disposed on top.

The information of the sections designated from the user interface shown in FIG. 13(A) is transmitted from the printing data transmitting portion 23 to the printing data receiving portion 82 of the printing unit 80, and transmitted from the printing data receiving portion 82 to the document replacement processing portion 89.

In FIG. 12, the image reading portion 86 reads the section information provided in the first page of the document before being changed 1 fed from the before-being-changed document feeding portion 84, and the section information analyzing portion 87 analyzes the read section information and accumulates the result in the section information accumulating portion 88. The number-of-sheets counting portion 85 counts the number of sheets of paper of the document before being changed 1 fed from the before-being-changed document feeding portion 84. The document replacement processing portion 89 identifies the page number of the pertinent sections from the information of the sections designated from the user interface shown in FIG. 13(A) and the section information accumulated in the section information accumulating portion 88, determines whether or not the sections of the number of sheets of paper counted by the number-of-sheets counting portion 85 matches the identified sections, instructs the document printing portion 83 to print the printing data of the changed parts corresponding to the sections when both match, and causes the document before being changed 1 to be discharged as is from the document printing portion 83 when both do not match, and replaces only the sections designated by the printing section designating portion 26 with the document of the changed parts.

Figure 14:
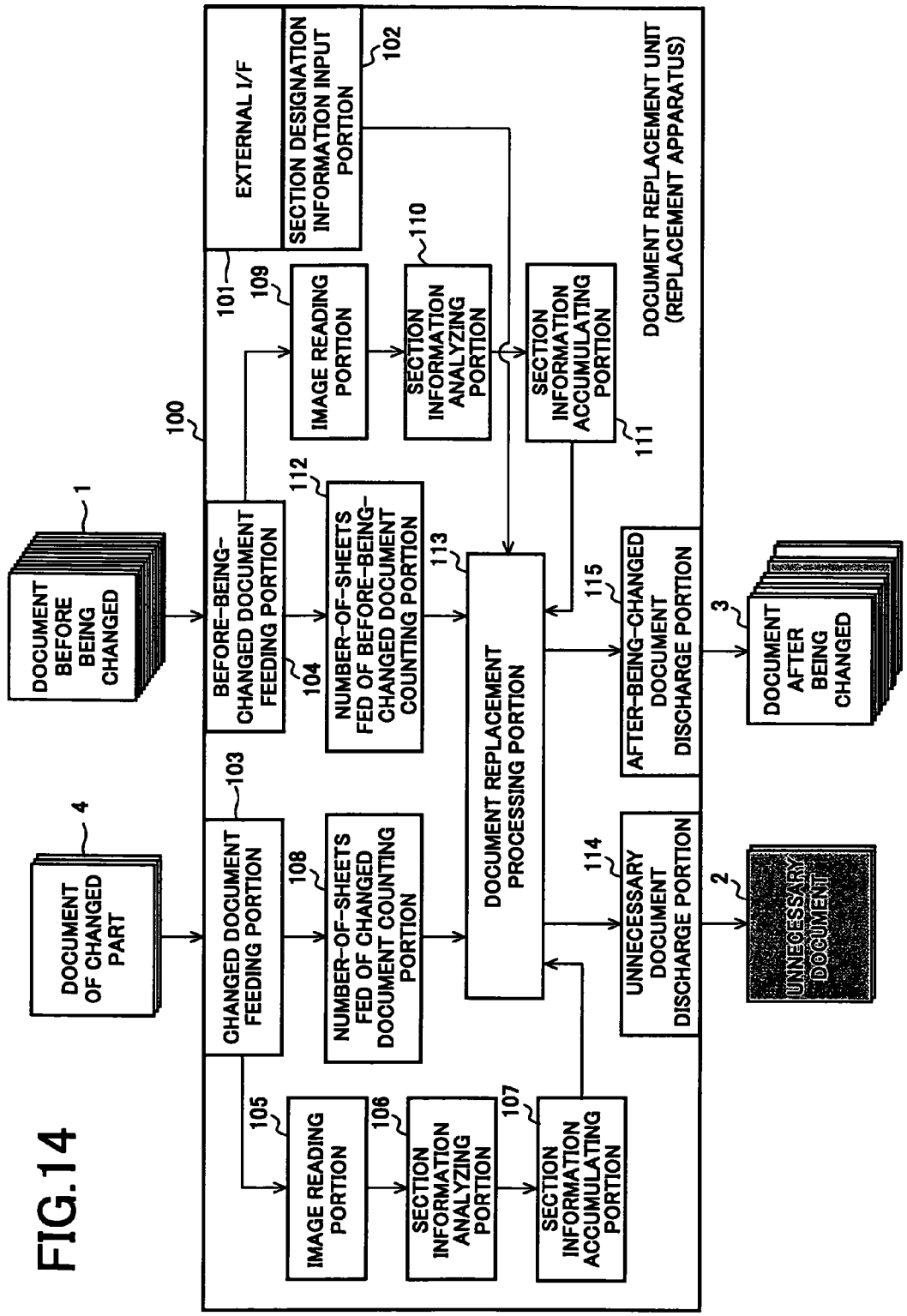
FIG. 14 is a block diagram showing a configuration example of a document replacement unit pertaining to a third embodiment of the present invention.

FIG. 14 is a block diagram showing a configuration example of a document replacement unit pertaining to the third embodiment of the present invention. In FIG. 14, reference numeral 100 represents the document replacement unit. The document replacement unit 100 (hereinafter referred to as document replacement apparatus 100) is configured with an external I/F 101, a section designation information input portion 102, a changed document feeding portion 103, a before-being-changed document feeding portion 104, an image reading portion 105, a section information analyzing portion 106, a section information accumulating portion 107, a number-of-sheets fed of changed document counting portion 108, an image reading portion 109, a section information analyzing portion 110, a section information accumulating portion 111, a number-of-sheets fed of before-being-changed document counting portion 112, a document replacement processing portion 113, an unnecessary document discharge portion 114, and an after-being-changed document discharge portion 115. The user prints the document of the changed part 4, in advance, with a printing apparatus not shown. The document before being changed 1 has been first printed/outputted and then stored.

In FIG. 13, the user places the printed document of the changed part 4 into the changed document feeding portion 103, and places and sets the document before being changed 1 into the before-being-changed document feeding portion 104. At this time, the paper describing the section information shown in FIG. 13(B) is set on the front of each document. The section designation information input portion 102 may be means with which the user inputs information for designating the section information such that the user directly inputs/designates the information from a user interface or the like, or, for example, may be connected via a network to a PC provided with the printing data generating unit 20 such that the user inputs the information from an external PC or the like via the external I/F 101. The inputted information is transmitted from the section designation information input portion 102 to the document replacement processing portion 113.

When the document replacement processing portion 113 receives the information of changed parts from the section designation information input portion 102, it feeds the document before being changed 1 sheet-by-sheet from the before-being-changed document feeding portion 104. At this time, the image reading portion 109 reads the section information of the first page, and the section information analyzing portion 110 analyzes the read section information and accumulates the result in the section information accumulating portion 111. The document of the changed part 4 is also fed sheet-by-sheet from the changed document feeding portion 103. At this time, the image reading portion 105 reads the section information of the first page, and the section information analyzing portion 106 analyzes the read section information and accumulates the result in the section information accumulating portion 107.

When the document replacement processing portion 113 receives the information of changed section from the section designation information input portion 102, it feeds the document before being changed 1 sheet-by-sheet from the before-being-changed document feeding portion 104. The number-of-sheets fed of before-being-changed document counting portion 112 counts the number of sheets of paper fed from the before-being-changed document feeding portion 104. The result is transmitted to the document replacement processing portion 113.

When the sections of the document before being changed 1 counted by the number-of-sheets fed of before-being-changed document counting portion 112 are different from the designated changed sections, the document replacement processing portion 113 discharges the fed document before being changed 1 to the after-being-changed document discharge portion 115.

When the sections of the document before being changed 1 being fed match the designated changed sections, the document replacement processing portion 113 determines that the fed document before being changed 1 is an unnecessary document and discharges it to the unnecessary document discharge portion 114. Next, the document replacement processing portion 113 feeds the document of the changed part 4 sheet-by-sheet from the changed document feeding portion 103. The number-of-sheets fed of changed document counting portion 108 counts the number of sheets of paper fed from the changed document feeding portion 103. The result is transmitted to the document replacement processing portion 113.

When the sections (page numbers) of the document of the changed part 4 counted by the number-of-sheets fed of changed document counting portion 108 matches the designated sections, the document replacement processing portion 113 discharges the fed document of the changed part 4 to the after-being-changed document discharge portion 115. Next, the document replacement processing portion 113 feeds the portion from the part that had been stopped by the number-of-sheets fed of before-being-changed document counting portion 112 from the before-being-changed document feeding portion 104 and discharges it to the after-being-changed document discharge portion 115.

The document replacement apparatus 100 of the present embodiment has a configuration provided with the number-of-sheets fed of changed document counting portion 108 with respect also to the changed part document 4, but when only one portion of the document before being changed 1 is to be changed and the document of the changed part 4 comprises one changed part, the document replacement apparatus 100 does not have to be provided with the number-of-sheets fed of changed document counting portion 108. In this case, when the sections of the document before being changed 1 being fed match the designated sections, the document replacement processing portion 113 determines that the fed document before being changed 1 is an unnecessary document and discharges the document before being changed 1 to the unnecessary document discharge portion 114, and the document replacement processing portion 113 feeds the document of the changed part 4 sheet-by-sheet from the changed document feeding portion 103 and discharges it to the after-being-changed document discharge portion 115.

A printing section designating portion may also be disposed in the printer (printing unit) described in each embodiment. By configuring the printing system in this manner, the designation and changing of replacement parts can be conducted from a display panel on the printer body, so that document replacement processing can be easily conducted. In this case, the printer (printing unit) of each embodiment is provided, in the printing unit, with a printing section designating portion and storage means (not shown) which stores the printing data of the replacement parts corresponding to the designated sections.

Figure 15A:
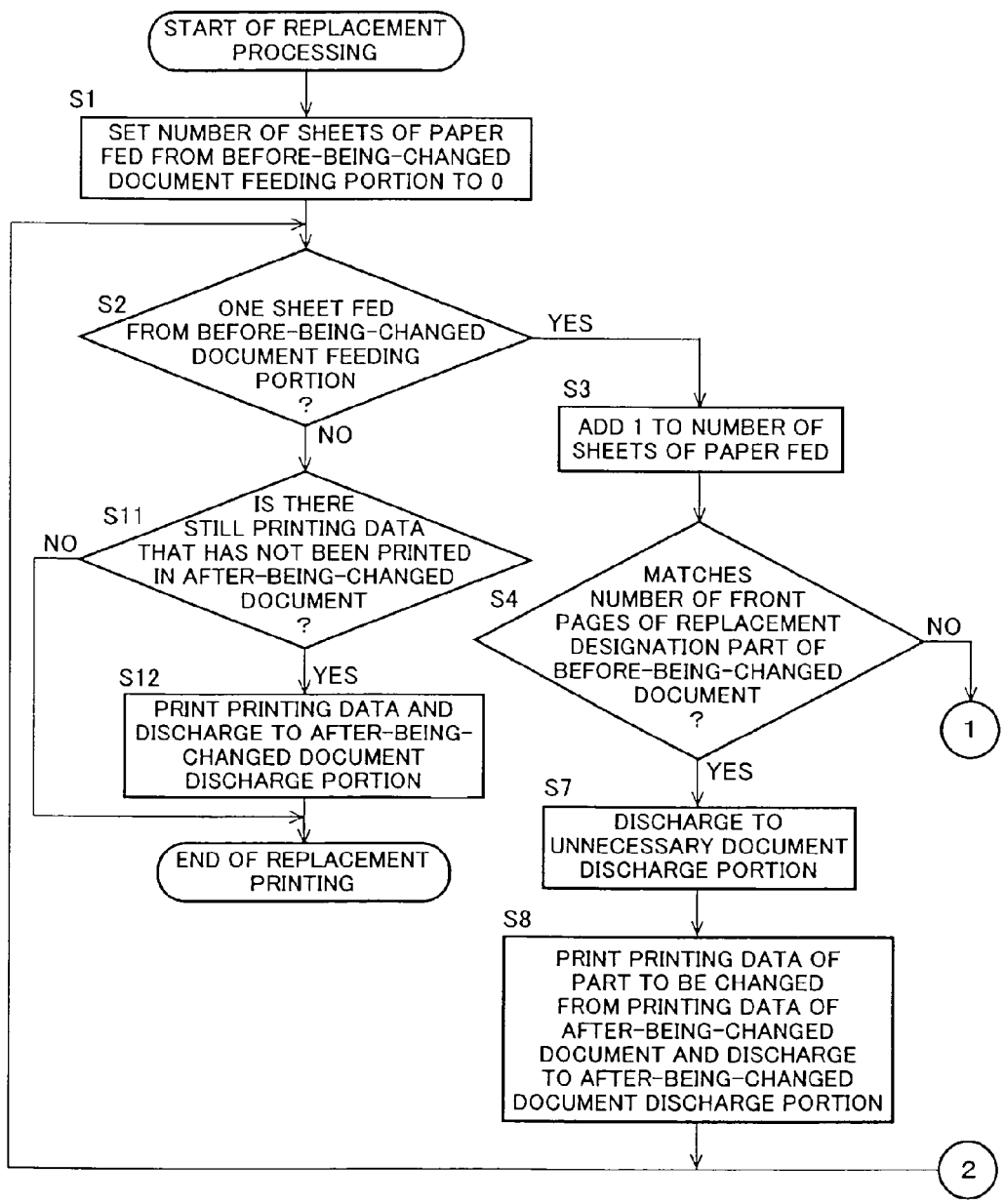
FIGS. 15A and 15B are flow charts for describing an example of the flow of document replacement processing to which the present invention is applied.
Figure 15B:
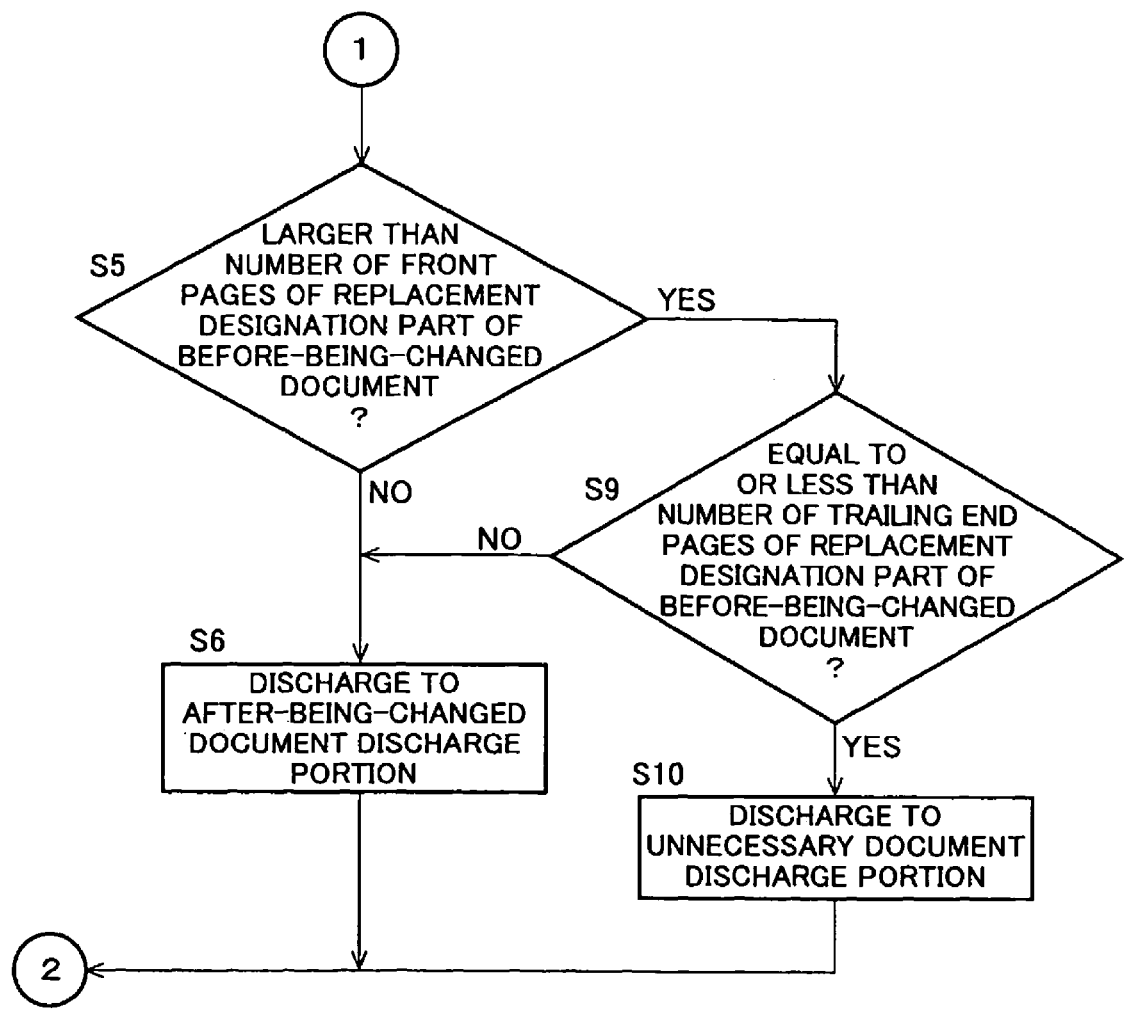

FIGS. 15A and 15B are flowcharts for describing an example of the flow of document replacement processing to which the present invention is applied. The present example will be described on the basis of the printing system shown in FIG. 1. First, the printing unit 10 sets the number of sheets of paper fed from the before-being-changed document feeding portion 14 to 0 (step S1), and determines whether one sheet has been fed from the before-being-changed document feeding portion 14 (step S2). When one sheet has been fed (when YES), the printing unit 10 adds 1 to the number of sheets of paper fed (step S3).

Next, the printing unit 10 determines whether or not the number of sheets fed matches the page number of the first page of the replacement designation part of the before-being-changed document (step S4). When it does not match the page number of the first page (when NO), the printing unit 10 determines whether it is larger than the page number of the first page of the replacement designation part of the before-being-changed document (step S5). When it is not larger than the page number of the first page (when NO), the printing unit 10 discharges the fed paper to the after-being-changed document discharge portion 19 (step S6). Then, the processing returns to step S2.

In step S4, when the number of sheets fed matches the page number of the first page (when YES), the printing unit 10 discharges it to the unnecessary document discharge portion 18 (step S7), prints the printing data of the portion to be changed from the printing data of the after-being-changed document, and discharges it to the after-being-changed document discharge portion 19 (step S8), and the processing returns to step S2. In step S5, when the number of sheets fed is larger than the page number of the first page (when YES), the printing unit 10 determines whether or not it is equal to or less than the page number of the trailing end page of the replacement designation part of the before-being-changed document (step S9). When it is not equal to or less than the page number of the trailing end page (when NO), the processing moves to step S6, and in the above step S9, when it is equal to or less than the page number of the trailing end page (when YES), the printing unit 10 discharges the fed paper to the unnecessary document discharge portion 18 (step S10), and the processing returns to step S2.

Next, in the above step S2, when no sheet has been fed (when NO), the printing unit 10 determines whether or not there is printing data that has not yet been printed in the after-being-changed document (step S11). When there is the printing data (when YES), the printing unit 10 prints that printing data and discharges printed paper to the after-being-changed document discharge portion 19 (step S20). In the above step S11, when there is no printing data (when NO), the processing ends as is.

Figure 16:
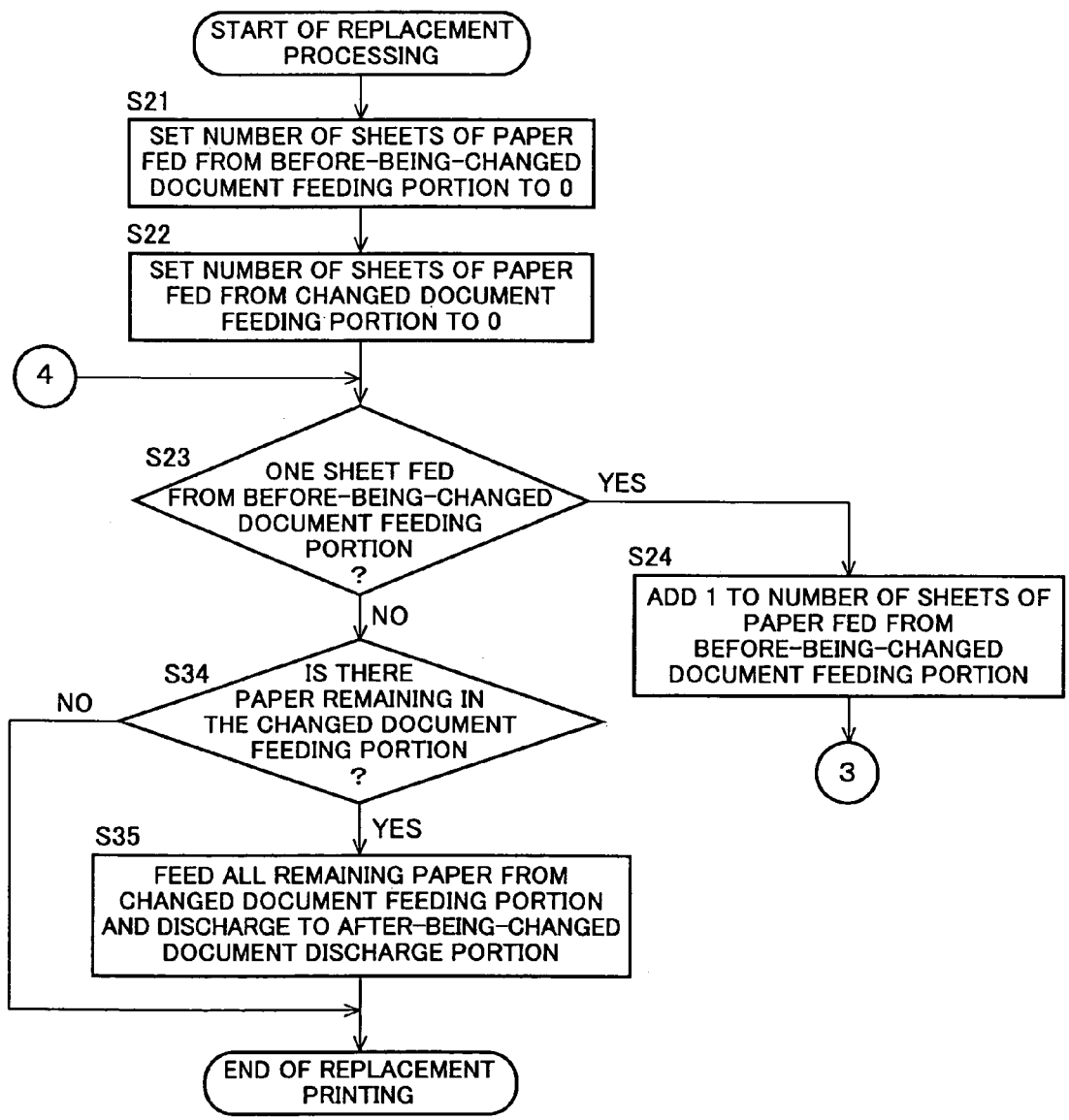
FIG. 16 is a flow chart for describing another example of the flow of the document replacement processing to which the present invention is applied.
Figure 17:
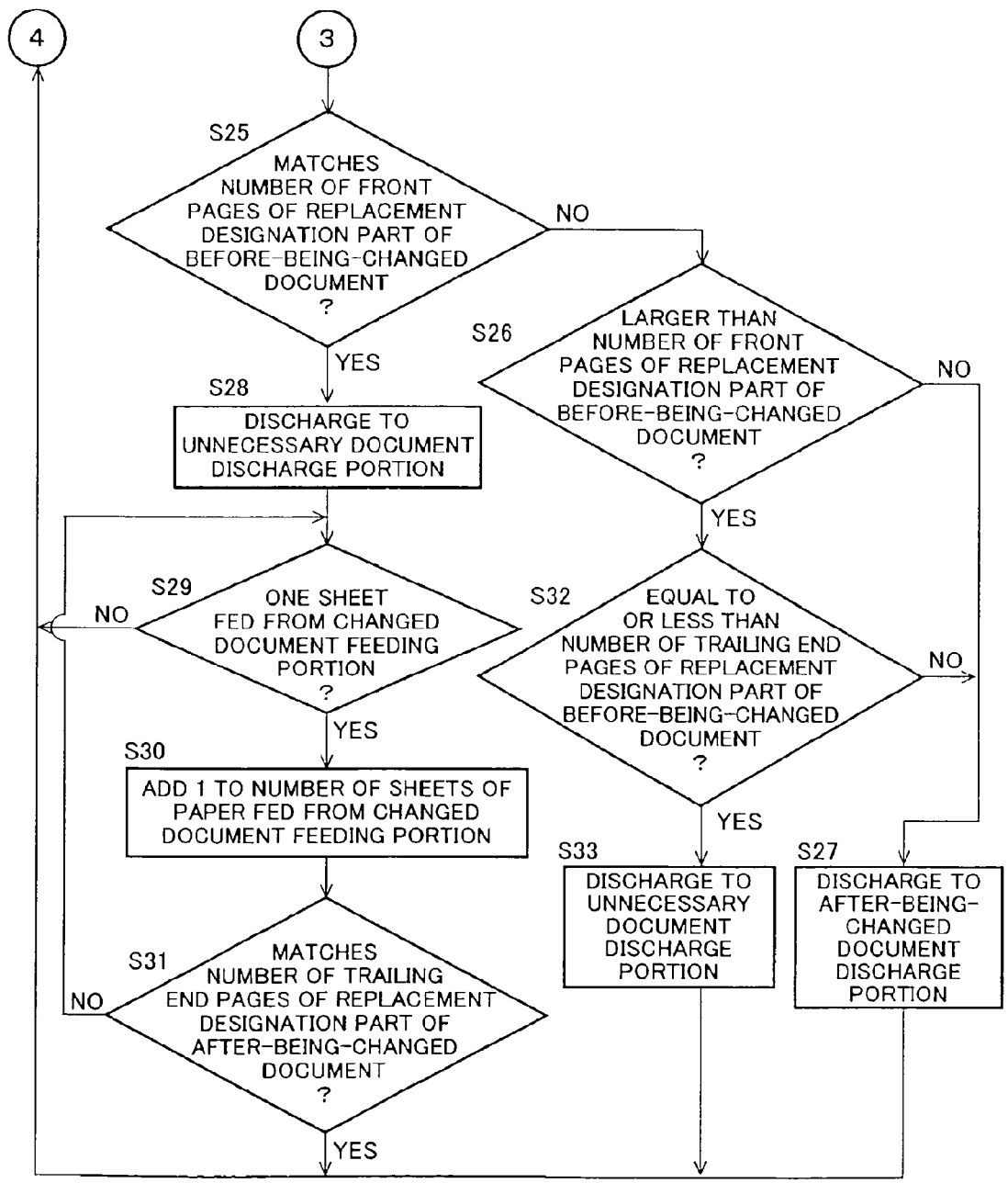
FIG. 17 is a flow chart for describing another example of the flow of the document replacement processing to which the present invention is applied, and is a continuation of the flow shown in FIG. 16.

FIGS. 16 and 17 are flow charts for describing another example of the flow of the document replacement processing to which the present invention is applied. The present example will be described on the basis of the document replacement apparatus 30 shown in FIG. 3. First, the document replacement apparatus 30 sets the number of sheets of paper fed from the before-being-changed document feeding portion 34 to 0 (step S21), sets the number of sheets of paper fed from the changed document feeding portion 33 to 0 (step S22), and determines whether one sheet has been fed from the before-being-changed document feeding portion 34 (step S23). When one sheet has been fed (when YES), the document replacement apparatus 30 adds 1 to the number of sheets of paper fed (step S24).

Next, the document replacement apparatus 30 determines Whether or not the number of sheets fed matches the page number of the first page of the replacement designation part of the before-being-changed document (step S25). When it does not match the page number of the first page (when NO), the document replacement apparatus 30 determines whether it is larger than the page number of the first page of the replacement designation part of the before-being-changed document (step S26). When it is not larger than the page number of the first page (when NO), the document replacement apparatus 30 discharges the fed paper to the after-being-changed document discharge portion 39 (step S27). Then, the processing returns to step S23.

In step S25, when the number of sheets fed matches the page number of the first page (when YES), the document replacement apparatus 30 discharges the fed paper to the unnecessary document discharge portion 38 (step S28), and determines whether one sheet has been fed from the changed document feeding portion 33 (step S29). When one sheet has been fed (when YES), the document replacement apparatus 30 adds 1 to the number of sheets of paper fed (step S30), and determines whether or not it matches the page number of the trailing end page of the replacement designation portion of the after-being-changed document (step S31). When it does not match the page number of the trailing end page (when NO), the processing returns to step S29, and when it does match the page number of the trailing end page (when YES), the processing returns to step S23. In the above step S29, when no sheet has been fed (when NO), the processing returns to step S23.

In step S26, when the number of sheets fed is larger than the page number of the first page (when YES), the document replacement apparatus 30 determines whether or not it is equal to or less than the page number of the trailing end page of the replacement designation part of the before-being-changed document (step S32). When it is not equal to or less than the number of trailing end pages (when NO), the processing moves to step S27, and in step S32, when it is equal to or less than the page number of the trailing end page, the document replacement apparatus 30 discharges the fed paper to the unnecessary document discharge portion 38 (step S33), and the processing returns to step S23.

Next, in the above step S23, when no sheet has been fed (when NO), the document replacement apparatus 30 determines whether or not there is still paper remaining in the changed document feeding portion 33 (step S34). When there is still paper remaining (when YES), the document replacement apparatus 30 feeds all of the remaining paper from the changed document feeding portion 33 and discharges it to the after-being-changed document discharge portion 39 (step S35). In the above step S34, when there is no paper remaining (when NO), the processing ends as is.

Figure 18:
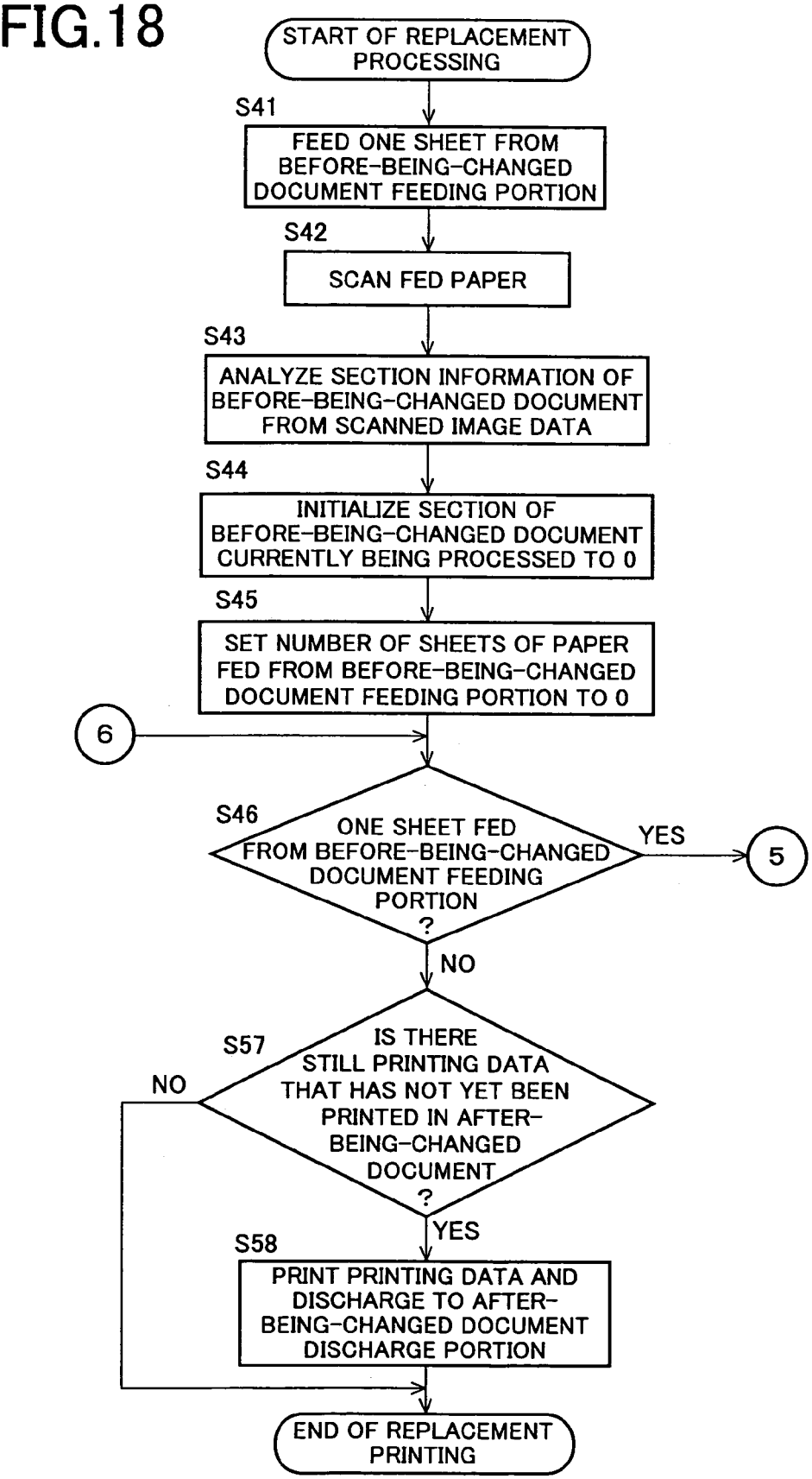
FIG. 18 is a flow chart for describing another example of the flow of the document replacement processing to which the present invention is applied.
Figure 19:
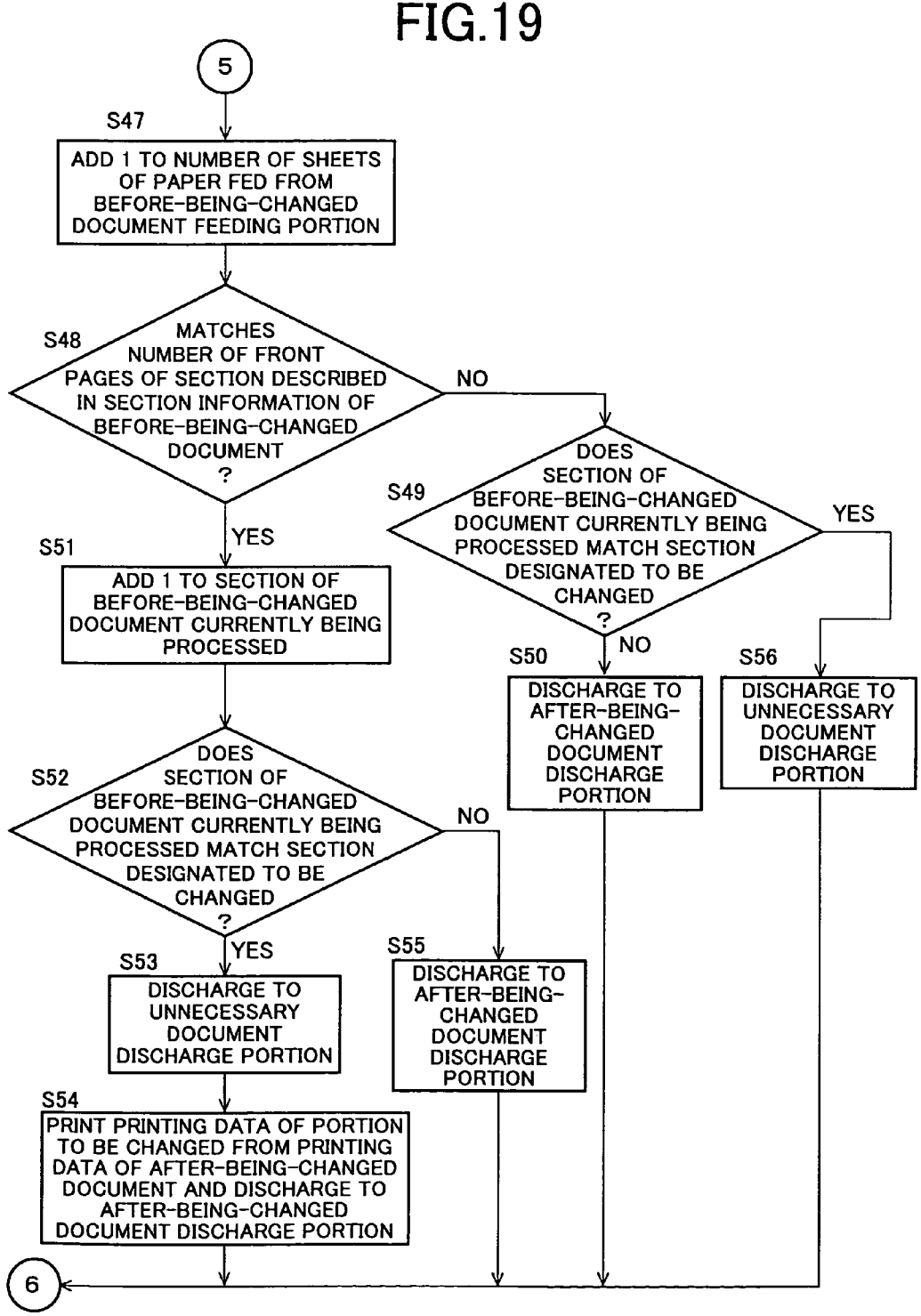
FIG. 19 is a flow chart for describing another example of the flow of the document replacement processing to which the present invention is applied, and is a continuation of the flow shown in FIG. 18.

FIGS. 18 and 19 are flow charts for describing another example of the flow of the document replacement processing to which the present invention is applied. The present example will be described on the basis of the printing system shown in FIG. 12. First, the printing unit 80 feeds one sheet of paper from the before-being-changed document feeding portion 84 (step S41), scans the fed paper (step S42), analyzes the section information of the before-being-changed document from the scanned image data (step S43), initializes the section of the before-being-changed document currently being processed to 0 (step S44), and sets the number of sheets of paper fed from the before-being-changed document feeding portion 84 to 0 (step S45).

Next, the printing unit 80 determines whether or not one sheet has been fed from the before-being-changed document feeding portion 84 (step S46). When one sheet of paper has been fed (when YES), the printing unit 80 adds 1 to the number of sheets of paper fed (step S47). Next, the printing unit 80 determines whether or not the number of sheets fed matches the page number of the first page of the section described in the section information of the before-being-changed document (step S48). When it does not match the page number of the first page (when NO), the printing unit 80 determines whether or not the section of the before-being-changed document currently being processed match the section designated to be changed (step S49). When the section does not match the section designated to be changed (when NO), the printing unit 80 discharges the fed paper to the after-being-changed document discharge portion 92 (step S50). Then, the processing returns to step S46.

In step S48, when the number of sheets fed matches the page number of the first page (when YES), the printing unit 80 adds 1 to the section of the before-being-changed document currently being processed (step S51), and determines whether or not the section of the before-being-changed document currently being processed matches the section designated to be changed (step S52). When the section does not match the section designated to be changed (when NO), the printing unit 80 discharges the fed paper to the after-being-changed document discharge portion 92 (step S55), and the processing returns to step S46. In step 52, when the section matches the section designated to be changed (when YES), the printing unit 80 discharges the fed paper to the unnecessary document discharge portion 91 (step S53), and prints the printing data of the part to be changed from the printing data of the after-being-changed document to discharge it to the after-being-changed document discharge portion 92 (step S54), and the processing returns to step S46. In step S49, when the section match the section designated to be changed (when YES), the printing unit 80 discharges fed sheet to the unnecessary document discharge portion 91 (step S56), and the processing returns to step S46.

Next, in step S46, when no sheet has been fed (when NO), the printing unit 80 determines whether or not there is printing data that has not yet been printed in the after-being-changed document (step S57). When there is the printing data (when YES), the printing unit 80 prints that printing data and discharges it to the after-being-changed document discharge portion 92 (step S58). In the above step S57, when there is no printing data (when NO), the processing ends as is.

Figure 20:
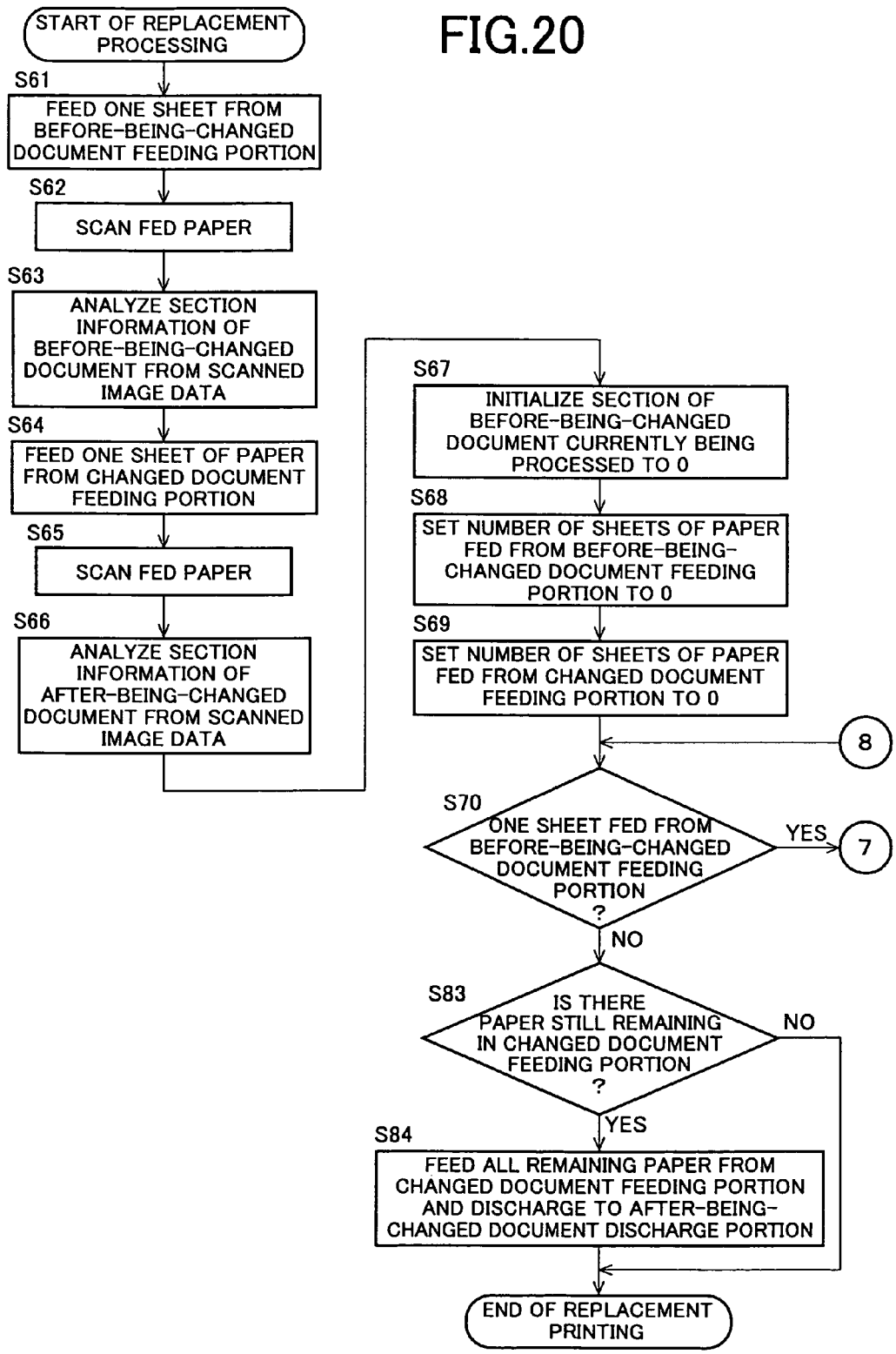
FIG. 20 is a flow chart for describing another example of the flow of the document replacement processing to which the present invention is applied.
Figure 21:
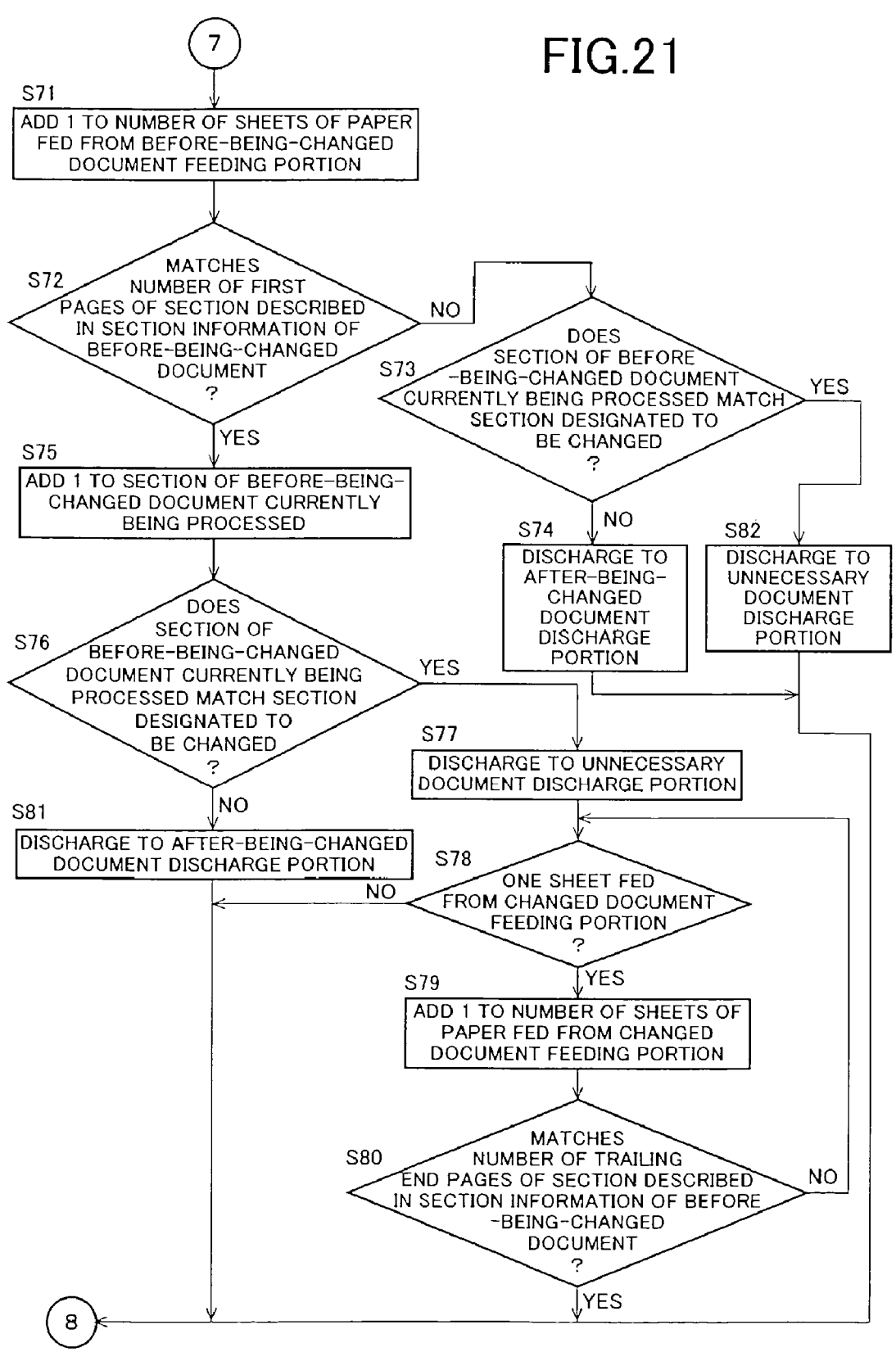
FIG. 21 is a flow chart for describing another example of the flow of the document replacement processing to which the present invention is applied, and is a continuation of the flow shown in FIG. 20.

FIGS. 20 and 21 are flow charts for describing another example of the flow of the document replacement processing to which the present invention is applied. The present example will be described on the basis of the document replacement apparatus 100 shown in FIG. 14. First, the document replacement apparatus 100 feeds one sheet of paper from the before-being-changed document feeding portion 104 (step S61), scans the fed paper (step S62), analyzes the section information of the before-being-changed document from the scanned image data (step S63), feeds one sheet of paper from the changed document feeding portion 103 (step S64), scans the fed paper (step S65), analyzes the section information of the after-being-changed document from the scanned image data (step S66), initializes the section of the before-being-changed document currently being processed to 0 (step S67), sets the number of sheets of paper fed from the before-being-changed document feeding portion 104 to 0 (step S68), and sets the number of sheets of paper fed from the changed document feeding portion 103 to 0 (step S69).

Next, the document replacement apparatus 100 determines whether or not one sheet has been fed from the before-being-changed document feeding portion 104 (step S70). When one sheet of paper has been fed (when YES), the document replacement apparatus 100 adds 1 to the number of sheets of paper fed (step S71). Next, the document replacement apparatus 100 determines whether or not the number of sheets fed matches the page number of the first page of the section described in the section information of the before-being-changed document (step S72). When it does not match the page number of first page (when NO), the document replacement apparatus 100 determines whether or not the section of the before-being-changed document currently being processed matches the sections designated to be changed (step S73). When the section does not match the section designated to be changed (when NO), the document replacement apparatus 100 discharges the fed sheet to the after-being-changed document discharge portion 115 (step S74), and the processing returns to step S70.

In step S72, when the number of sheets fed matches the page number of first page (when YES), the document replacement apparatus 100 adds 1 to the sections of the before-being-changed document currently being processed (step S75), and determines whether or not the section of the before-being-changed document currently being processed match the section designated to be changed (step S76). When the section does not match the section designated to be changed (when NO), the document replacement apparatus 100 discharges the fed paper to the after-being-changed document discharge portion 115 (step S81), and the processing returns to step S70. In step 76, when the section matches the section designated to be changed (when YES), the document replacement apparatus 100 discharges the fed paper to the unnecessary document discharge portion 114 (step S77), and determines whether or not one sheet has been fed from the changed document feeding portion 103 (step S78). When no sheet of paper has been fed (when NO), the processing returns to step S70, and when one sheet of paper has been fed (when YES), the document replacement unit 100 adds 1 to the number of sheets of paper fed (step S79), and determines whether or not it matches the page number of the trailing end page of the section described in the section information of the before-being-changed document (step S80). When it does not match the page number of the trailing end page (when NO), the processing returns to step S78, and when it matches the page number of the trailing end page (when YES), the processing returns to step S70.

In step S73, when the section matches the sections designated to be changed (when YES), the document replacement apparatus 100 discharges the fed sheet to the unnecessary document discharge portion 114 (step S82), and the processing returns to step S70.

In the above step S70, when no sheet has been fed (when NO), the document replacement apparatus 100 determines whether or not there is still paper remaining in the changed document feeding portion 103 (step S83). When there is still paper remaining (when YES), the document replacement apparatus 100 feeds all of the remaining paper from the changed document feeding portion 103 and discharges it to the after-being-changed document discharge portion 115 (step S84). In the above step S83, when there is no paper remaining (when NO), the processing ends as is.

Figure 23A:
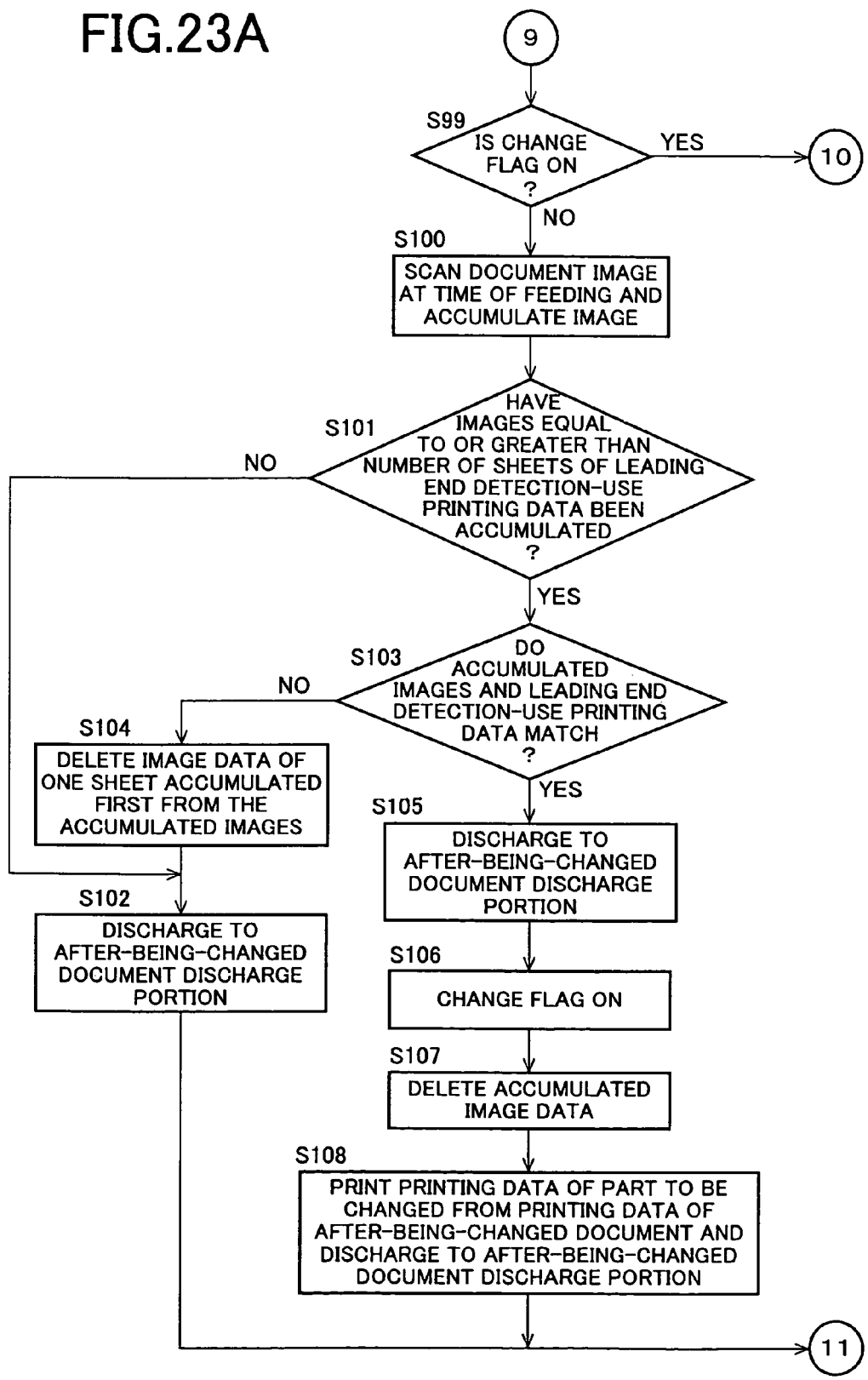

FIGS. 22, 23A and 23B are flow charts for describing another example of the flow of the document replacement processing to which the present invention is applied. FIGS. 23A and 23B are a continuation of the flow shown in FIG. 22. The present example will be described on the basis of the printing system shown in FIG. 4. First, the printing unit 40 sets the change flag to OFF (step S91) and determines whether or not the number of sheets of leading end detection-use printing data is 0 (step S92). When the number of sheets is not 0 (when NO), the printing unit 40 partially feeds (the number of sheets of leading end detection-use printing data– 1) sheet/sheets of paper (step S93), scans the document image at the time of feeding, accumulates the image data (step S94), and discharges the fed paper to the after-being-changed document discharge portion 53 (step S95).

In step S92, when the number of sheets is 0 (when YES), the printing unit 40 sets the change flag ON (step S96), prints the printing data of the part to be changed from the printing data of the after-being-changed document, and discharges the printed paper to the after-being-changed document discharge portion 53 (step S97). Next, the printing unit 40 determines whether or not one sheet has been fed from the before-being-changed document feeding portion 46 (step S98). When one sheet has been fed (when YES), the processing moves to step S99 shown in FIG. 23A. In step S98, when no sheet of paper has been fed (when NO), the printing unit 40 determines whether or not there is printing data that has not yet been printed in the after-being-changed document (step S119). When there is the printing data (when YES), the printing unit 40 prints that printing data and discharges the printed paper to the after-being-changed document discharge portion 53 (step S120). In the above step S119, when there is no printing data (when NO), the processing ends as is.

In FIG. 23A, at the above step S98, when one sheet has been fed from the before-being-changed document feeding portion 46 (when YES), the printing unit 40 determines whether or not the change flag is ON (step S99). When the change flag is not ON (when NO), the printing unit 40 scans the document image at the time of feeding, accumulates the image data (step S100), and determines whether or not images of equal to or greater than the number of sheets of leading end detection-use printing data have been accumulated (step S101). When the images have not been accumulated enough (when NO), the printing unit 40 discharges the fed paper to the after-being-changed document discharge portion 53 (step S102), and the processing returns to step S98 in FIG. 22. In the above step S101, when the images have been accumulated enough (when YES), the printing unit 40 determines whether or not the accumulated images and the leading end detection-use printing data match (step S103). When the images do not match (when NO), the printing unit 40 deletes the image data of one sheet first accumulated from the accumulated images (step 104), and the processing moves to step S102.

In step S103, when the images match (when YES), the printing unit 40 discharges the fed paper to the after-being-changed document discharge portion 53 (step S105), sets the change flag ON (step S106), deletes the accumulated image data (step S107), prints the printing data of the changed part from the printing data of the after-being-changed document, discharges the printed paper to after-being-changed document discharge portion 53 (step S108), and the processing returns to step S98 of FIG. 22.

Next, in step S99, when the change flag is ON (when YES), the printing unit 40 determines whether or not the number of sheets of trailing end detection-use printing data is 0 (step S109). When the number of sheets is 0 (when YES), the printing unit 40 discharges the fed paper to the unnecessary document discharge portion 52 (step S112) and the processing returns to step S98 of FIG. 22. In the above step S109, when the number of sheets is not 0 (when NO), the printing unit 40 scans the document image at the time of feeding, accumulates the image data (step S110), and determines whether or not images of equal to or greater than the number of sheets of trailing end detection-use printing data have been accumulated (step S111). When the images have not been accumulated enough (when NO), the printing unit 40 discharges the fed paper to the unnecessary document discharge portion 52 (step S112) and the processing returns to step S98 of FIG. 22. In the above step S111, when the images have been accumulated enough (when YES), the printing unit 40 compares the accumulated images with the trailing end detection-use printing data (step S113) and determines whether both match (step S114). When the images do not match (when NO), the printing unit 40 deletes the image data of one sheet first accumulated from the accumulated image data (step S115) and the processing moves to step S112.

In step S114, when the images match (when YES), the printing unit 40 switches the change flag OFF (step S116), prints the trailing end detection-use printing data, discharges the printed paper to the after-being-changed document discharge portion 53 (step S117), deletes the accumulated image data (step S118), and the processing returns to step S98.

Fourth Embodiment

Figure 24:
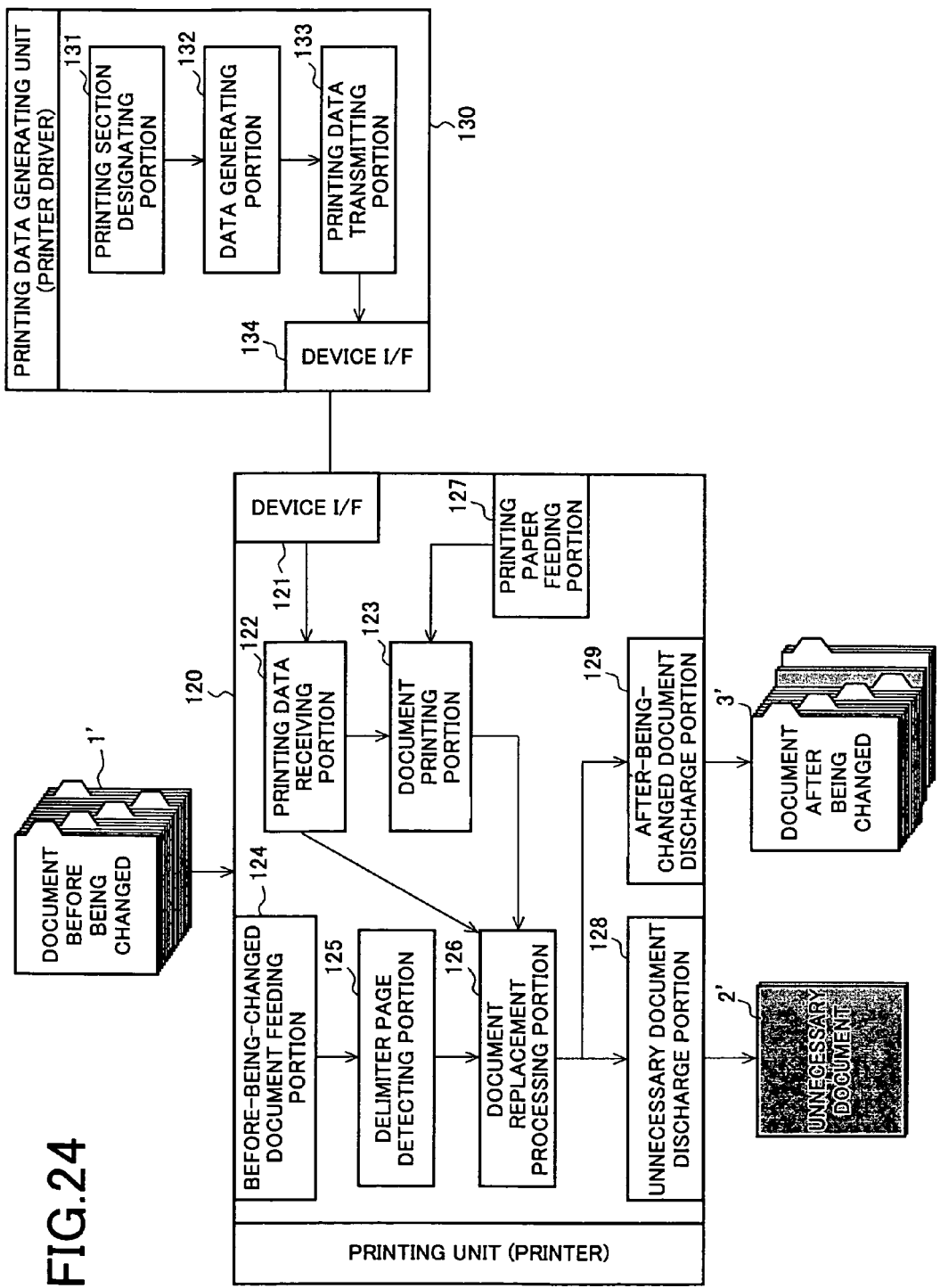
FIG. 24 is a block diagram showing a configuration example of a printing system pertaining to an embodiment of the present invention.

FIG. 24 is a block diagram showing a configuration example of a printing system pertaining to an embodiment of the present invention. The printing system includes a printing unit 120 that conducts printing on the basis of printing data and a printing data generating unit 130 that generates printing data and transmits the printing data to the printing unit 120. The printing unit 120 is, for example, a printer and is configured with a device interface (I/F) 121, a printing data receiving portion 122, a document printing portion 123, a before-being-changed document feeding portion 124, a delimiter page detecting portion 125, a document replacement processing portion 126, a printing paper feeding portion 127, an unnecessary document discharge portion 128, and an after-being-changed document discharge portion 129.

The printing data generating unit 130 is, for example, a printer driver on a personal computer (PC) and is configured with a printing section designating portion 131, a data generating portion 132, a printing data transmitting portion 133, and a device I/F 134. In FIG. 24, reference numeral 1' represents a printing document before being replaced including delimiter pages (hereinafter referred to as a document before being changed), reference numeral 2' represents an unnecessary document that has become unnecessary due to replacement with a printing document of a replacement part not shown (hereinafter referred to as a document of the changed part), and reference numeral 3' represents a document after being changed in which the pertinent part of the document before being changed 1' is replaced with the document of changed parts. In the present embodiment, the document serving as the replacement target will be described with taking a document to which changes or the like have been added as a representative example.

The PC provided with the printing data generating unit 130 is a general computer including a CPU that controls the entire apparatus, a storage device such as a RAM that is a semiconductor memory, a ROM or a HDD (hard disk drive), an input device, a display device, a communication device, an output device, and a system bus (not shown), and the printing data generating unit 130 (printer driver) is a program provided with setting functions relating to the printing of the printer (printing unit 120). The printer driver is installed in the storage device such as the HDD and functions on the operating system (OS) of the PC. The CPU reads the printer driver to the RAM that is an execution region, and as a result, the printing is executed.

The progress of the processing and the processing result are presented to an operator or the like through the display device, such as a CRT or LCD, and in each processing step, the operator inputs/designates necessary parameters from the input device, such as a keyboard or a mouse (pointing device). The communication device is a network interface for connecting to various communication networks, so that PCs can be accessibly connected. The output device is connected to an external device such as a printer and outputs data. The CPU, the RAM, the ROM, the storage device, the input device, the display device, the communication device, and the output device are interconnected via the system bus.

Here, the delimiter page is a place serving as a document delimiter, and is a sheet disposed in the document with the purpose of, for example, making it easier to understand the pages on which the chapters of the document begin when the document is configured with chapters. The delimiter page may be disposed by inserting, in front of the first page of each chapter, sheets of paper (colored paper, thick paper, index paper, etc.) that is different from the paper on which the entire document is printed, or by printing the first page of each chapter on such paper.

The document provided with the delimiter pages is divided by the delimiter pages into several document units. Below, the individual document units divided by the delimiter pages will be called sections. Because the number of sections is significantly less than the number of pages in the entire document, changed places can be more easily designated than by designating pages. Also, because the delimiter pages are printed on paper that is different from the paper of the document other than the delimiter pages, the delimiter pages in the document before being changed 1' can be easily discriminated, and replacement also becomes easy. In the present invention, only the places to which changes or the like have been added are printed in the above document unit, and replacement can be automatically done by designating the pertinent places in the before-being-changed document.

FIG. 25 is a diagram showing the corresponding relationship between a user interface displayed by the printing section designating portion 131 shown in FIG. 24 and the document before being changed 1'. FIG. 25(A) shows the user interface displayed by the printing section designating portion 131, and FIG. 25(B) shows the document before being changed 1' corresponding to the sections and delimiter pages displayed in the user interface.

Each unit of the printing data generating unit 130 shown in FIG. 24 will be described in detail below.

First, the printing section designating portion 131 displays a user interface (hereinafter referred to as UI) for designating sections to be changed with respect to the document before being changed 1', so that the user can designate desired sections from this UI. Namely, the printing section designating portion 131 displays the UI shown in FIG. 25(A) and the user checks checkboxes corresponding to section 0, delimiter page 1, section 1, and so on displayed in the UI, whereby the user can designate, as replacement targets, the pertinent sections and delimiter pages in the document before being changed 1' shown in FIG. 25(B). In this manner, just sections, just delimiter pages, or sections and delimiter pages can be designated as the replacement targets, so that replacement can be easily done when just the delimiter pages have been changed or when both the sections and the delimiter pages have been changed.

The data generating portion 132 generates printing data that is to be transmitted to the printing unit 120 on the basis of document data created by an application not shown. At this time, the "changed sections" designated by the printing section designating portion 131 are added to the printing data. The printing data transmitting portion 123 transmits the printing data created by the data generating portion 132 to the printing unit 120. The device I/F 134 is a communication interface for connecting to the printing unit 120 wiredly, wirelessly or via a network, and communicating with the printing unit 120.

Each unit of the printing unit 120 shown in FIG. 24 will be described in detail below.

The device I/F 121 is a communication interface for connecting to the printing data generating unit 130 wiredly, wirelessly or via a network, and communicating with the printing data generating unit 130. The printing data receiving portion 122 receives the printing data from the printing data generating unit 130 and transmits, to the document replacement processing portion 126, the "changed sections" information designated by the printing section designating portion 131. The printing data receiving portion 122 also transmits, to the document printing portion 123, the printing data corresponding to the received "changed sections." The document printing portion 123 conducts printing on paper on the basis of the printing data transmitted from the printing data receiving portion 122.

The before-being-changed document feeding portion 124 is provided with a feeding tray for storing and feeding the document before being changed 1'. The document before being changed 1' includes the aforementioned delimiter pages and is divided into plural sections by the delimiter pages. The delimiter page detecting portion 125 detects the delimiter pages from the document before being changed 1' fed from the before-being-changed document feeding portion 124. For the paper of the delimiter pages, paper is used, for example, whose color, thickness, size or form (e.g., using index paper or the like) is different from that of the paper of the document before being changed 1', so that the delimiter pages are detected by various sensors. Alternatively, the first pages of the sections (e.g., the first pages of the chapters) included in the document before being changed 1' may also serve as the delimiter pages by using paper whose thickness, size or form is different from that of the other paper.

The document replacement processing portion 126 conducts replacement of corresponding places in the document before being changed 1' with the printing result printed by the document printing portion 123 (i.e., the document of the changed part) in accordance with the "changed sections" information from the printing data receiving portion 122.

Namely, the document replacement processing portion 126 determines whether or not the section including the delimiter pages detected by the delimiter page detecting portion 125 match the "changed sections" information. For example, the numbers of the sections may be identified by methods such as counting the number of the delimiter pages detected by the delimiter page detecting portion 125. When both match, the document replacement processing portion 126 instructs the document printing portion 123 to print the printing data of the changed parts corresponding to the "changed sections." When both do not match, the document replacement processing portion 126 causes the document before being changed 1' to be discharged as is from the document printing portion 123 and replaces, with the document of the changed part, only the "changed sections" of the document before being changed 1'. The result, as the document after being changed 3', is discharged to the after-being-changed document discharge portion 129.

The printing paper feeding portion 127 is provided with a feeding tray for storing and feeding paper (ordinarily blank sheets) for the document printing portion 123 to print the document of the changed part. The unnecessary document discharge portion 128 is provided with a discharge tray for discharging a document (unnecessary document 2') that has been replaced by changes with respect to the document before being changed 1' and become unnecessary. The after-being-changed document discharge portion 129 is provided with a discharge tray for discharging document after being changed 3' where changed parts have been replaced with respect to the document before being changed 1'.

According to the present embodiment, by designating sections that have been changed (i.e., sections to be printed) with respect to a before-being-changed document and by setting the before-being-changed document in the printer using a printer driver, the changed parts corresponding to the designated sections can be printed, and an after-being-changed document, the pertinent part of which is replaced with the printing result, can be obtained.

In the document replacement processing portion 126, a discharge path where the document before being changed 1' does not pass through the document printing portion 123 during discharge processes may also be separately disposed in addition to a discharge path where the document before being changed 1' passes through the document printing portion 123 without printing being conducted. By disposing a separate discharge path in this manner, the document printing portion 123 is not occupied during the discharge process of the document before being changed 1', and the discharge processing of the document before being changed 1' and the printing processing of the changed parts can be conducted in parallel. Thus, the replacement processing can be conducted efficiently.

In FIG. 24, first, the user places the document before being changed 1' in the before-being-changed document feeding portion 124. Next, the user designates the "changed sections" from the printing section designating portion 131. Namely, the user uses the user interface shown in FIG. 25(A) to designate the "changed sections," and executes printing of the document data corresponding to the sections. Printing data are created in the data generating portion 132 on the basis of the document data, and the printing data are transmitted from the printing data transmitting portion 133 to the printing unit 120.

In the printing unit 120, the printing data receiving portion 122 receives the printing data created by the data generating portion 132. The printing data receiving portion 122 transmits, to the document replacement processing portion 126, the "changed sections" information added to the printing data, and transmits the printing data to the document printing portion 123. When the document replacement processing portion 126 receives the "changed section" information, it feeds the document before being changed 1' sheet-by-sheet from the before-being-changed document feeding portion 124.

The delimiter page detecting portion 125 discriminates whether or not the paper fed from the before-being-changed document feeding portion 124 is a delimiter page. When the paper is discriminated to be a delimiter page, the delimiter page detecting portion 125 transmits it to the document replacement processing portion 126. In the document replacement processing portion 126, the number of delimiter pages detected is counted. When the sections (here, calculated from the information of the number of detected delimiter pages) of the document before being changed 1' being fed are different from the "changed sections," the document replacement processing portion 126 discharges the fed document before being changed 1' to the after-being-changed document discharge portion 129. For example, when the third section has been designated as a "changed section," and when the first, second, and fourth sections have been fed, they are discharged to the after-being-changed document discharge portion 129.

When the sections of the document before being changed 1' being fed matches the "changed sections," the document replacement processing portion 126 determines that the fed document before being changed 1' is an unnecessary document and discharges it to the unnecessary document discharge portion 128. When the delimiter page detecting portion 125 detects the next delimiter page in a state where the sections of the document before being changed 1' being fed match the "changed sections," e.g., when the "changed section" is the third section and the delimiter page detecting portion 125 detects the delimiter page inserted between the third and fourth sections (i.e., the fourth delimiter page), the document replacement processing portion 126 issues a printing request to the document printing portion 123 without receiving the fourth delimiter page from the delimiter page detecting portion 125.

When there is a printing request from the document replacement processing portion 126, the document printing portion 123 prints the printing data of the pertinent parts on the paper and delivers them to the document replacement processing portion 126. When the printed paper is delivered from the document printing portion 123, the document replacement processing portion 126 discharges the printed paper to the after-being-changed document discharge portion 129. When printing of the changed parts has ended, the document printing portion 123 notifies the document replacement processing portion 126 that the printing has ended. When the document replacement processing portion 126 receives the notification that the printing has ended, it feeds the parts of after the fourth delimiter page that had been stopped by the delimiter page detecting portion 125 from the before-being-changed document feeding portion 124 and discharges the part to the after-being-changed document discharge portion 129.

In the present embodiment, the plural discharge trays of the unnecessary document discharge portion 128 and the after-being-changed document discharge portion 129 are disposed, but one discharge tray may also be disposed instead. However, when discharge is conducted to one discharge tray, it is necessary for the user to sort the document after being changed 3' and the unnecessary document 2', which takes a lot of effort. By disposing plural trays, as in the present embodiment, the document after being changed 3' can be easily retrieved.

Fifth Embodiment

The present embodiment is one where a document replacement apparatus is separated from the printer (printing unit 120) shown in FIG. 24. By configuring in this manner, document replacement processing can be easily done even with a conventional printer. This will be described below with reference to FIGS. 26 and 27.

Figure 26:
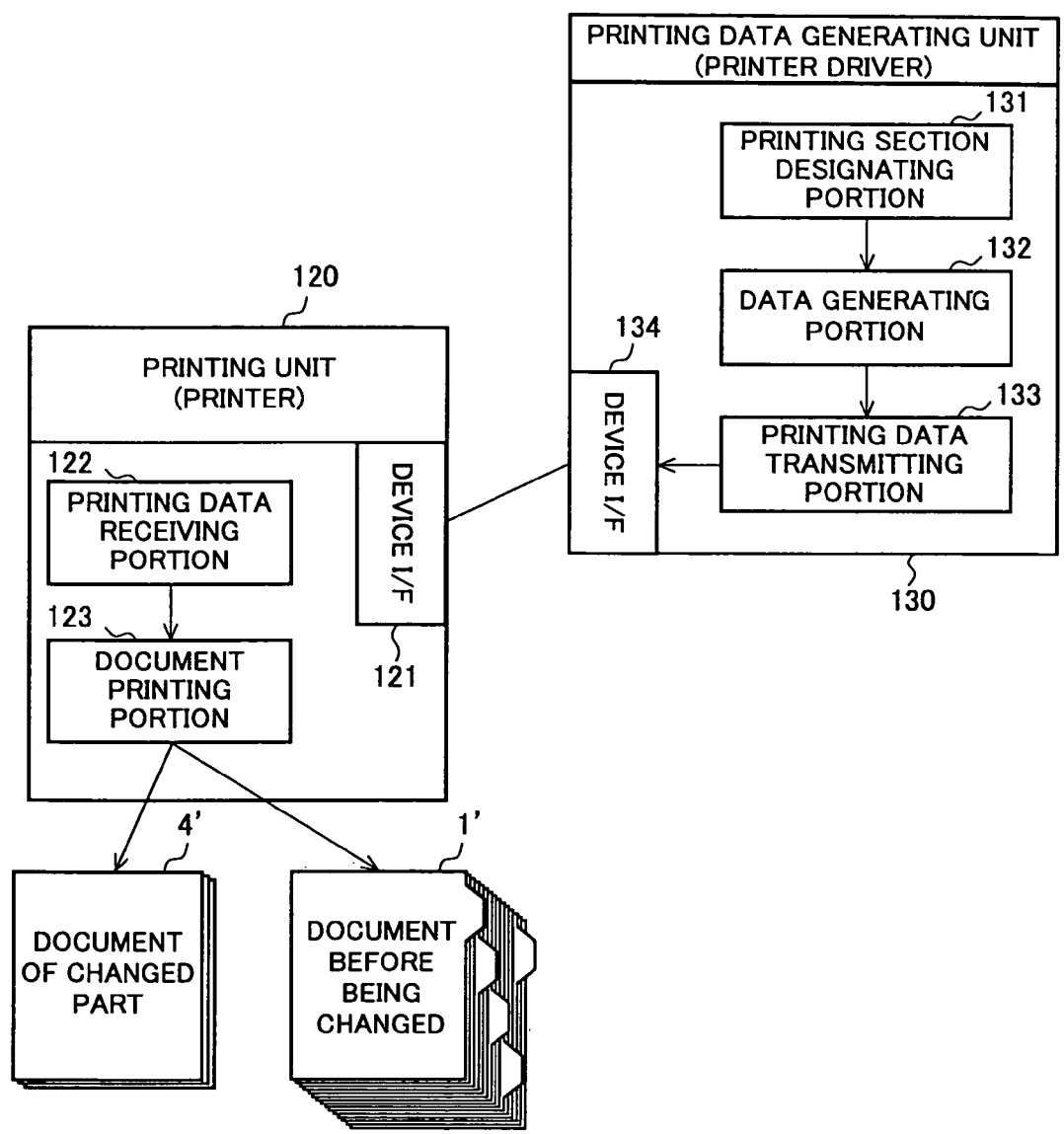
FIG. 26 is a block diagram showing a configuration example of a printing unit and a printing data generating unit pertaining to another embodiment of the present invention.

FIG. 26 is a block diagram showing a configuration example of the printing unit 80 and the printing data generating unit 130 pertaining to another embodiment of the present invention. The printing unit 120 is, for example, a printer and is configured with the device I/F 121, the printing data receiving portion 122, and the document printing portion 123. The printing data generating unit 130 is, for example, a printer driver on a personal computer (PC) and is configured with the printing section designating portion 131, the data generating portion 132, the printing data transmitting portion 133, and the device I/F 134. In FIG. 26, reference numeral 1' represents a printing document before replacement including delimiter pages (document before being changed), and reference numeral 4' represents a replacement part printing document (hereinafter referred to as a document of changed part).

Figure 27:
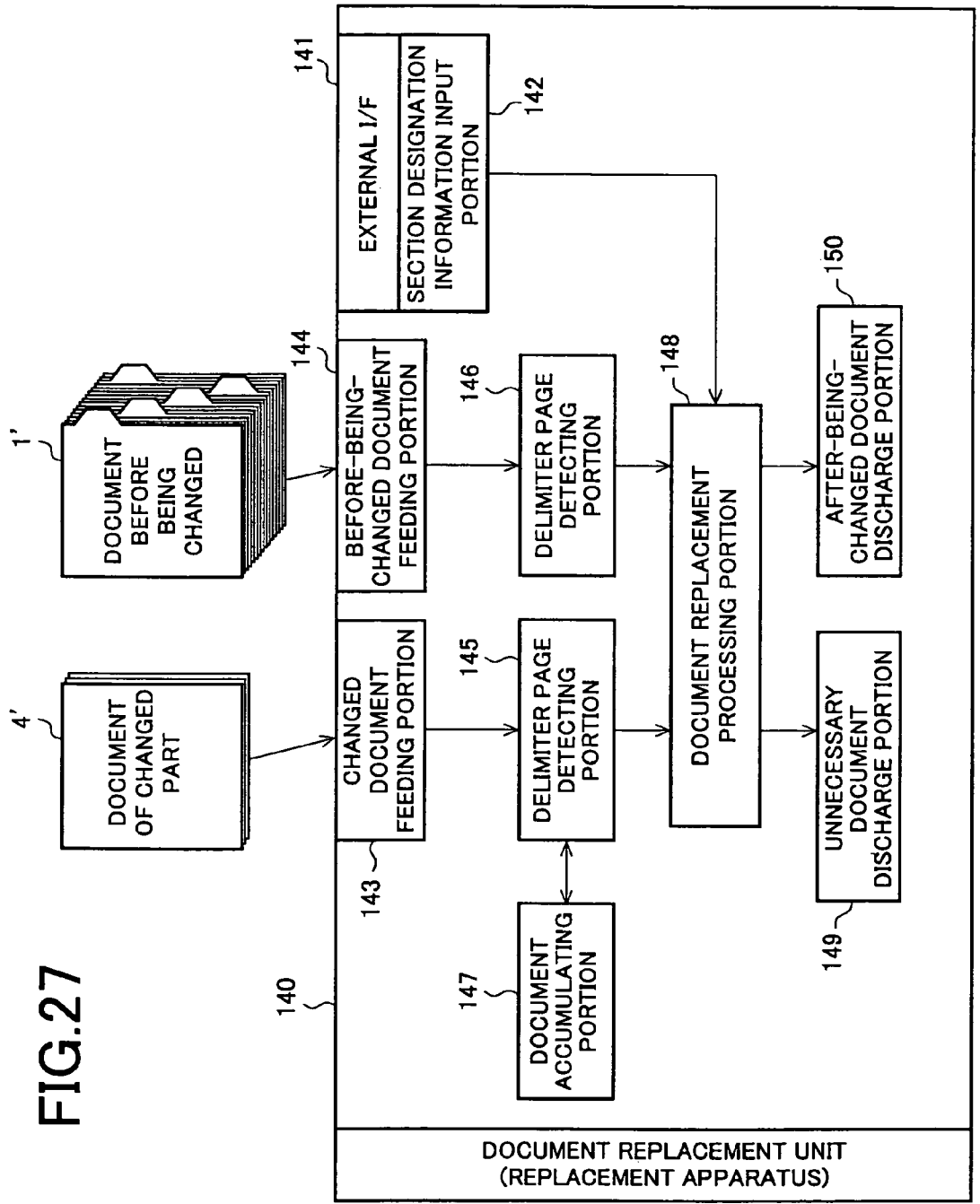
FIG. 27 is a block diagram showing the configuration example of a document replacement unit pertaining to another embodiment of the present invention.

FIG. 27 is a block diagram showing a configuration example of a document replacement unit pertaining to another embodiment of the present invention. In FIG. 27, reference numeral 140 represents the document replacement unit. The document replacement unit 140 (hereinafter referred to as the document replacement apparatus 140) is configured with an external I/F 141, a section designation information input portion 142, a changed document feeding portion 143, a before-being-changed document feeding portion 144, delimiter page detecting portions 145 and 146, a document accumulating portion 147, a document replacement processing portion 148, an unnecessary document discharge portion 149, and an after-being-changed document discharge portion 150.

In FIG. 26, the user designates the "changed sections" from the printing section designating portion 131 of the printing data generating unit 130. Namely, the user uses the user interface shown in FIG. 25(A) to designate the "changed sections" and executes printing of the document data corresponding to those sections. In the data generating portion 132, printing data are created on the basis of the document data, and the printing data are transmitted from the printing data transmitting portion 133 to the printing unit 120.

In the printing unit 120, the printing data receiving portion 122 receives the printing data created by the data generating portion 132. The printing data receiving portion 122 prints/outputs only the document of the changed part 4' corresponding to the sections on the basis of the "changed sections" information added to the printing data. The document before being changed 1' has been first printed/outputted and then stored.

In FIG. 27, the user places, to the changed document feeding portion 143, the document of the changed part 4' acquired from the printing unit 130 shown in FIG. 26, and places and sets the document before being changed 1' in the before-being-changed document feeding portion 144. Of course, the user may place and set the document before being changed 1' and the document of the changed part 4' into one feeding tray, but it is necessary for the user to set these without error in consideration of the placement order. By dividing and setting the documents into plural feeding trays as in the present embodiment, the user does not make a mistake in the placement order.

The section designation information input portion 142 may be means with which the user inputs information for designating the "changed sections" such that the user directly inputs/designates the information from a user interface or the like, or, for example, may be connectable, via a network, to a PC provided with the printing data generating unit 130 such that the user inputs information for designating the "changed sections" from an external PC or the like via the external I/F 141. The inputted "changed sections" information is transmitted from the section designation information input portion 142 to the document replacement processing portion 148.

When conducting designation of sections to be replaced, i.e., the "changed sections," from the printer driver on the PC, the "changed sections" information can be transmitted to the document replacement apparatus 140 at the same time as the output to the printing unit (printer) 120. Thus, it becomes unnecessary for the user to directly designate the "changed sections" from the document replacement apparatus 140.

As another embodiment, the section designation information input portion 142 may be provided with reading means which reads the paper on which the information for designating the "changed sections" has been printed, such that the reading means inputs the section designation information. For example, when the printing unit (printer) 120 is to print the printing data corresponding to the "changed sections," the section designation information shown in FIG. 25(A) is printed on the paper. Then, in the document replacement apparatus 140, when the printing document is placed in the feeding tray of the changed document feeding portion 143 or the before-being-changed document feeding portion 144, a sheet of paper on which the section designation information has been printed is set on top of that paper. The sheet of paper on which the section designation information has been printed is fed first, and the reading means of the section designation information input portion 142 reads the section designation information and inputs the "changed sections" information.

When the document replacement processing portion 148 receives the "changed section" information, it feeds the document before being changed 1' sheet-by-sheet from the before-being-changed document feeding portion 124. The delimiter page detecting portion 146 discriminates whether or not the paper fed from the before-being-changed document feeding portion 144 is a delimiter page. When the paper is discriminated to be a delimiter page, the delimiter page detecting portion 146 transmits it to the document replacement processing portion 148. In the document replacement processing portion 148, the number of delimiter pages detected is counted. When the sections (here, calculated from the information of the number of detected delimiter pages) of the document before being changed 1' being fed are different from the "changed sections," the document replacement processing portion 148 discharges the fed document before being changed 1' to the after-being-changed document discharge portion 150. For example, when the third section has been designated as a "changed section" and when the first, second, and fourth sections have been fed, they are discharged to the after-being-changed document discharge portion 150.

When the sections of the document before being changed 1' being fed match the "changed sections," the document replacement processing portion 148 determines that the fed document before being changed 1' is an unnecessary document and discharges it to the unnecessary document discharge portion 149. When the delimiter page detecting portion 146 detects the next delimiter page in a state where the sections of the document before being changed 1' being fed match the "changed sections," e.g., when the "changed section" is the third section and the delimiter page detecting portion 146 detects the delimiter page inserted between the third and fourth sections (i.e., the fourth delimiter page), the document replacement processing portion 148 conducts feeding from the changed document feeding portion 143 without receiving the fourth delimiter page from the delimiter page detecting portion 146.

The document replacement processing portion 148 discharges, to the after-being-changed document discharge portion 150, the document of the changed part 4' fed from the changed document feeding portion 143. Next, the document replacement processing portion 148 feeds the parts of after the fourth delimiter page that had been stopped by the delimiter page detecting portion 146 from the before-being-changed document feeding portion 144 and discharges the parts to the after-being-changed document discharge portion 150.

The document replacement apparatus 140 of the present embodiment is provided with the delimiter page detecting portion 145 and the document accumulating portion 147, and the document of the changed part 4' is set in a state where it includes the delimiter pages not shown regardless of whether it is changed or not changed (see later-described FIG. 33). This is for detecting the sections of the document of the changed part 4' with the delimiter pages. The delimiter page detecting portion 145 discriminates whether the sheets of the document of the changed part 4' fed from the changed document feeding portion 143 are delimiter pages. When the sheet of paper is discriminated to be a delimiter page, it is transmitted to the document replacement processing portion 148. The document accumulating portion 147 temporarily stores the delimiter pages fed from the changed document feeding portion 143. Because the delimiter pages included in the document of the changed part 4' double as the trailing ends of the changed sections, they are stored until the processing of the next section begins after they are fed at the end of the processing of the section.

Sixth Embodiment

The present embodiment is one where the printing section designating portion 131 is disposed in the printer (printing unit 120) shown in FIG. 24. By configuring the printing system in this manner, the designation and changing of replacement parts can be conducted from a display panel on the printer body, so that document replacement processing can be easily conducted. The printer (printing unit 120) of the present embodiment includes, in the printing unit 120 shown in FIG. 24, the printing section designating portion 131 and storage means (not shown) which stores the printing data of the replacement parts corresponding to the designated sections.

In FIG. 24, first, the user places the document before being changed 1' in the before-being-changed document feeding portion 124. Next, the user designates the "changed sections" from the printing section designating portion 131 of the printing unit 120. Namely, the user displays the user interface shown in FIG. 25(A) on the display panel of the printing unit 120 and designates the "changed sections." At this time, the printing data corresponding to those sections is retained in the storage means. When the document replacement processing portion 126 receives the "changed sections" information designated by the printing section designating portion 131, it feeds the document before being changed 1' sheet-by-sheet from the before-being-changed document feeding portion 124.

The delimiter page detecting portion 125 discriminates whether or not the paper fed from the before-being-changed document feeding portion 124 is a delimiter page. When the paper is discriminated to be a delimiter page, it is transmitted to the document replacement processing portion 126. In the document replacement processing portion 126, the number of delimiter pages detected is counted. When the sections (here, calculated from the information of the number of detected delimiter pages) of the document before being changed 1' being fed are different from the "changed sections," the document replacement processing portion 126 discharges the fed document before being changed 1' to the after-being-changed document discharge portion 129. For example, when the third section has been designated as a "changed section," and when the first, second, and fourth sections have been fed, they are discharged to the after-being-changed document discharge portion 129.

When the sections of the document before being changed 1' being fed match the "changed sections," the document replacement processing portion 126 determines that the fed document before being changed 1' is an unnecessary document and discharges it to the unnecessary document discharge portion 128. When the delimiter page detecting portion 125 detects the next delimiter page in a state where the sections of the document before being changed 1' being fed match the "changed sections," e.g., when the "changed section" is the third section and the delimiter page detecting portion 125 detects the delimiter page inserted between the third and fourth sections (i.e., the fourth delimiter page), the document replacement processing portion 126 issues, to the document printing portion 123, a request to print the printing data retained in the storage means without receiving the fourth delimiter page from the delimiter page detecting portion 125.

When there is a printing request from the document replacement processing portion 126, the document printing portion 123 prints the printing data of the pertinent parts on the paper and delivers this to the document replacement processing portion 126. When the printed paper is delivered from the document printing portion 123, the document replacement processing portion 126 discharges the printed paper to the after-being-changed document discharge portion 129. When printing of the changed parts has ended, the document printing portion 123 notifies the document replacement processing portion 126 that the printing has ended. When the document replacement processing portion 126 receives the notification that the printing has ended, it feeds the parts of after the fourth delimiter page that had been stopped by the delimiter page detecting portion 125 from the before-being-changed document feeding portion 124 and discharges the part to the after-being-changed document discharge portion 129.

FIG. 28 is a diagram showing an example of a delimiter page. In this example, index paper provided with a tab on one side serves as the delimiter page.

FIG. 29 is a diagram showing other examples of the delimiter pages. FIG. 29(A) shows an example where identification information, such as characters or images, are added to a specific region of a sheet of paper (e.g., the first page of each chapter) included in the document before being changed 1. The delimiter page detecting portion 125 detects whether or not the paper is a delimiter page on the basis of the presence or absence of the identification information. In this case, the identification information may be printed on the paper included in the document before being changed 1', so that it becomes unnecessary to use special paper as the delimiter page. FIG. 29(B) shows an example where identification information is added to paper whose size and form are different from those of the paper of the document before being changed 1'.

In this manner, the paper of the delimiter pages may be configured with paper whose color, thickness, size, or form is different from that of the paper of the document before being changed 1'. The delimiter page detecting portion 125 detects whether or not the paper is a delimiter page with sensors or the like for detecting these differences.

When information of the number of pages of the delimiter page (e.g., first chapter, etc.) is included in the identification information of the delimiter page, as in the delimiter page shown in FIG. 29(A), the document replacement processing portion 126 may be configured to determine whether or not the section including the delimiter page matches the section designated by the printing section designating portion 131 on the basis of the information of the number of pages of the delimiter page. In this case, it is necessary for the document replacement processing portion 126 to be provided with means which conducts character recognition. Thus, even when the number of pages of the inserted delimiter page is unknown, the replacement section can be identified.

When character strings or images are included in the identification information of the delimiter page, as in the delimiter page shown in FIG. 29(B), the document replacement processing portion 126 may be configured to determine whether or not the identification information of the delimiter page matches the character strings or images designated by the printing section designating portion 131. In this case, it is necessary for the document replacement processing portion 126 to be provided with means which conducts character/image recognition. Thus, even when the number of pages of the inserted delimiter page is unknown, the replacement section can be identified.

Figure 30:
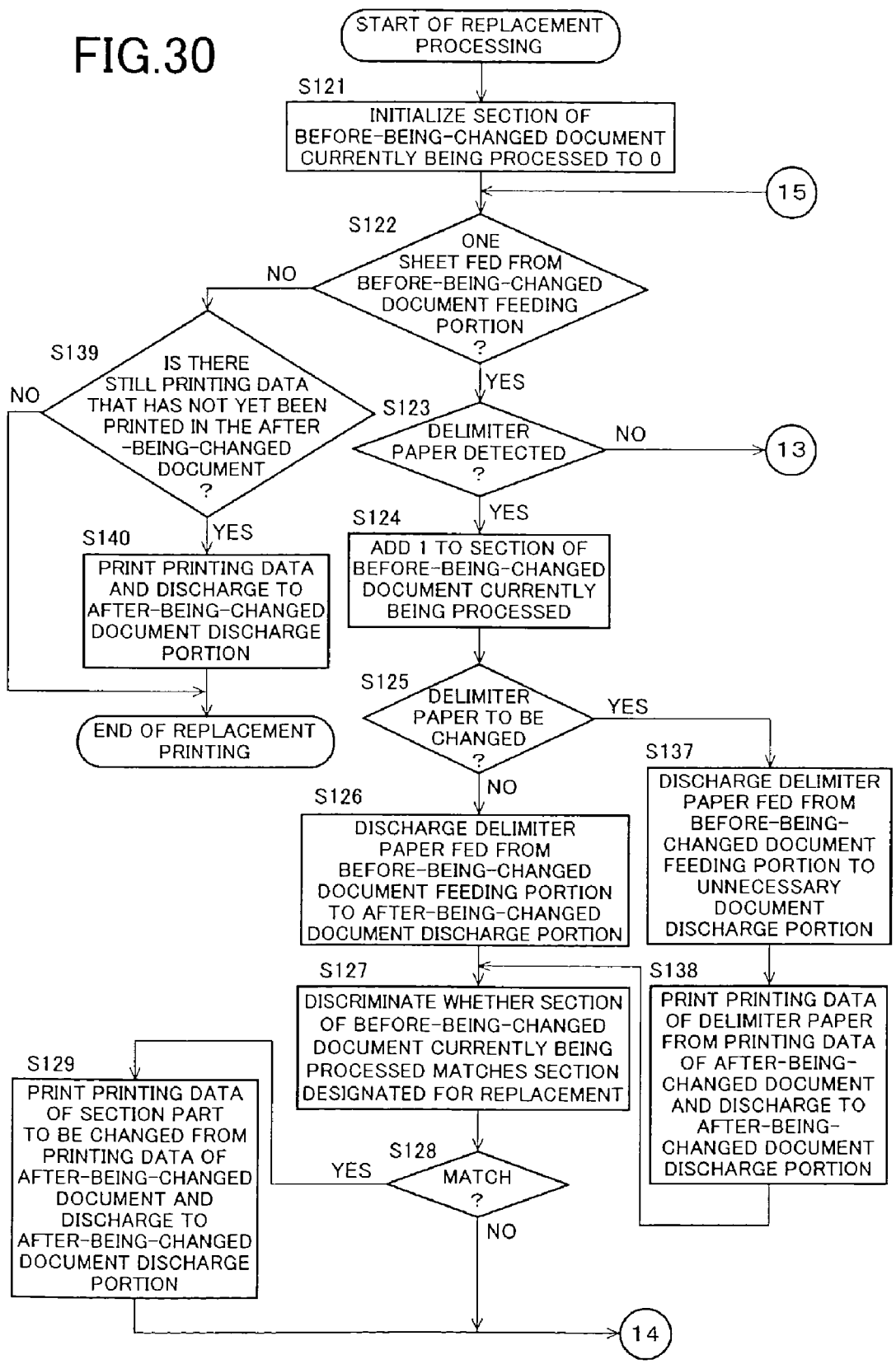
FIG. 30 is a flow chart for describing an example of the flow of document replacement processing to which the present invention is applied.
Figure 31:
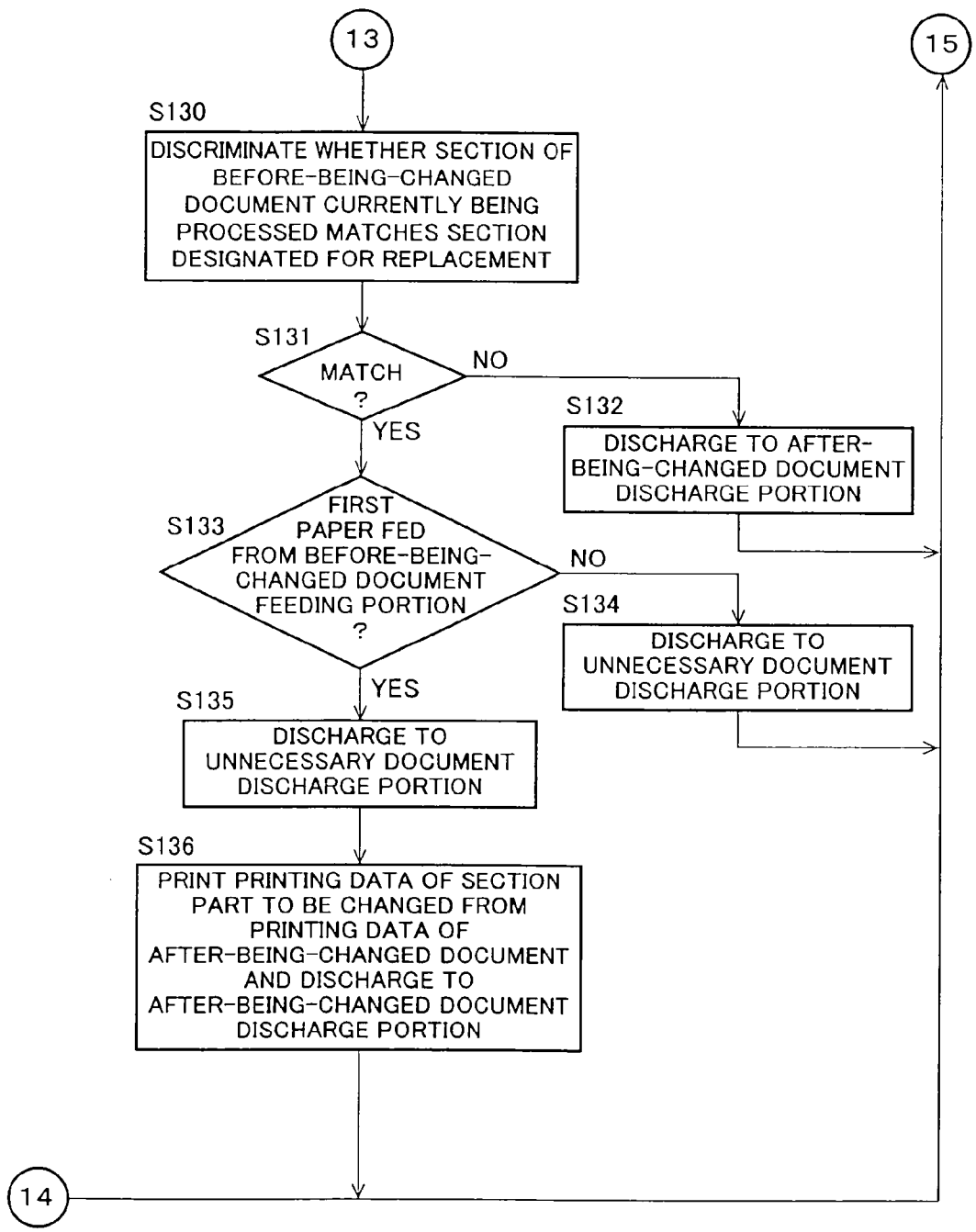
FIG. 31 is a flow chart for describing the example of the flow of the document replacement processing to which the present invention is applied, and is a continuation of the flow shown in FIG. 30.

FIGS. 30 and 31 are flow charts for describing an example of the flow of the document replacement processing to which the present invention is applied. The present example will be described on the basis of the printing system shown in FIG. 24. First, the printing unit 120 initializes the section of the document before being changed 1' currently being processed to 0 (step S121), and determines whether or not one sheet has been fed from the before-being-changed document feeding portion 124 (step S122). When one sheet of paper has been fed (when YES), the printing unit 120 detects whether that sheet is a delimiter page (hereinafter referred to as delimiter paper) (step S123). When the printing unit 120 detects delimiter paper (when YES), it adds 1 to the section of the document before being changed 1' currently being processed (step S124).

Next, the printing unit 120 determines whether or not the detected delimiter paper is delimiter paper to be changed (step S125). When the delimiter paper is not delimiter paper to be changed (when NO), the printing unit 20 discharges the delimiter paper fed from the before-being-changed document feeding portion 124 to the after-being-changed document discharge portion 129 (step S126), and discriminates whether or not the section of the document before being changed 1' currently being processed matches the section designated to be replaced (step S127). The printing unit 120 determines whether or not both match (step S128). When they do not match (when NO), the processing returns to step S122, and when both match (when YES), the printing unit 120 prints the printing data of the section part to be changed from the printing data of the after-being changed document, and discharges the printed paper to the after-being-changed document discharge portion 129 (step S129), and the processing returns to step S122.

The above-described processing is processing for replacing sections other than the "section 0" shown in FIG. 25(B), and because the first pages of the sections other than the "section 0" are delimiter paper, the processing detects the delimiter paper and determines whether or not it is a section to be replaced.

In the above step S123, when the printing unit 120 does not detect delimiter paper (when NO), the printing unit 120 discriminates whether or not the section of the document before being changed 1' currently being processed matches a section designated to be replaced (step S130). The printing unit 120 determines whether or not both match (step S131). When both do not match (when NO), the printing unit 120 discharges the fed paper to the after-being-changed document discharge portion 129 (step S132). In the above step S131, when both match (when YES), the printing unit 120 determines whether or not the fed paper is the first sheet of paper fed from the before-being-changed document feeding portion 124 (step S133). When the fed paper is not the first sheet of paper (when NO), the printing unit 120 discharges the paper to the unnecessary document discharge portion 128 (step S134). After the end of the discharge processing, the processing returns to step S122.

In the above step S133, when the fed paper is the first sheet of paper (when YES), the printing unit 120 discharges the fed paper to the unnecessary document discharge portion 128 (step S135), prints the printing data of the printing section to be changed from the printing data of the after-being-changed document, and discharges the printed paper to the after-being-changed document discharge portion 129 (step S136). The processing here is processing for replacing the section of the "section 0" shown in FIG. 25(B), and because the first page of the section of the "section 0" is not delimiter paper, the processing detects the first page of the document before being changed 1' and determines whether or not it is a section to be replaced.

In the above step S125, when the fed paper is delimiter paper to be changed (when YES), the printing unit 120 discharge the delimiter paper fed from the before-being-changed document feeding portion 124 to the unnecessary document discharge portion 128 (step S137), prints the printing data of the delimiter paper from the printing data of the after-beingchanged document, and discharges the printed paper to the after-being-changed document discharge portion 129 (step S138), and the processing moves to step S127, and discriminates whether or not the section of the document before being changed 1' currently being processed matches a section designated to be replaced.

Next, in the above step S122, when no sheet of paper has been fed (when NO), the printing unit 120 determines whether or not there is printing data that has not yet been printed in the after-being-changed document (step S139). When there is the printing data (when YES), the printing unit 120 prints that printing data and discharges the printed paper to the after-being-changed document discharge portion 129 (step S140). In the above step S139, when there is no printing data (when NO), the processing ends as is.

Figure 32A:
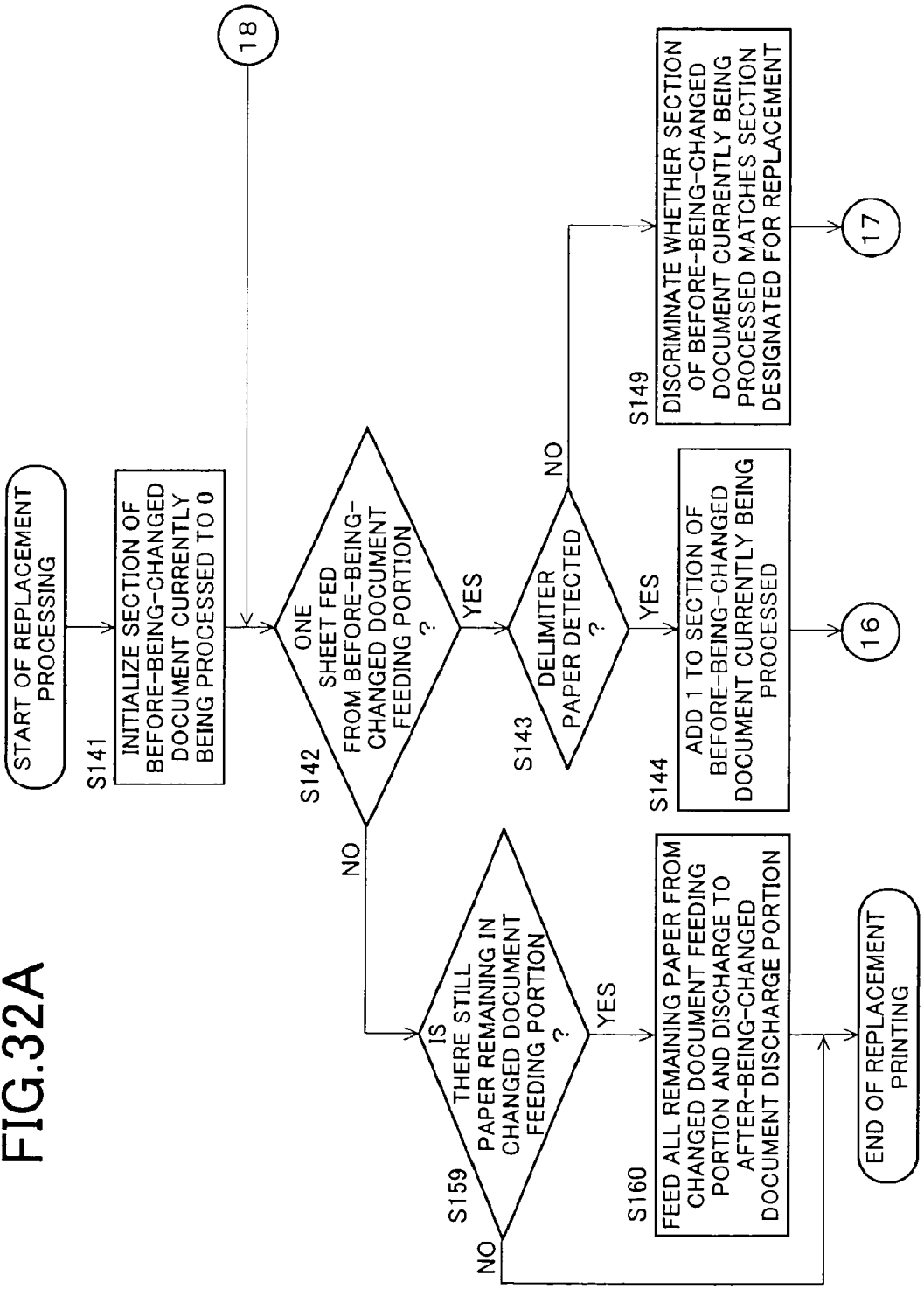
FIGS. 32A and 32B are flow charts for describing another example of the flow of the document replacement processing to which the present invention is applied.
Figure 32B:
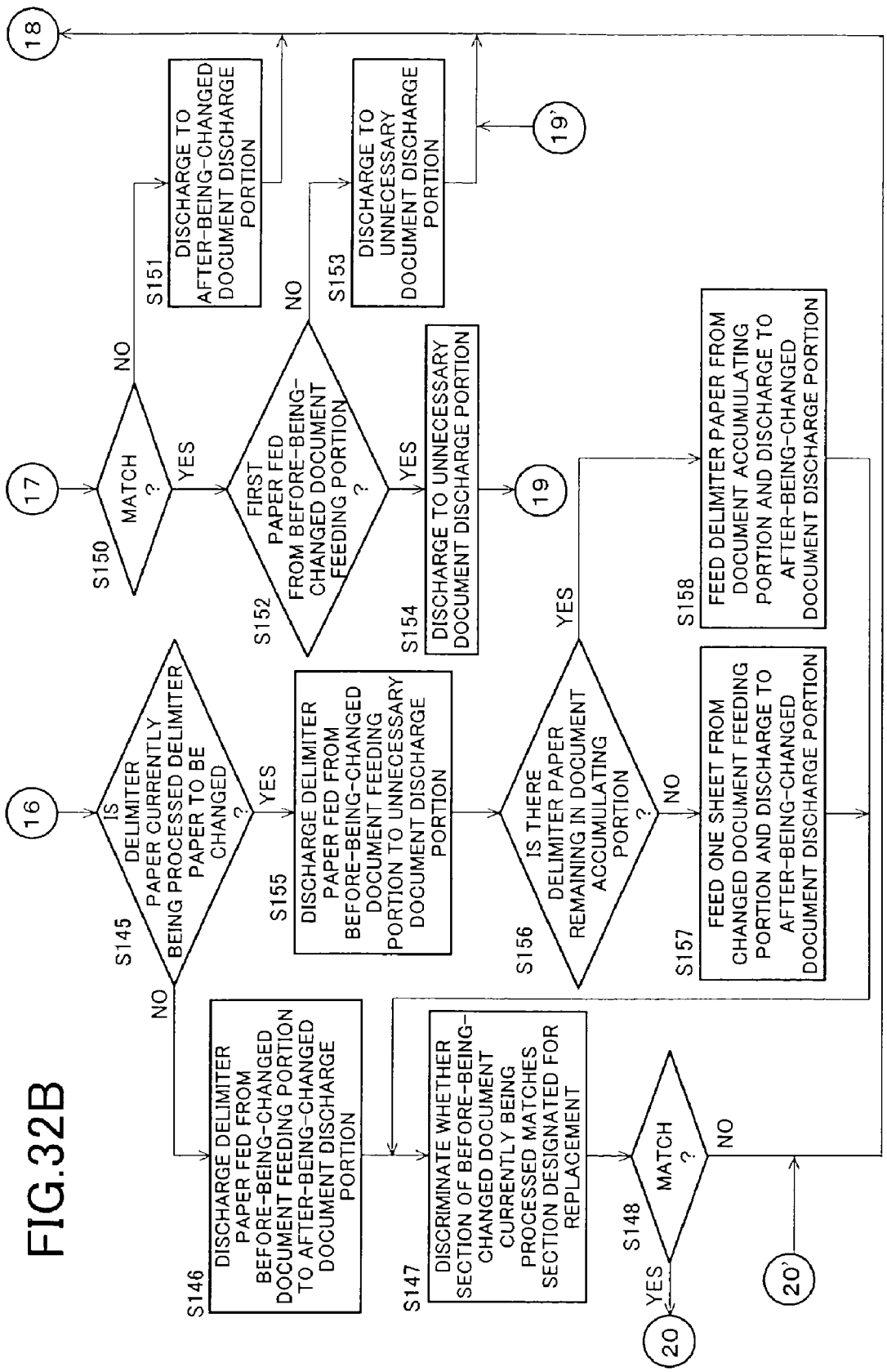

FIGS. 32A and 32B are flow charts for describing another example of the flow of the document replacement processing to which the present invention is applied. The present example will be described on the basis of the document replacement apparatus 140 shown in FIG. 27. First, the document replacement apparatus 140 initializes the section of the document before being changed 1' currently being processed to 0 (step S141) and determines whether or not one sheet has been fed from the before-being-changed document feeding portion 144 (step S142). When one sheet has been fed (when YES), the document replacement apparatus 140 detects whether or not the sheet is delimiter paper (step S143). When the document replacement apparatus 140 detects delimiter paper (when YES), it adds 1 to the section of the document before being changed 1' currently being processed (step S144).

Next, the document replacement apparatus 140 determines whether or not the detected delimiter paper is delimiter paper to be changed (step S145). When the detected delimiter paper is not delimiter paper to be changed (when NO), the document replacement apparatus 140 discharges the delimiter paper fed from the before-being-changed document feeding portion 144 to the after-being-changed document discharge portion 150 (step S146), and discriminates whether the section of the document before being changed 1' currently being processed matches a section designated to be replaced (step S147). The document replacement apparatus 140 determines whether or not both match (step S148). When both do not match (when NO), the processing returns to step S142, and when both match (when YES), the processing moves to step S161 shown in FIG. 33.

The above-described processing is processing for replacing sections other than the "section 0" shown in FIG. 25(B), and because the first pages of the sections other than the "section 0" are delimiter paper, the processing detects the delimiter paper and determines whether or not it is a section to be replaced.

In the above step S143, when the document replacement apparatus 140 does not detect delimiter paper (when NO), the document replacement apparatus 140 discriminates whether or not the section of the document before being changed 1' currently being processed matches a section designated to be replaced (step S149). The document replacement apparatus 140 determines whether or not both match (step S150). When both do not match (when NO), the document replacement apparatus 140 discharges the fed paper to the after-being-changed document discharge portion 150 (step S151). In the above step S150, when both match (when YES), the document replacement apparatus 140 determines whether or not the fed paper is the first sheet of paper fed from the before-being-changed document feeding portion 144 (step S152). When the paper is not the first sheet of paper (when NO), the document replacement apparatus 140 discharges the fed paper to the unnecessary document discharge portion 149 (step S153). After the discharge processing, the processing returns to step S142.

Figure 33:
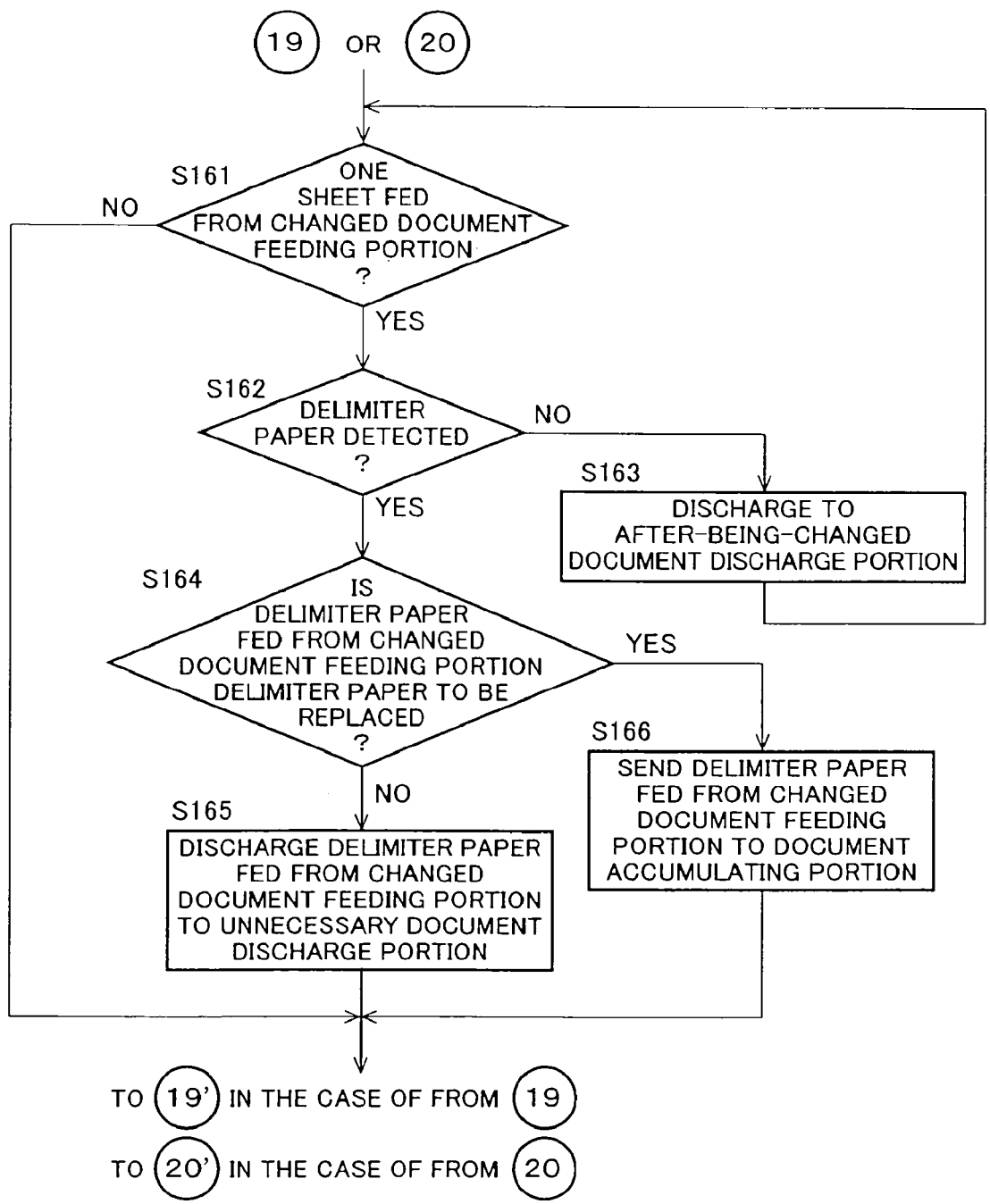
FIG. 33 is a flow chart for describing another example of the flow of the document replacement processing to which the present invention is applied, and is a continuation of the flow shown in FIG. 32B.

In the above step S152, when the paper is the first sheet of paper (when YES), the document replacement apparatus 140 discharges the fed paper to the unnecessary document discharge portion 149 (step S154) and the processing moves to step S161 shown in FIG. 33. The processing here is processing for replacing the section of the "section 0" shown in FIG. 25(B), and because the first page of the section of the "section 0" is not delimiter paper, the processing detects the first page of the document before being changed 1' and determines whether or not it is a section to be replaced.

In the above step S145, when the fed paper is delimiter paper to be changed (when YES), the document replacement apparatus 140 discharges the delimiter paper fed from the before-being-changed document feeding portion 144 to the unnecessary document discharge portion 149 (step S155) and determines whether or not there is delimiter paper remaining in the document accumulating portion 147 (step S156). When there is no delimiter paper remaining (when NO), the document replacement apparatus 140 feeds one sheet from the changed document feeding portion 143 and discharges it to the after-being-changed document discharge portion 150 (step S157). In the above step S156, when there is delimiter paper remaining (when YES), the document replacement apparatus 140 feeds the delimiter paper from the document accumulating portion 147 and discharges it to the after-being-changed document discharge portion 150 (step S158). Then, the processing moves to step S147, and the document replacement apparatus 140 discriminates whether the section of the document before being changed 1' currently being processed is a section designated to be replaced.

Next, in the above step S142, when no sheet of paper has not been fed (when NO), the document replacement apparatus 140 determines whether or not there is paper remaining in the changed document feeding portion 143 (step S159). When there is paper (when YES), the document replacement apparatus 140 feeds all remaining paper from the changed document feeding portion 143 and discharges it to the after-being-changed document discharge portion 150 (step S160). In the above step 159, when there is no remaining paper (when NO), the processing ends as is.

FIG. 33 is a flow chart for describing another example of the document replacement processing to which the present invention is applied, and is a continuation of the flow shown in FIG. 32B. After the processing of step S148 (YES) or of step S154 shown in FIG. 32B, first, the document replacement apparatus 140 determines whether or not one sheet has been fed from the changed document feeding portion 143 (step S161). When one sheet has been fed (when YES), the document replacement apparatus determines whether or not the fed paper is delimiter page. When the fed paper is delimiter page, the document replacement apparatus discharges the fed paper to the after-being-changed document discharge portion 150, and the processing returns to step S161.

In the above step S162, when the fed paper is delimiter paper (when YES), the document replacement apparatus 140 determines whether or not the delimiter paper fed from the changed document feeding portion 143 is delimiter paper that is to be replaced (step S164). When the delimiter paper is not delimiter paper that is to be replaced (when NO), the document replacement apparatus 140 discharges the delimiter paper fed from the changed document feeding portion 143 to the unnecessary document discharge portion 149 (step S165) and the processing moves to step S142 shown in FIG. 32A. In the above step S164, when the delimiter paper is delimiter paper to be replaced (when YES), the document replacement apparatus 140 transmits the delimiter paper fed from the changed document feeding portion 143 to the document accumulating portion 147 (step S166) and the processing moves to step S142 shown in FIG. 32A. In the above step S161, when no sheet can be fed (when NO), the processing returns to step S142 shown in FIG. 32A.

FIG. 34 is a diagram showing the state of delimiter pages inserted in the document of the changed part 4' shown in FIG. 27. The present example represents a state where the document of the changed part 4' has been set in order to conduct replacement of section 0, section 1, section 3 and section 7. The document replacement apparatus 140 shown in FIG. 27 is provided with the delimiter page detecting portion 145 and the document accumulating portion 147, the document of the changed part 4' is set in a state where it includes delimiter pages (in the present example, a delimiter page 1, a delimiter page 3, and a delimiter page 7) regardless of whether it is to be changed or not to be changed (see FIG. 34). This is so that the sections of the document of the changed part 4' are detected with the delimiter pages.

In the flow shown in FIG. 33, the delimiter page detecting portion 145 discriminates whether or not the pages of the document of the changed part 4' fed from the changed document feeding portion 143 are delimiter pages. When fed sheet is discriminated to be a delimiter page, it is transmitted to the document replacement processing portion 148. The document accumulating portion 147 temporarily stores the delimiter pages fed from the changed document feeding portion 143. Because the delimiter pages included in the document of the changed part 4' double as the trailing ends of the changed sections, they are stored until processing of the next section begins after they have been fed at the end of the section processing.

The various functions of the printing system and document replacement apparatus of the present invention have been described above on the basis of embodiments, but the present invention can also take the form of a document replacement method, as was described as a method that executes the steps in the printing system and document replacement apparatus. The present invention can also take the form of a program (i.e., a printer driver) provided with the function for designating the changed sections in a printing document or the form of a recording medium in which that program is recorded.

An embodiment of a recording medium in which the program pertaining to the present invention is recorded will be described. As specific examples of the recording medium, a CD-ROM (-R/-RW), a magneto-optical disk, a DVD-ROM (-R/-RW/-RAM), a floppy disk (FD), a hard disk (HD), a flash memory, a memory card, a memory stick, and various ROMs and RAMs are conceivable. By recording the program in these recording media and distributing the media, the realization of the pertinent functions is facilitated. Then, the recording medium may be loaded in an information processing apparatus such as a computer and the program may be read by the information processing apparatus, or the program may be stored in a recording medium with which an information processing apparatus is provided and may be read as necessary so that the pertinent functions can be executed.

By counting the number of sheets of paper of the printing document before replacement, or by comparing the printing document before replacement with printing data including parts to which changes or the like have been added, or by acquiring section information of document units (sections) that are to be replaced in the printing document before replacement, just the parts of the document to which changes or the like have been added can be printed, and the pertinent part of the printing document before replacement can be automatically replaced with the printing result of the parts to which changes or the like have been added. Thus, printing paper and printing time can be significantly economized.

Delimiter pages are disposed in a printing document comprising plural pages and sections are delimited by shoes delimiter pages, so that just the sections of the document to which changes or the like have been added can be printed in document units (sections) delimited by the delimiter pages, the pertinent part of the printing document before replacement can be automatically replaced with the printing result of the parts to which changes or the like have been added. Thus, printing paper and printing time can be significantly economized.

The invention claimed is:

1. A printing system, comprising:
a printing data generating unit that generates printing data and a printing apparatus that conducts printing on the basis of the printing data, with the printing data generating unit and the printing apparatus partially replacing a printing document comprising plural pages, wherein
the printing data generating unit comprises a section designating portion that designates a section corresponding to a replacement part included in after-replacement printing data, and wherein
the printing apparatus comprises
a printing portion that selectively prints printing data of the section designated by the section designating portion,
a data accumulating portion that accumulates printing data of predetermined pages that precedes the printing data of the section,
a paper feeding portion that feeds a before-replacement printing document,
a reading portion that reads the fed printing document,
a data comparing portion that compares the read document data with the printing data of the data accumulating portion,
a replacement processing portion which, when both match in the predetermined pages, instructs the printing portion to print the printing data of the replacement part corresponding to the section such that a replacement target document of the before-replacement printing document is replaced by the replacement part, and which, when both do not match, causes the before-replacement printing document to be discharged directly from the printing portion, and
a first data accumulating portion that accumulates printing data of predetermined pages that are preceded by the printing data of the section, wherein the data comparing portion compares the document data that the reading portion has sequentially read with the printing data of the first data accumulating portion, and wherein when both match in the predetermined pages, the replacement processing portion determines that the replacement target document of the before-replacement printing document has been replaced with the document of the replacement part.

2. The printing system of claim 1, wherein when the printing data preceding and preceded by the printing data of the section have been designated by the page number, the section designating portion converts the page number to the paper number corresponding to the page number.

3. The printing system of claim 2, wherein when the printing data preceding and precede by the printing data of the section have been designated by the page number and printing settings are set to allocate plural pages to one sheet of paper, the data comparing portion compares only the comparison target part in the plural pages.

4. A document replacement apparatus that partially replaces a printing document comprising plural pages, the document replacement apparatus comprising:
- a section designation information input portion that inputs information for designating a section corresponding to a replacement part included in after-replacement printing data;
- a paper feeding portion that feeds the before-replacement printing document, a document of a replacement part corresponding to the section, and a document of predetermined pages that precedes the document of the replacement part;
- a first reading portion that reads the document of the predetermined pages;
- a data accumulating portion that accumulates document data read by the first reading portion;
- a second reading portion that read the before-replacement printing document;
- a data comparing portion that compares the document data read by the second reading portion with the document data of the data accumulating portion;
- a replacement processing portion which, when both match in the predetermined pages, discharges the document of the replacement part corresponding to the section from the paper feeding portion and thus replaces the replacement target document of the before-replacement printing document with the replacement part, and which, when both do not match, discharges the before-replacement printing document; and
- a first data accumulating portion that accumulates a document of the predetermined pages that is preceded by the document of the replacement part corresponding to the section, wherein
- the data comparing portion compares the document data sequentially read by the second reading portion with the document data of the first data accumulating portion, and wherein
- when both match in the predetermined pages, the replacement processing portion determines that the replacement target document of the before-replacement printing document has been replaced with the document of the replacement part.

5. The document replacement apparatus of claim 4, further comprising an input/output interface for connecting via a network to an information processing apparatus provided with a section designating portion that designates a section corresponding to a replacement target document in the before-replacement printing document or designates a section corresponding to a replacement part included in the after-replacement printing data, wherein the section designation information input portion acquires the section designation information from the information processing apparatus.

6. The document replacement apparatus of claim 4, further comprising a first discharge portion for discharging an unnecessary document of the before-replacement printing document that has become unnecessary due to replacement processing and a second discharge portion for discharging the before-replacement printing document other than the unnecessary document and the document of the replacement part.

* * * * *